(12) United States Patent
Williams et al.

(10) Patent No.: US 11,781,688 B2
(45) Date of Patent: Oct. 10, 2023

(54) PUSH TO CONNECT CONDUIT FITTING ASSEMBLIES AND ARRANGEMENTS

(71) Applicant: Swagelok Company, Solon, OH (US)

(72) Inventors: Peter C. Williams, Cleveland Heights, OH (US); Douglas J. McClure, Mentor, OH (US); Cal R. Brown, Lyndhurst, OH (US); Ronald P. Campbell, Shaker Heights, OH (US); Douglas S. Welch, Chesterland, OH (US); Michael D. Bestic, Sagamore Hills, OH (US)

(73) Assignee: SWAGELOK COMPANY, Solon, OH (US)

( * ) Notice: Subject to any disclaimer, the term of this patent is extended or adjusted under 35 U.S.C. 154(b) by 634 days.

(21) Appl. No.: 16/833,747

(22) Filed: Mar. 30, 2020

(65) Prior Publication Data

US 2020/0309299 A1 Oct. 1, 2020

Related U.S. Application Data

(60) Provisional application No. 62/827,302, filed on Apr. 1, 2019.

(51) Int. Cl.
*F16L 37/088* (2006.01)
(52) U.S. Cl.
CPC .................. *F16L 37/088* (2013.01)
(58) Field of Classification Search
CPC ....... F16L 19/06; F16L 19/061; F16L 19/065; F16L 37/084; F16L 37/0842;
(Continued)

(56) References Cited

U.S. PATENT DOCUMENTS

| 1,337,288 A | 4/1920 | Stichler |
|---|---|---|
| 2,429,202 A | 10/1947 | Estill |

(Continued)

FOREIGN PATENT DOCUMENTS

| AT | 228575 | 7/1963 |
|---|---|---|
| CN | 101162068 | 4/2008 |

(Continued)

OTHER PUBLICATIONS

International Search Report and Written Opinion from PCT/US2020/025635 dated Aug. 24, 2020.

(Continued)

*Primary Examiner* — Aaron M Dunwoody
(74) *Attorney, Agent, or Firm* — Calfee, Halter & Griswold LLP

(57) ABSTRACT

A push to connect fitting includes first and second fitting components, a sealing arrangement, a gripping arrangement, and a colleting ring. The first fitting component has an outboard end that is adapted to receive a conduit end. The second fitting component is joined to the first fitting component to define an interior cavity. The sealing arrangement, disposed in the interior cavity, seals one of the first and second fitting components with an outer surface of a conduit end when the conduit end is inserted into the outboard end of the first fitting component. The gripping arrangement is disposed in the interior cavity, and the colleting ring is disposed in the interior cavity and has an inboard end surface engaging an outboard end surface of the gripping arrangement.

20 Claims, 48 Drawing Sheets

(58) Field of Classification Search
CPC ....... F16L 37/086; F16L 37/088; F16L 37/22; F16L 37/23; F16L 19/10; F16L 19/103; F16L 19/12
See application file for complete search history.

(56) References Cited

U.S. PATENT DOCUMENTS

| | | |
|---|---|---|
| 2,561,887 A | 7/1951 | Risley |
| 2,702,202 A | 2/1955 | Kaiser |
| 2,848,135 A | 8/1958 | Ricard et al. |
| 2,848,256 A | 8/1958 | Tyler |
| 2,914,344 A | 11/1959 | Anthes |
| 3,398,977 A | 8/1968 | Yoneda |
| 3,453,005 A | 7/1969 | Foults |
| 3,773,360 A | 11/1973 | Timbers |
| 3,887,222 A | 6/1975 | Hammond |
| 4,055,359 A | 10/1977 | McWethy |
| 4,105,226 A | 8/1978 | Frey et al. |
| 4,111,464 A | 9/1978 | Asano et al. |
| 4,135,745 A | 1/1979 | Dehar |
| 4,163,573 A | 8/1979 | Yano |
| 4,191,408 A | 3/1980 | Acker |
| 4,193,616 A | 3/1980 | Sarson et al. |
| 4,240,654 A | 12/1980 | Gladieux |
| 4,298,220 A | 11/1981 | Kukuminato |
| 4,304,422 A | 12/1981 | Schwarz |
| 4,311,328 A | 1/1982 | Truchet |
| 4,401,326 A | 8/1983 | Blair |
| 4,455,177 A | 6/1984 | Filippov et al. |
| 4,540,201 A | 9/1985 | Richardson |
| 4,645,245 A | 2/1987 | Cunningham |
| 4,685,706 A | 8/1987 | Kowal et al. |
| 4,703,958 A | 11/1987 | Fremy |
| 4,719,971 A | 1/1988 | Owens |
| 4,750,765 A | 6/1988 | Cassidy et al. |
| 4,752,088 A | 6/1988 | Stahl et al. |
| 4,793,637 A | 12/1988 | Laipply et al. |
| 4,813,716 A | 3/1989 | Lalikos et al. |
| 4,834,423 A | 5/1989 | DeLand |
| 4,872,710 A | 10/1989 | Konecny et al. |
| 4,893,810 A | 1/1990 | Lee |
| 4,906,031 A | 3/1990 | Vyse |
| 4,923,228 A | 5/1990 | Laipply |
| 5,005,877 A | 4/1991 | Hayman |
| 5,022,687 A | 6/1991 | Ariga |
| 5,024,468 A | 6/1991 | Burge |
| 5,042,848 A | 8/1991 | Shiozaki |
| 5,044,672 A | 9/1991 | Skeels |
| 5,076,541 A | 12/1991 | Daghe et al. |
| 5,118,140 A | 6/1992 | Racine |
| 5,176,409 A | 1/1993 | Brooks |
| 5,181,751 A | 1/1993 | Kitamura |
| 5,226,682 A | 7/1993 | Marrison et al. |
| 5,246,236 A | 9/1993 | Szarka |
| 5,284,369 A | 2/1994 | Kitamura |
| 5,301,408 A | 4/1994 | Berman et al. |
| 5,401,065 A | 3/1995 | Okumura et al. |
| 5,474,336 A | 12/1995 | Hoff et al. |
| 5,553,895 A | 9/1996 | Karl et al. |
| 5,562,371 A | 10/1996 | Reed |
| 5,566,987 A | 10/1996 | Mazhar |
| 5,570,910 A | 11/1996 | Highlen |
| 5,632,651 A | 5/1997 | Szegda |
| 5,653,480 A | 8/1997 | Mine |
| 5,662,359 A | 9/1997 | Kargula |
| 5,681,061 A | 10/1997 | Olson |
| 5,683,120 A | 11/1997 | Brock |
| 5,685,575 A | 11/1997 | Allread et al. |
| 5,730,475 A | 3/1998 | Kargula |
| 5,887,911 A | 3/1999 | Kargula |
| 5,967,477 A | 10/1999 | Walmsley |
| 6,056,327 A | 5/2000 | Bouldin |
| 6,073,976 A | 6/2000 | Schmidt et al. |
| 6,142,496 A | 11/2000 | Kouda |
| 6,145,887 A | 11/2000 | Cembot-Corrau |
| 6,152,496 A * | 11/2000 | Kouda ................ F16L 37/0927 285/319 |
| 6,186,557 B1 | 2/2001 | Funk |
| 6,334,634 B1 | 1/2002 | Osterkil |
| 6,349,978 B1 | 2/2002 | McFarland |
| 6,390,511 B1 | 5/2002 | Kargula |
| 6,447,017 B1 | 9/2002 | Gilbreath et al. |
| 6,461,551 B1 | 10/2002 | Mandish |
| 6,464,266 B1 | 10/2002 | O'Neill et al. |
| 6,510,895 B1 | 1/2003 | Koleilat |
| 6,517,115 B1 | 2/2003 | Blivet |
| 6,517,124 B1 | 2/2003 | LeQuere |
| 6,517,126 B1 | 2/2003 | Peterson |
| 6,561,551 B2 | 5/2003 | Kawakami et al. |
| 6,581,907 B1 | 6/2003 | Kuwabara |
| 6,604,760 B2 | 8/2003 | Cresswell et al. |
| 6,629,708 B2 | 10/2003 | Williams et al. |
| 6,769,720 B2 | 8/2004 | Dahms et al. |
| 6,779,778 B2 | 8/2004 | Kuwabara |
| 6,893,051 B1 | 5/2005 | Park |
| 6,964,435 B2 | 11/2005 | Wolf et al. |
| 6,964,436 B2 | 11/2005 | LeQuere |
| 6,983,959 B2 | 1/2006 | Wolf et al. |
| 6,986,533 B2 | 1/2006 | Ko |
| 6,991,265 B2 | 1/2006 | Walmsley |
| 7,000,953 B2 | 2/2006 | Berghaus |
| 7,029,035 B2 | 4/2006 | Seymour, II et al. |
| 7,100,949 B2 | 9/2006 | Williams et al. |
| 7,140,645 B2 | 11/2006 | Cronley |
| 7,195,286 B2 | 3/2007 | Hama |
| 7,208,052 B2 | 4/2007 | Hammond et al. |
| 7,213,845 B2 | 5/2007 | Sato |
| 7,240,929 B2 | 7/2007 | Williams et al. |
| 7,255,373 B2 | 8/2007 | Pirdham |
| 7,264,281 B2 | 9/2007 | LeQuere |
| 7,273,235 B2 | 9/2007 | Coquard |
| 7,273,236 B2 | 9/2007 | LeQuere |
| 7,344,165 B2 | 3/2008 | LeQuere |
| 7,367,595 B2 | 5/2008 | Williams et al. |
| 7,369,595 B2 | 5/2008 | Williams et al. |
| 7,387,318 B2 | 6/2008 | Yoshida |
| 7,419,012 B2 | 9/2008 | Lynch |
| 7,448,654 B2 | 11/2008 | LeQuere |
| 7,448,655 B2 | 11/2008 | LeBars |
| 7,452,006 B2 | 11/2008 | Kohda |
| 7,455,328 B2 | 11/2008 | Chelchowski |
| 7,472,930 B2 | 1/2009 | Tiberghien |
| 7,488,006 B2 | 2/2009 | Dahms et al. |
| 7,506,899 B2 | 3/2009 | Feith |
| 7,516,989 B2 | 4/2009 | Yoshida |
| 7,543,854 B2 | 6/2009 | Dahms |
| 7,578,529 B2 | 8/2009 | Lutzke |
| 7,614,668 B1 | 11/2009 | Williams et al. |
| 7,621,569 B2 | 11/2009 | Anthoine |
| 7,695,027 B2 | 4/2010 | Williams |
| 7,699,358 B2 | 4/2010 | Williams et al. |
| 7,762,593 B2 | 7/2010 | LeBars |
| 7,762,595 B2 | 7/2010 | Enderich et al. |
| 7,806,443 B1 | 10/2010 | Plattner |
| 7,850,208 B2 | 12/2010 | Greenberger |
| 7,878,554 B2 | 2/2011 | LeBars |
| 7,900,973 B2 | 3/2011 | Herberg |
| 7,914,050 B2 | 3/2011 | Udhofer |
| 7,922,214 B2 | 4/2011 | Nakamura et al. |
| 7,926,855 B2 | 4/2011 | Kitagawa |
| 8,029,024 B2 | 10/2011 | Guest |
| 8,033,524 B2 | 10/2011 | Tiberghien |
| 8,226,128 B2 | 7/2012 | Lee |
| 8,240,719 B2 | 8/2012 | Udhofer |
| 8,297,658 B2 | 10/2012 | LeQuere |
| 8,491,012 B2 | 7/2013 | LeQuere |
| 8,555,624 B2 | 10/2013 | Lechner |
| 8,628,119 B2 | 1/2014 | Hasunuma |
| 8,757,670 B2 | 6/2014 | Kim |
| 8,844,980 B2 | 9/2014 | LeQuere |
| 8,870,235 B2 | 10/2014 | Turk |
| 8,876,170 B2 | 11/2014 | Williams |
| 8,882,156 B2 | 11/2014 | Guest |
| 8,931,807 B2 | 1/2015 | Taylor |

(56) References Cited

U.S. PATENT DOCUMENTS

| | | | |
|---|---|---|---|
| 8,931,810 B2 | 1/2015 | Clason | |
| 9,267,627 B2 | 2/2016 | Bennett | |
| 9,404,611 B2 | 8/2016 | Ekstrom | |
| 9,447,906 B2 | 9/2016 | Bobo | |
| 9,476,528 B2 | 10/2016 | Tiberghien | |
| 9,541,228 B2 | 1/2017 | Bobo | |
| 9,611,965 B2 | 4/2017 | Cheon | |
| 9,746,114 B2 | 8/2017 | LeQuere | |
| 9,752,713 B2 | 9/2017 | Tiberghien | |
| 9,822,909 B2 | 11/2017 | Gaillard | |
| 9,903,518 B2 | 2/2018 | Clason | |
| 9,909,703 B2 | 3/2018 | VanScyoc | |
| 9,958,097 B2 | 5/2018 | Rubinski | |
| 9,958,100 B2 | 5/2018 | Williams | |
| 10,173,046 B2 | 1/2019 | Ciccone | |
| 10,458,582 B2 | 10/2019 | Williams et al. | |
| 10,458,584 B2 | 10/2019 | Tiberghien | |
| 10,527,214 B2 | 1/2020 | Tiberghien | |
| 10,547,164 B2 | 1/2020 | Dhotre | |
| 10,550,973 B2 | 2/2020 | Guest | |
| 2002/0140227 A1 | 10/2002 | Kawakami | |
| 2004/0094957 A1 | 5/2004 | Walmsley et al. | |
| 2005/0023832 A1 | 2/2005 | Edler | |
| 2006/0220380 A1 | 10/2006 | Yoshino | |
| 2007/0013188 A1 | 1/2007 | Dallas | |
| 2007/0164563 A1 | 7/2007 | Arstein et al. | |
| 2007/0232147 A1 | 10/2007 | Herberg | |
| 2008/0088127 A1 | 4/2008 | Tiberghien | |
| 2008/0136178 A1 | 6/2008 | Udhofer et al. | |
| 2008/0220380 A1 | 9/2008 | Bristol et al. | |
| 2009/0121478 A1 | 5/2009 | Tsujita | |
| 2009/0178733 A1 | 7/2009 | Somers et al. | |
| 2009/0214287 A1 | 8/2009 | Usui et al. | |
| 2010/0171302 A1 | 7/2010 | Yoder | |
| 2010/0300705 A1 | 12/2010 | Nelson | |
| 2011/0227337 A1 | 9/2011 | Kattler | |
| 2012/0175874 A1* | 7/2012 | Newall | F16L 19/086 285/389 |
| 2012/0325448 A1* | 12/2012 | Kim | F28F 19/02 165/172 |
| 2013/0030799 A1 | 1/2013 | Lim | |
| 2013/0062877 A1 | 3/2013 | Nobuhiko | |
| 2013/0119659 A1 | 5/2013 | Williams et al. | |
| 2013/0207385 A1 | 8/2013 | Williams et al. | |
| 2015/0115602 A1 | 4/2015 | Clason | |
| 2015/0240980 A1 | 8/2015 | Bobo | |
| 2015/0263498 A1 | 9/2015 | Thomas | |
| 2015/0345683 A1 | 12/2015 | Crompton | |
| 2016/0126716 A1 | 5/2016 | Crompton | |
| 2016/0161038 A1 | 6/2016 | Crompton | |
| 2016/0273695 A1 | 9/2016 | Bobo | |
| 2016/0312932 A1 | 10/2016 | Williams et al. | |
| 2016/0327196 A1 | 11/2016 | Gledhil | |
| 2017/0082231 A1 | 3/2017 | Crompton | |
| 2017/0102102 A1* | 4/2017 | Goble | F16L 21/007 |

FOREIGN PATENT DOCUMENTS

| | | |
|---|---|---|
| CN | 102203491 | 9/2011 |
| CN | 108131204 A | 6/2018 |
| DE | 2741512 | 4/1979 |
| DE | 7914106 | 8/1979 |
| DE | 2824943 | 12/1979 |
| DE | 2856069 | 7/1980 |
| DE | 2912160 | 10/1980 |
| DE | 2922869 | 12/1980 |
| DE | 4243844 | 6/1994 |
| DE | 19517269 | 11/1996 |
| DE | 19837355 | 2/2000 |
| DE | 19932307 | 1/2001 |
| DE | 10125499 | 8/2002 |
| DE | 102006015555 | 1/2007 |
| DE | 202006018794 | 4/2008 |
| EP | 156575 | 10/1985 |
| EP | 368795 | 5/1990 |
| EP | 373920 | 6/1990 |
| EP | 511436 | 11/1992 |
| EP | 615089 | 9/1994 |
| EP | 676019 | 10/1995 |
| EP | 715111 | 6/1996 |
| EP | 718538 | 6/1996 |
| EP | 735306 | 10/1996 |
| EP | 762036 | 3/1997 |
| EP | 898109 | 2/1999 |
| EP | 1235023 | 8/2002 |
| EP | 2163802 | 3/2010 |
| EP | 2589848 | 5/2013 |
| EP | 2558763 | 3/2016 |
| EP | 2817548 | 3/2016 |
| FR | 2545908 | 11/1984 |
| GB | 2104235 | 3/1983 |
| GB | 2325718 | 12/1988 |
| GB | 2398612 | 8/2004 |
| GB | 2445701 | 7/2008 |
| GB | 2480880 | 12/2011 |
| JP | H022035 | 1/1990 |
| JP | H0320637 | 3/1991 |
| JP | H05312283 | 11/1993 |
| JP | H06272795 | 9/1994 |
| JP | H07190272 | 7/1995 |
| JP | H10510038 | 9/1998 |
| JP | 2001193883 | 7/2001 |
| JP | 20011182883 | 7/2001 |
| JP | 2003-014169 | 1/2003 |
| JP | 2009-523967 | 6/2009 |
| JP | 2013542378 | 11/2013 |
| JP | 2014111979 | 6/2014 |
| JP | 2016109170 | 6/2016 |
| WO | 97/13994 | 4/1997 |
| WO | 02/29300 | 4/2002 |
| WO | 02/29301 | 4/2002 |
| WO | 07/084183 | 7/2007 |
| WO | 07/117688 | 10/2007 |
| WO | 2008/051500 | 5/2008 |
| WO | 2010080027 | 7/2010 |
| WO | 2011/102637 | 8/2011 |
| WO | 2012/018576 | 2/2012 |
| WO | 2012/051481 | 4/2012 |
| WO | 13/056273 | 4/2013 |
| WO | 2018/191578 | 10/2018 |

OTHER PUBLICATIONS

Speedfit Plastic pus-in fittings top-valve, 1 pg. issued Jul. 1997, RS Components.

Quick connect Plumbing Solutions Video web pages, Watts.com, 2 pgs. copyright 2017.

Plumbing Supply.Com, speedfit Quick connect Fittings by John Guest, 40 pgs., accessed on Apr. 27, 2017.

Office action from Indian Application No. 202127046296 dated Dec. 20, 2022.

Office action from Chinese Application No. 202080017883.0 dated Feb. 13, 2023.

\* cited by examiner

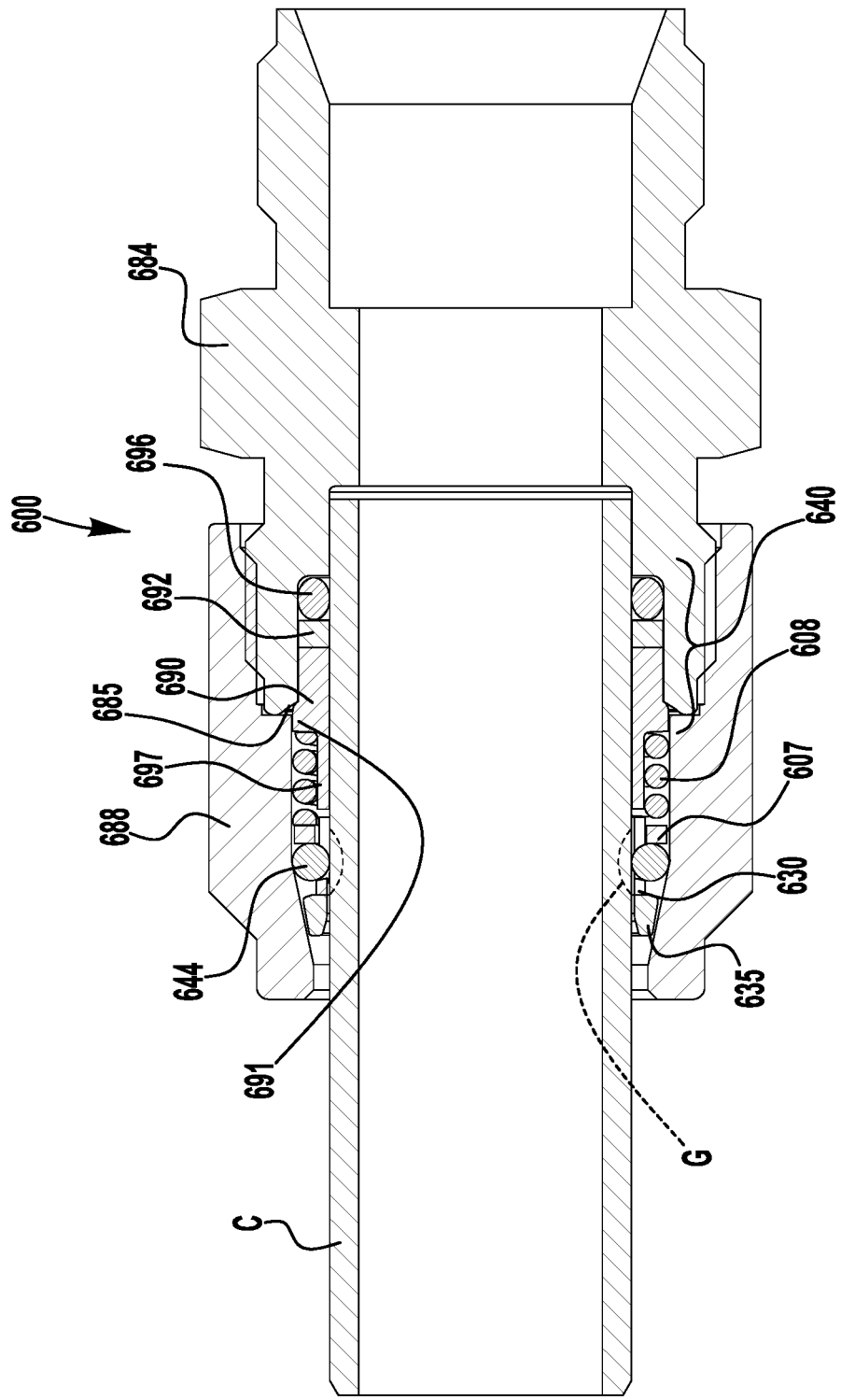

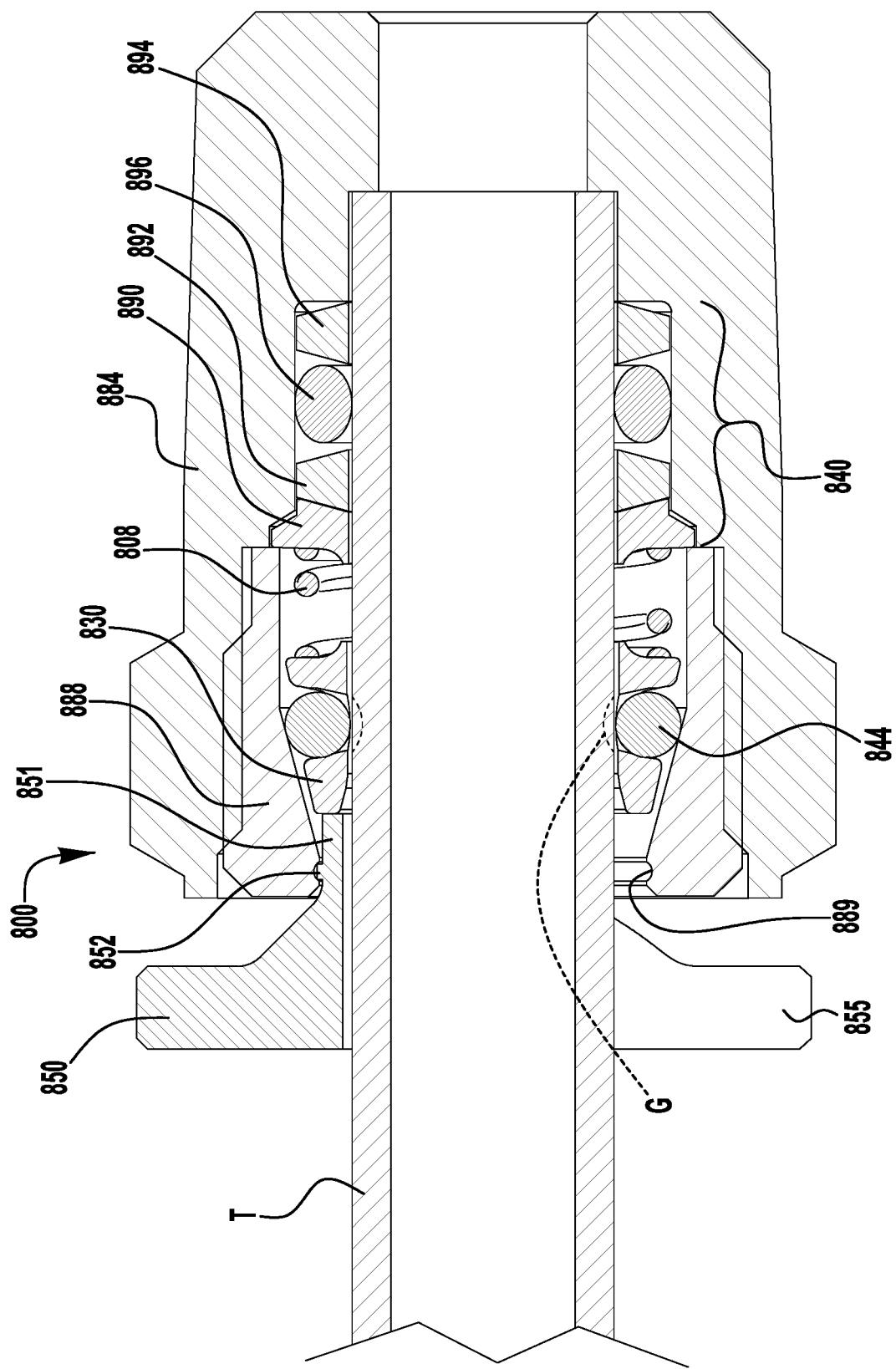

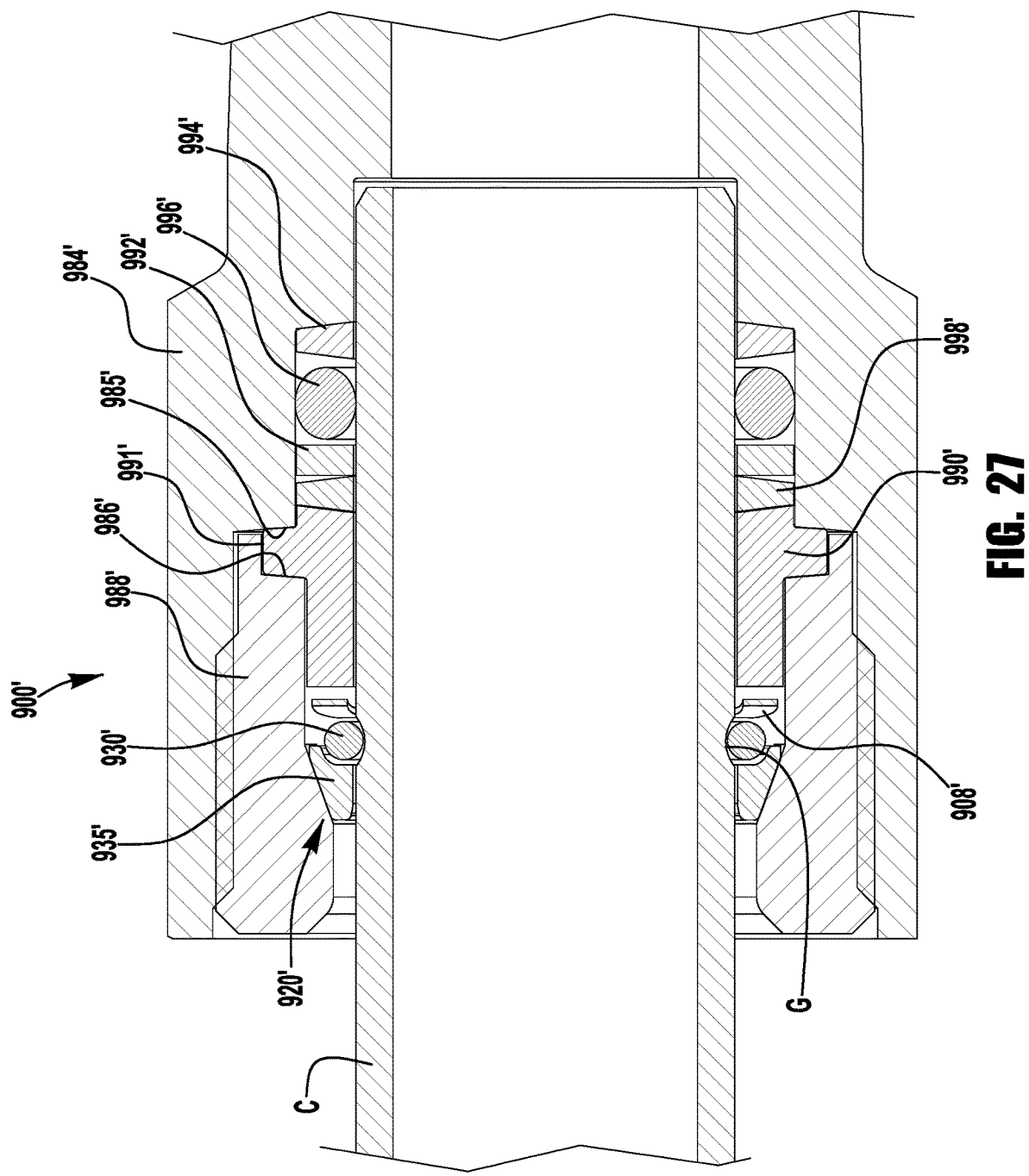

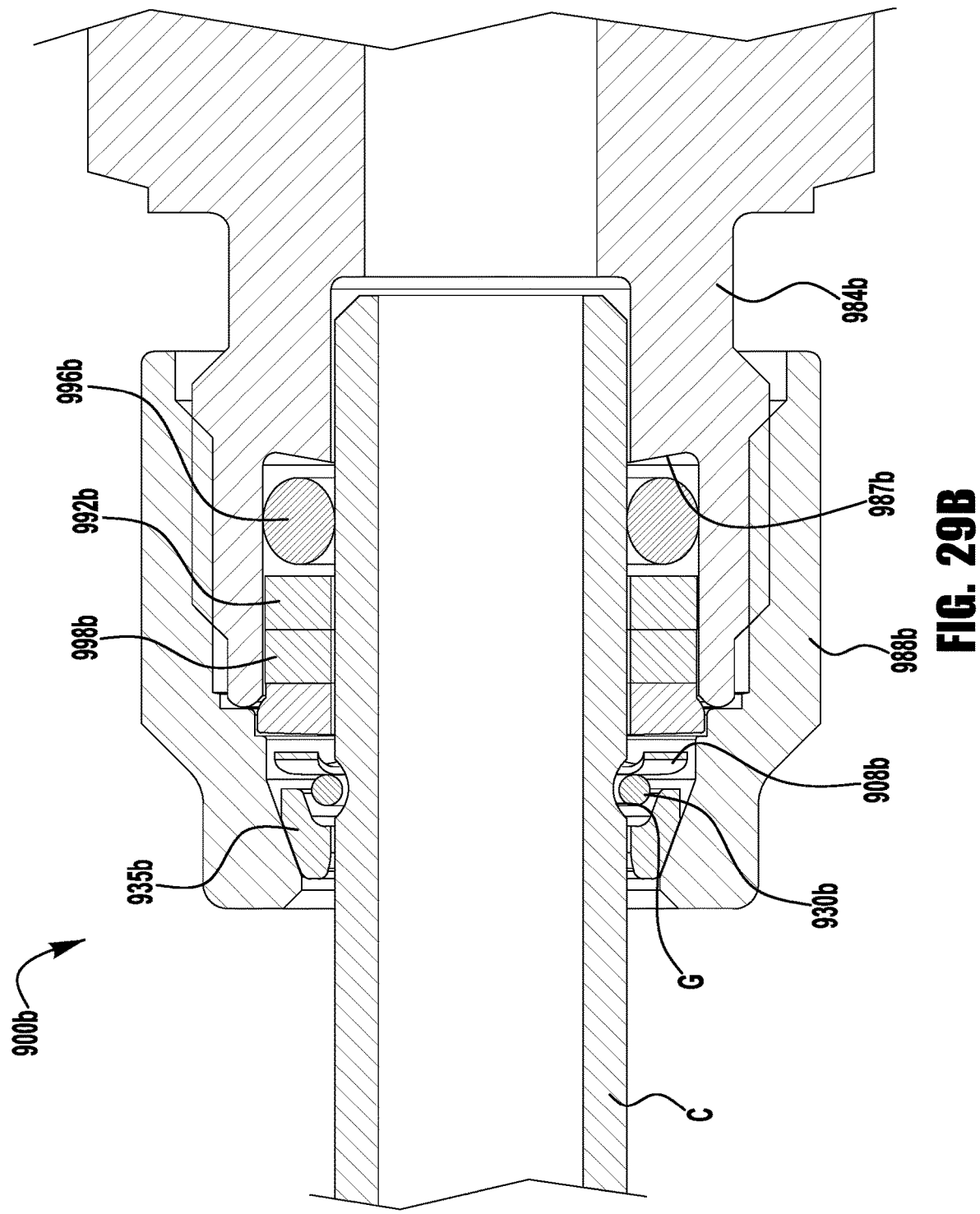

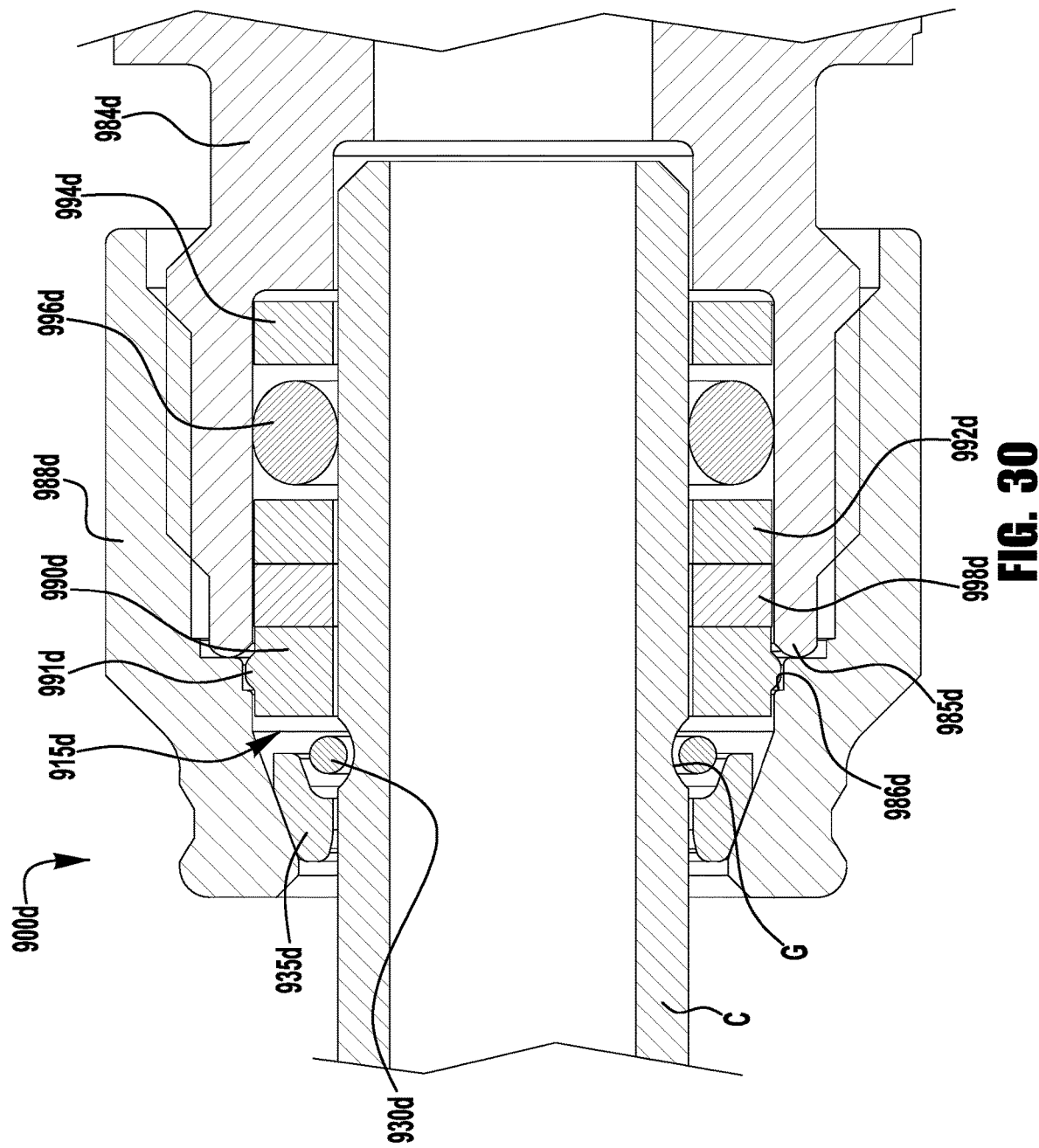

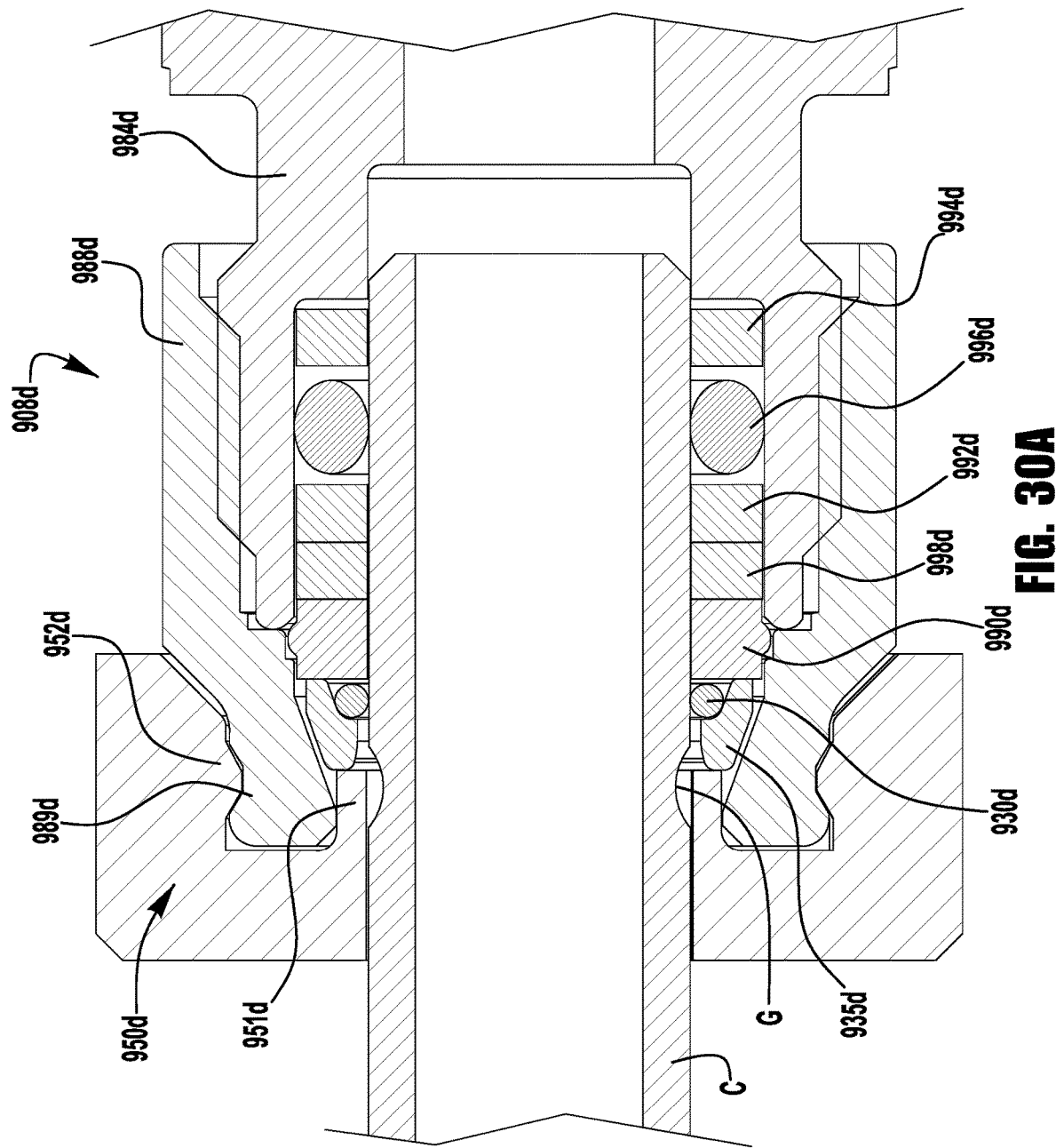

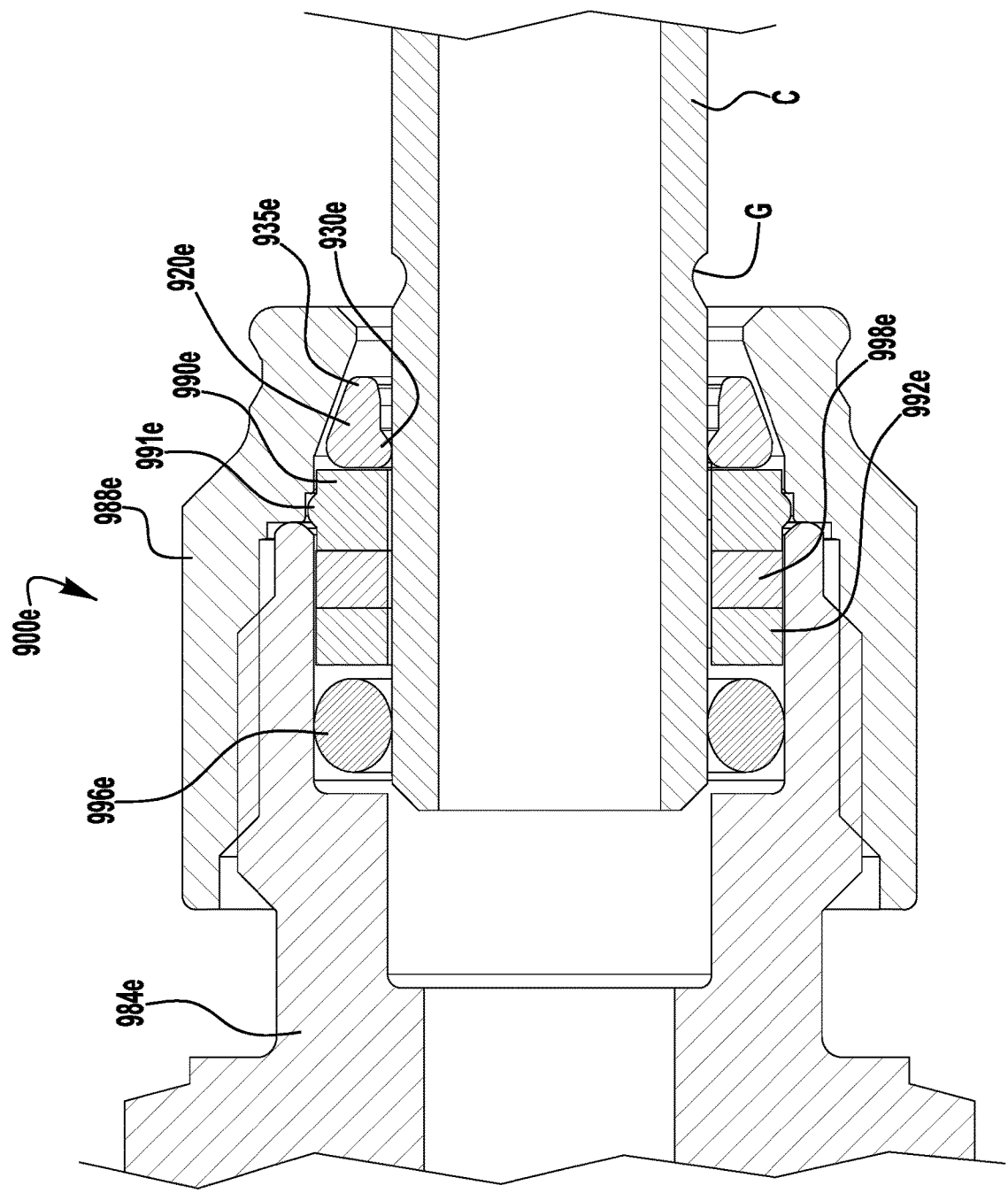

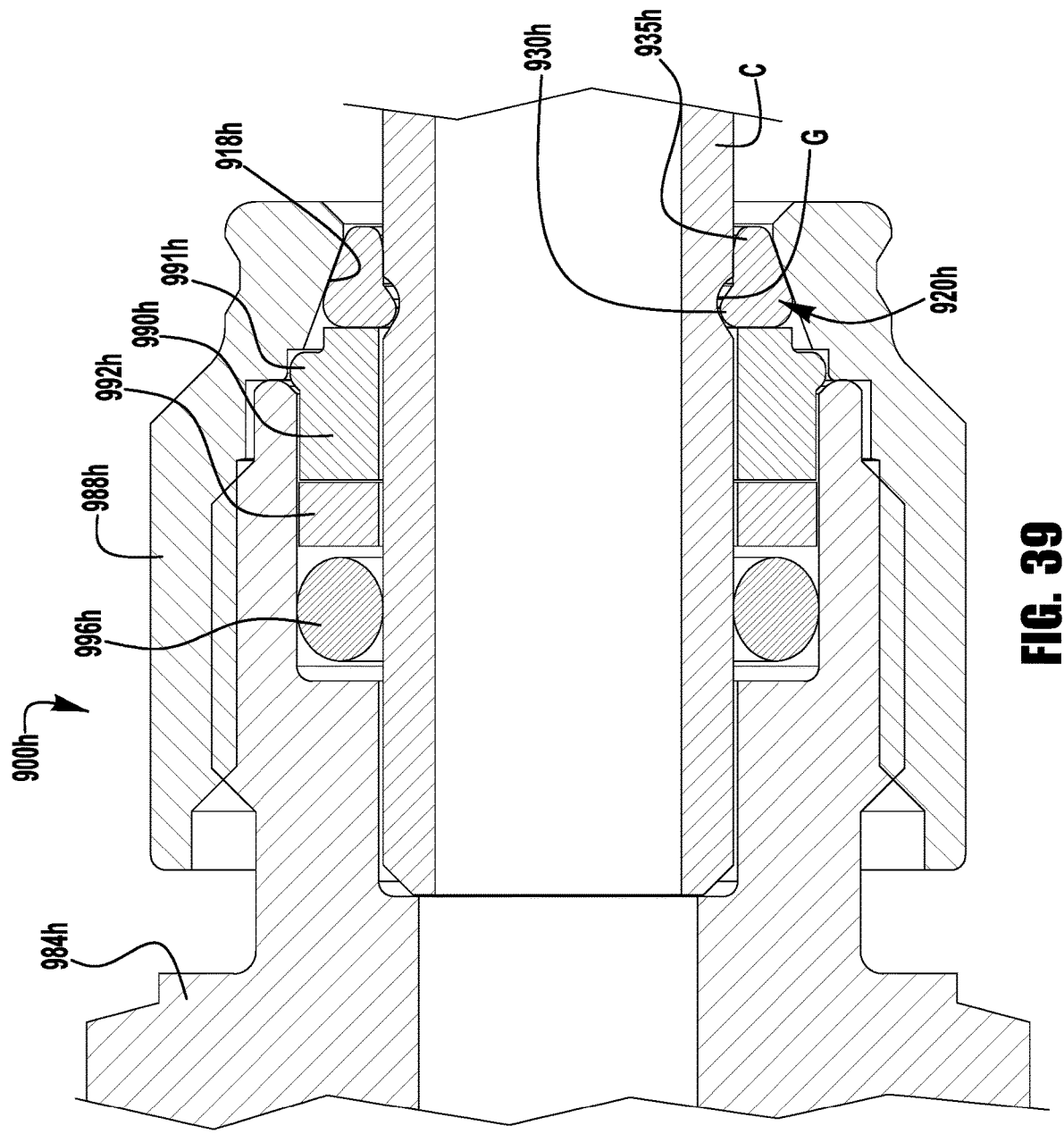

PUSH TO CONNECT CONDUIT FITTING ASSEMBLIES AND ARRANGEMENTS

CROSS-REFERENCE TO RELATED APPLICATION

This application claims priority to and all benefit of U.S. Provisional Patent Application Ser. No. 62/827,302, filed on Apr. 1, 2019, entitled PUSH TO CONNECT CONDUIT FITTING ASSEMBLIES AND ARRANGEMENTS, the entire disclosure of which is incorporated herein by reference.

TECHNICAL FIELD OF THE DISCLOSURE

The inventions relate generally to fittings for conduits such as tube and pipe. More particularly, the inventions relate to fittings that provide single action push to connect operation.

SUMMARY

According to an exemplary embodiment of the present disclosure, a push to connect fitting includes first and second fitting components, a sealing arrangement, a gripping arrangement, and a colleting ring. The first fitting component has an outboard end that is adapted to receive a conduit end. The second fitting component is joined to the first fitting component to define an interior cavity. The sealing arrangement, disposed in the interior cavity, seals one of the first and second fitting components with an outer surface of a conduit end when the conduit end is inserted into the outboard end of the first fitting component. The gripping arrangement is disposed in the interior cavity, and the colleting ring is disposed in the interior cavity and has an inboard end surface engaging an outboard end surface of the gripping arrangement.

According to another exemplary embodiment of the present disclosure, a push to connect fitting assembly includes a conduit having an end portion with a circumferential groove, a first fitting component having an outboard end receiving the conduit end portion, a second fitting component joined to the first fitting component to define an interior cavity, and a sealing arrangement and a conduit retaining arrangement disposed in the interior cavity. The sealing arrangement seals one of the first and second fitting components with an outer surface of a conduit end portion. The conduit retaining arrangement includes a gripping portion received in the circumferential groove, and a colleting portion engaging an interior tapered surface of the second fitting component at least when the conduit is subjected to one of a pulling force and a fluid pressure force. At least one of the gripping portion and the colleting portion is defined by a split ring.

According to another exemplary embodiment of the present disclosure, a conduit end preparing tool includes a body, a conduit deforming roller, a gripping member, a clamping member, and a conduit positioning arrangement. The conduit deforming roller is rotationally supported by the body and includes at least one of a groove forming rib and a conduit marking ridged ring. The gripping member includes a conduit engaging roller and is slideably mounted to the body for engagement of the conduit engaging roller with a conduit inserted between the conduit deforming roller and the conduit engaging roller. The clamping member is threadably retained with the body and adjustable for clamping engagement with the gripping member to clamp the inserted conduit between the groove forming roller and the conduit engaging rollers. The conduit positioning arrangement is secured with the body and configured to engage an end portion of the inserted conduit to axially position the end portion of the inserted conduit with respect to the at least one of the groove forming rib and the conduit marking ridged ring.

According to another exemplary embodiment of the present disclosure, a push to connect fitting includes first and second fitting components assembled to define an internal cavity enclosing a conduit retaining arrangement axially movable between a conduit gripping position and a conduit releasing position, and a conduit releasing insert including a fitting interlocking feature releasably engaging the second fitting component, and a releasing feature engaging the conduit retaining arrangement to secure the conduit retaining arrangement in a conduit releasing position against axial outboard movement. Removal of the conduit releasing insert, by disengaging the fitting interlocking feature from the second fitting component, permits spring biased movement of the conduit retaining arrangement to the conduit gripping position.

According to another exemplary embodiment of the present disclosure, a push to connect fitting includes a first and second fitting components, a sealing arrangement, a retainer and a spring member. The first fitting component has an outboard end that is adapted to receive a conduit end, and the second fitting component is joined to the first fitting component to define an interior cavity. The sealing arrangement is disposed in the interior cavity and axially movable between an inboard limit position and an outboard limit position, and includes a seal member that seals one of the first and second fitting components with an outer surface of a conduit end when the conduit end is inserted into the outboard end of the first fitting component. The sealing arrangement is axially movable between an inboard limit position and an outboard limit position. The retainer is assembled with at least one of the first and second fitting components, and includes a gripping portion that engages the inserted conduit end. The spring member is disposed between the retainer and the sealing arrangement to bias the retainer in an outboard direction toward a conduit gripping position in which the gripping portion engages a tapered interior surface of the second fitting component, the spring member further biasing the sealing arrangement toward the inboard limit position. The sealing arrangement further includes a gland having an axially extending tail portion extending through the spring member, such that engagement of the tail portion with the retainer defines the outboard limit position to limit axial compression of the spring member.

According to another exemplary embodiment of the present disclosure, a push to connect fitting includes a first fitting component having an outboard end that is adapted to receive a conduit end and a second fitting component joined to the first fitting component to define an interior cavity. A sealing arrangement is disposed in the interior cavity to seal one of the first and second fitting components with an outer surface of a conduit end when the conduit end is inserted into the outboard end of the first fitting component. A conduit gripping arrangement is disposed in the interior cavity. A conduit colleting arrangement is disposed in the interior cavity outboard of the conduit gripping arrangement. A spring member is disposed between the conduit gripping arrangement and the sealing arrangement to bias the conduit gripping arrangement in an outboard direction toward a conduit gripping position. The sealing arrangement is configured to apply a fluid pressure driven load to the conduit colleting arrangement without applying a fluid pressure driven load to the conduit gripping arrangement.

According to another exemplary embodiment of the present disclosure, a push to connect fitting includes a first fitting component having an outboard end that is adapted to receive a conduit end, a second fitting component joined to the first fitting component to define an interior cavity, and a sealing arrangement and conduit retaining arrangement disposed in the interior cavity. The sealing arrangement includes a seal member that seals the first fitting component with an outer surface of a conduit end when the conduit end is inserted into the outboard end of the first fitting component. The conduit retaining arrangement includes an annular retainer body and a plurality of conduit gripping members retained in a plurality of cavities in the retainer body. Each of the plurality of conduit gripping members comprises an oblong member having a central longitudinal axis that extends tangent to an outer circumference of the annular retainer body.

These and additional aspects and embodiments of the inventions will be understood by those skilled in the art from the following detailed description of the exemplary embodiments in view of the accompanying drawings.

BRIEF DESCRIPTION OF THE DRAWINGS

FIG. 11 is a side cross-sectional view of a push to connect fitting, shown assembled with a conduit end, according to another exemplary embodiment of the present disclosure, shown in an unpressurized condition;

FIG. 16 is a side cross-sectional view of another push to connect fitting, shown assembled with a conduit end and with a conduit releasing insert tool, according to another exemplary embodiment of the present disclosure;

FIG. 27 is a cross-sectional view of a push to connect fitting, shown assembled with a grooved conduit end in an unpressurized condition, according to an exemplary embodiment of the present disclosure;

FIG. 29B is a cross-sectional view of a push to connect fitting, shown assembled with a grooved conduit end in an unpressurized condition, according to another exemplary embodiment of the present disclosure;

FIG. 30 is a cross-sectional view of a push to connect fitting, shown assembled with a grooved conduit end in an unpressurized condition, according to another exemplary embodiment of the present disclosure;

FIG. 30A is a cross-sectional view of the push to connect fitting of FIG. 30, shown assembled with a conduit releasing insert tool, according to another exemplary embodiment of the present disclosure;

FIG. 32 is a cross-sectional view of the push to connect fitting of FIG. 31, shown with a grooved conduit end partially installed in the fitting;

FIG. 39 is a cross-sectional view of the push to connect fitting of FIG. 38, shown with the fitting nut adjusted to an installed position.

DETAILED DESCRIPTION OF EXEMPLARY EMBODIMENTS

Figure 1:
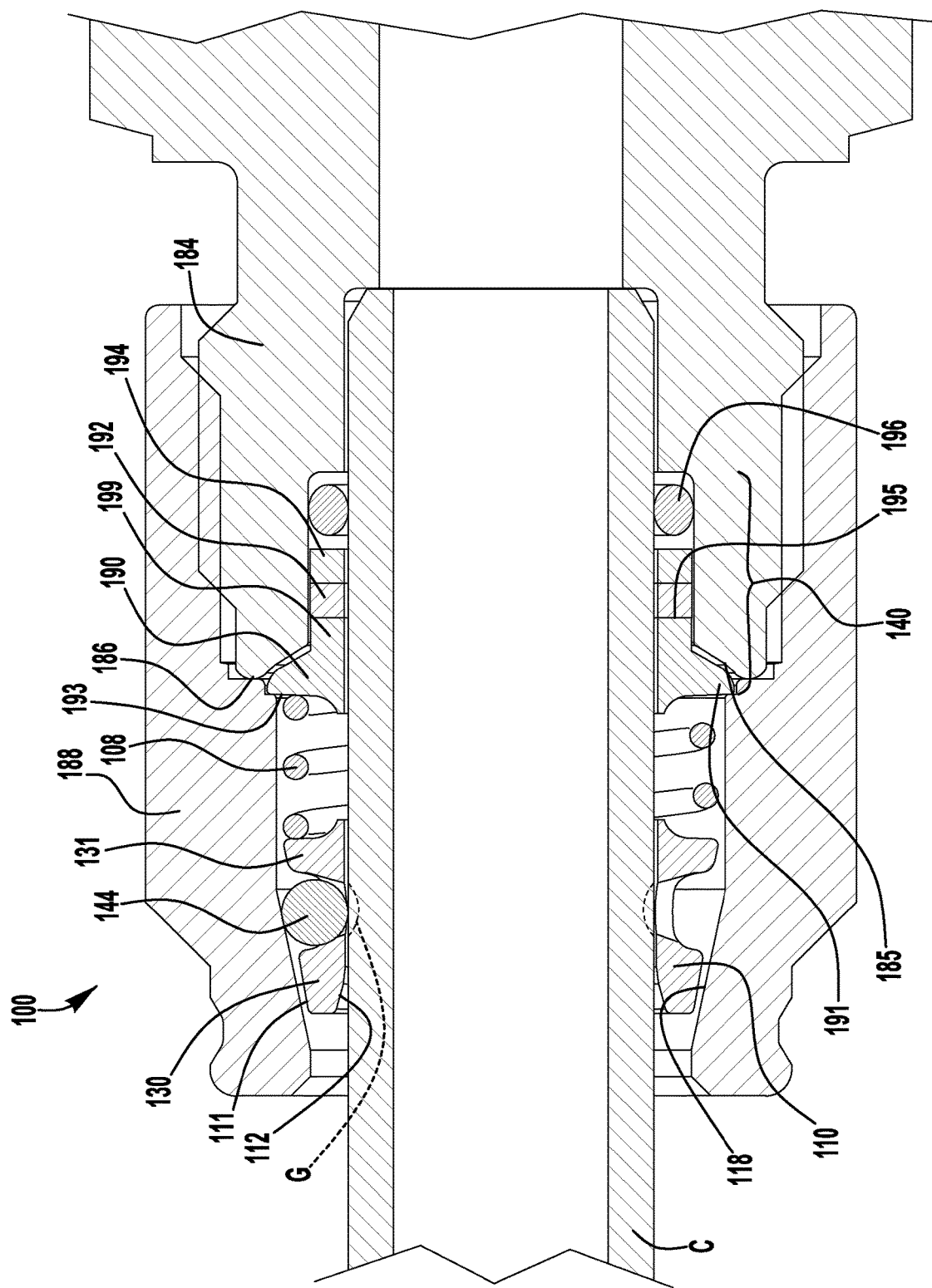
FIG. 1 is a side cross-sectional view of a push to connect fitting, shown assembled with a conduit end, according to an exemplary embodiment of the present disclosure.

Herein, the terms fitting and fitting assembly are used interchangeably. In various exemplary embodiments, a fitting assembly structure as taught herein is separately claimed as an invention without requiring the conduit to be part of the fitting assembly, and further without requiring that the various parts be in a fully assembled condition (such as may be the case, for example, of the assembly parts being shipped from a manufacturer or distributor). In at least one embodiment, a fitting assembly includes a first fitting component or subassembly having a conduit sealing arrangement and a second fitting component or subassembly having a conduit retaining arrangement. In any of the embodiments described herein, the conduit does not require treatment or modification from stock condition, although optionally such may be done if needed in particular applications. For example, it is common for the conduit end to be cut substantially perpendicular to the conduit longitudinal axis and deburred as needed, but even these common steps are optional and not required to achieve conduit grip and fluid tight seal. By stock condition is meant that the conduit may be a conventional hollow right cylinder having a cylindrical inner surface that may be exposed to fluid (for example, liquid, gas or other flowable material) contained by the conduit, and a cylindrical outer surface, with a wall thickness defined as the difference between the inner diameter and the outer diameter of the conduit. The conduit may be made of any material, is preferably metal, and more preferably is a stainless steel alloy, but the inventions are not limited to these exemplary materials and other alternative materials may be used as needed for particular applications. Although traditional hollow cylindrical conduits are preferred, other conduit shapes and geometry may alternatively be used for either the outer wall or inner wall or both walls of the conduit. The word conduit herein refers to traditional tube and pipe but also includes other hollow fluid carrying structures that might be referred to by another word other than tube or pipe.

We also use the terms inboard and outboard for reference purposes only. By inboard we mean towards the center or closed end of the fitting assembly or fitting component along the reference axis, and by outboard we mean away from the center or towards the open end of the fitting assembly or fitting component along the reference axis.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

The present disclosure describes exemplary fitting assemblies that provide for or allow push to connect operation, including, for example, single action push to connect operation. By single action is meant that a conduit, and in particular the end portion of the conduit end, can be inserted into the fitting assembly with a single dimensional or directional movement or action, and when fully inserted the conduit is sealed against fluid pressure and is retained in position. The axial insertion may be performed manually or by a tool or machine. By push to connect is meant that the single action may be a simple axial movement or push along the longitudinal axis of the conduit and that this single action may be the only action needed to complete the mechanical connection between the conduit and the fitting assembly, with no subsequent or additional motion or action needed to complete the mechanical connection and fluid tight seal. In an exemplary embodiment, the single directional action or movement is an axial movement along a longitudinal axis of the conduit, with no other or additional or subsequent manual or tool action or movement of the fitting assembly components needed to achieve conduit seal and retention. Thus, a single action push to connect fitting is distinguished from a traditional fitting assembly that typically is pulled-up or tightened to effect conduit grip and seal by relative movement of the fitting assembly components after insertion of the conduit; for example, a body and a nut that are joined by a threaded mechanical connection and pulled-up by relative rotation of the body and nut, or by being clamped together without a threaded mechanical connection. In other embodiments, an additional, non-pull up operation may be utilized to complete the connection.

Herein, the terms axis or axial and derivative forms thereof refer to a longitudinal axis along which a conduit C will be inserted and retained. Reference to radial and radial direction and derivative terms also are relative to the axis unless otherwise noted. In the illustrated embodiments, the axis may be the central longitudinal axis of the conduit C which also may but need not correspond with or be coaxial with the central longitudinal axis of the fitting assembly. The conduit C may be any conduit that defines a flow path for system fluid that is contained by the conduit C and the fitting. The inventions and embodiments described herein are particularly suitable for metal conduit such as metal pipe or tube, however, non-metal conduits may also be used as needed. The conduit C may have any range of diameter size, for example, $\frac{1}{16}$th inch or less to 3 inches or greater in diameter and may be in metric or fractional sizes. The conduit C may also have any range of wall thickness that allows for an axial insertion into the fitting assembly.

The fitting assembly may include two discrete sections or subassemblies, for example, to retain one or more gripping, sealing, and/or colleting components therein or therebetween. In an embodiment, the fitting assembly may include a first fitting component or subassembly and a second fitting component or subassembly. The first fitting component and the second fitting component may be joinable or mate together in any manner suitable for the application or use of the fitting assembly. For example, the first fitting component and the second fitting component may be joinable together using a threaded mechanical connection. Many other mechanical connections may alternatively be used, including but not limited to a clamped connection or bolted connection or crimped connection, to name three examples, or non-mechanical connections may be used, for example, a weldment.

Exemplary push to connect fitting assemblies are described in co-owned U.S. Pat. No. 10,458,582 (the "'582 Patent"), the entire disclosure of which is incorporated herein by reference.

In several of the push to connect fitting assemblies of the above incorporated '582 Patent, fluid pressure acts against a seal member which axially applies, through glands and backup rings, an outward load or biasing force against a retainer body or retainer body, to bias the gripping portion (e.g., balls or other discrete gripping members) toward gripping engagement with the conduit, and to bias the colleting portion toward colleting engagement with the conduit. In some such applications, where the biasing spring is disposed axially between the sealing arrangement (e.g., the gland of the sealing arrangement) and the retainer body, the fluid pressure may be sufficient to fully compress a biasing spring, which may result in overstressing of the spring and/or a permanent set of the spring, potentially affecting service life of the spring. Additionally, the extended, and potentially inconsistent range of compression of the spring may require that the gland be provided with an elongated inboard nose portion (and that the fitting be provided with an elongated space to accommodate this nose portion), to ensure that the soft components of the sealing arrangement (e.g., O-rings and back-up rings) remain in the seal retaining counterbore.

Figure 2:
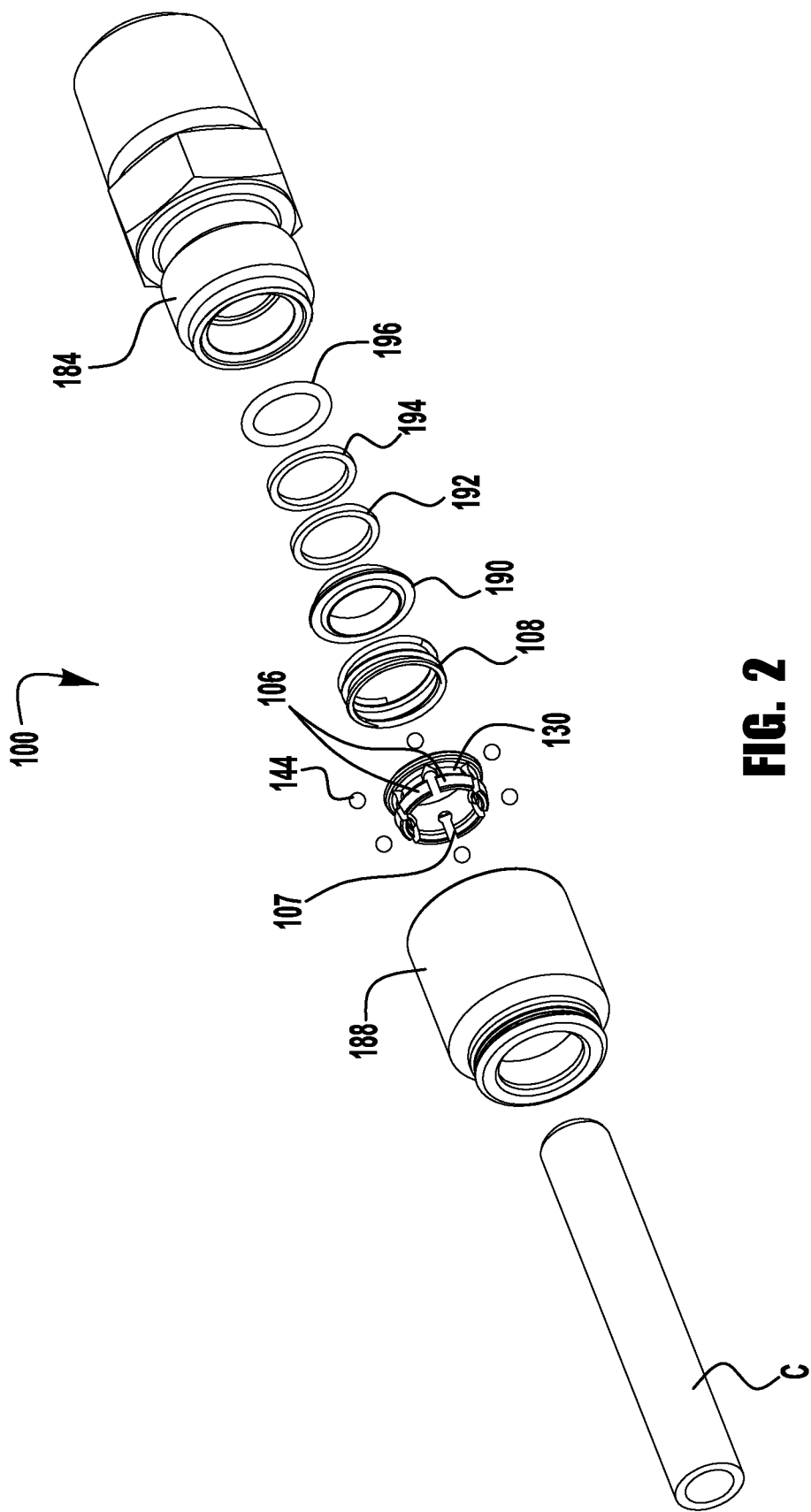
FIG. 2 is an exploded perspective view of the push to connect fitting of FIG. 1.

According to an exemplary aspect of the present disclosure, a push to connect fitting assembly may be adapted to axially fix the outermost component of the sealing arrangement (e.g., the gland) to prevent fluid pressure driven compression of the spring. FIGS. 1 and 2 illustrate an exemplary push to connect fitting 100 having a male threaded body 184 and a female threaded nut 188 assembled to enclose a retaining arrangement 120 and a sealing arrangement 140, and to receive a conduit end C for retention (e.g., gripping and colleting retention) by the retaining arrangement and sealing engagement with the fitting, via the sealing arrangement.

Figure 2A:
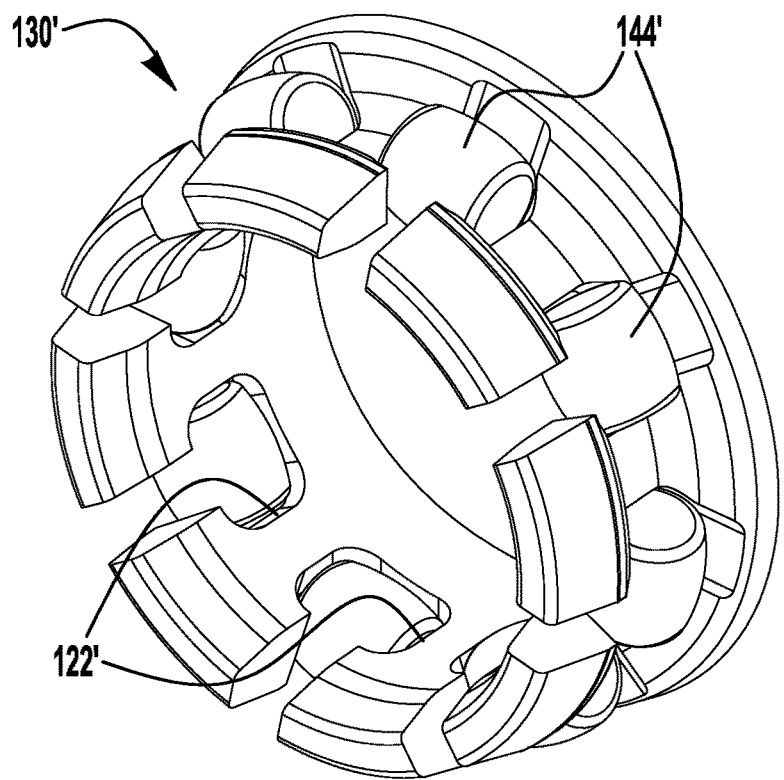
FIG. 2A is a perspective view of a retainer body and gripping members for a push to connect fitting, according to an exemplary embodiment of the present disclosure.
Figure 2B:
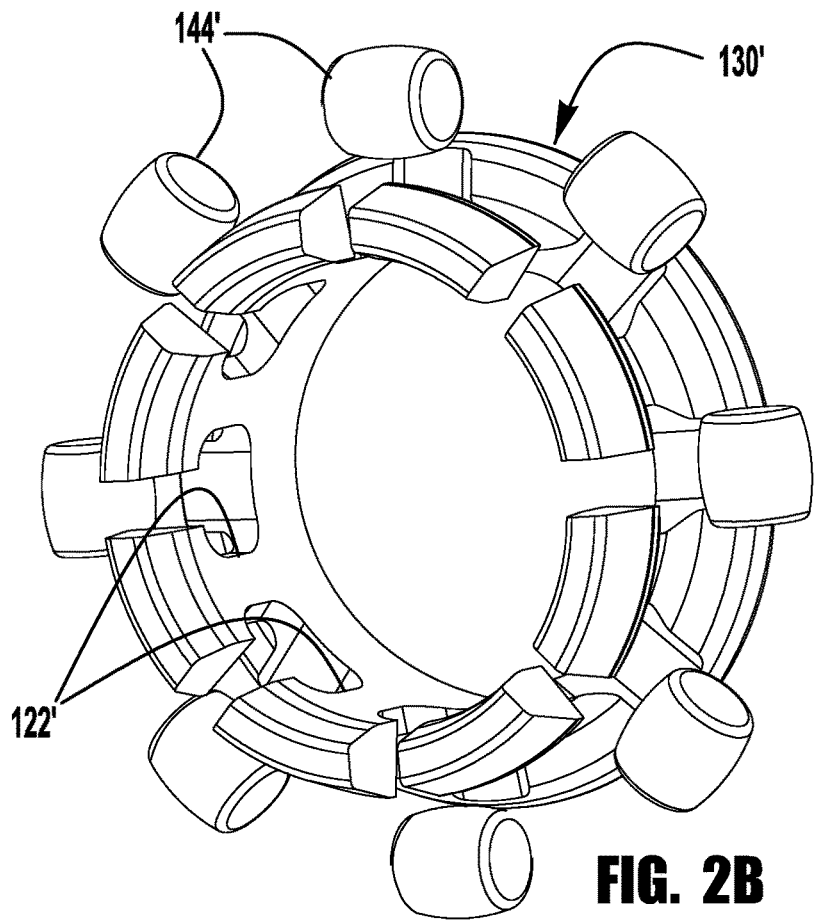
FIG. 2B is an exploded perspective view of the retainer body and gripping members of FIG. 2A.

The exemplary retaining arrangement 120 includes a retainer body or carrier 130 defining cavities 122 that receive conduit gripping members 144 and a biasing member 108 (e.g., coil spring). In the embodiment of FIGS. 1 and 2, the conduit gripping members are discrete spherical balls retained in the cavities 122. In other embodiments, other shapes of conduit gripping members may be utilized. FIGS. 2A and 2B illustrate an alternative embodiment of a retainer body 130' having cavities 122' that receive oblong conduit gripping members 144', arranged such that a central longitudinal axis of each gripping member extends tangent to an outer circumference of the annular retainer body. In the illustrated example, the oblong conduit gripping members 144' are generally cylindrical or barrel-shaped, with an outer surface having a convex longitudinal profile. The barrel-shaped gripping members 144' may, for example, reduce indentation or deformation of the conduit by provided an extended contact surface (as compared to a spherical ball). Additionally, if the installed conduit end is subjected to twisting or rotational forces, the barrel-shaped gripping members 144' may tend to cant radially outward, effectively increasing the radial span of the gripping members to resist rotation of the conduit within the fitting.

Referring back to FIGS. 1 and 2, the exemplary sealing arrangement 140 includes a gland 190, backup rings 192, 194, and a seal member 196 (e.g., O-ring or other such gasket). The exemplary gland 190 includes an outwardly protruding end 191 that is secured between an inner lip or shoulder 186 of the nut 188 and an end portion 185 of the body 184 to axially fix the gland 190, thereby preventing fluid pressure driven compression of the spring 108. Due to this fixed condition, an inboard nose portion 199 of the gland may be shortened, and the counterbore receiving the nose portion 199, backup rings 192, 194 and seal member 196 may also be shortened.

The exemplary retainer body 130 positions and retains the gripping members 144 in axial alignment with a tapered surface 118 formed in the female threaded nut 188, and radially between the tapered surface and the outer surface of the inserted conduit C. The retainer body 130 includes at a first end a flange 131 that faces inboard to engage with the biasing member 108. The biasing member 108 is positioned in compression between the flange 131 and an outboard facing surface 193 of the gland 190. The gland 190 presents an inboard facing end surface 195 that engages one or more seal backing ring 192, 194 disposed between the gland 190 and an inner seal 196, which may be realized in the form of an O-ring for example.

We refer to this configuration as an embodiment of an inverted colleting gripping member lock concept because the biasing member 108 applies an axial force against the retainer body 130 to engage the gripping members 144 with the tapered surface 118 without placing an axial load on the inner seal 196 and minimizing radial interference between the conduit C and the inner seal 196 which could otherwise cause damage to the seal, for example during conduit insertion.

The exemplary retainer body 130 may also provide a colleting function. As shown, the retainer body 130 may include an annular body portion having a plurality of preferably circumferentially evenly spaced flexible members 106 that extend axially from the flange 131 and with axial slots 107 therebetween. These flexible members 106 preferably extend in a cantilevered fashion from the flange 131 so as to have radial flexibility. At the distal end of each flexible member 106 is a tab 110 having a radially outer tab land or end portion 111, and a radially inner colleting surface 112 positioned to make direct contact with the outside surface of the conduit C as further described below. Because the retainer body is annular, each flexible member 106 may have a curvature that coincides with the overall annular shape of the retainer body. Therefore, preferably but not necessarily, each colleting surface 112 is a curved surface that preferably but not necessarily coincides with the curvature of the conduit C, at least when the land 111 is radially pressed against the conduit outer surface.

The tab colleting surfaces 112 provide the conduit colleting function at a position that is axially between the source of vibration and flexure into the conduit and the stress locations for the gripping members 144 gripping and indenting into the conduit C. It will be noted that the tabs 110 become wedged between the tapered surface 118 and the outer surface of the conduit C and radially compressed against the conduit outer surface. This colleting function provides conduit support, isolation or reduction of the conduit vibration and flexure, and reduces or limits additional indentation of the gripping members 144 into the conduit C.

When under pressure, the pressurized fluid applies an axial load against the conduit end C which places an axial load on the retainer body 130. In the unpressurized condition, there may be a small radial gap between the tab lands 111 and the tapered surface 118, and/or a small radial gap between the tab colleting surfaces 112 and the conduit C. Under pressure, the gripping members 144 indent into the conduit surface allows the retainer body 130 to shift axially slightly so that the tabs 110 contact the tapered surface 118 and begin to collet against the conduit outer surface. The colleting action restrains further axial movement of the retainer body 130, supports the conduit, adds rigidity to the fitting assembly 100 and isolates or reduces the effects of vibration and flexure of the conduit on the stress regions of the gripping members 144 against the conduit C.

Figure 3:
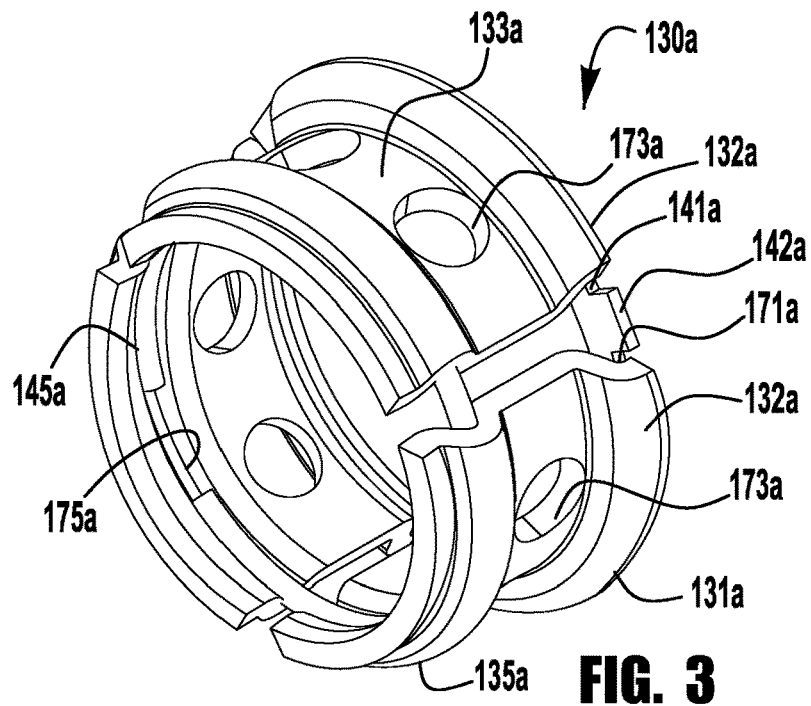
FIG. 3 is a perspective view of a retaining arrangement for a push to connect fitting, according to an exemplary embodiment of the present disclosure.
Figure 3A:
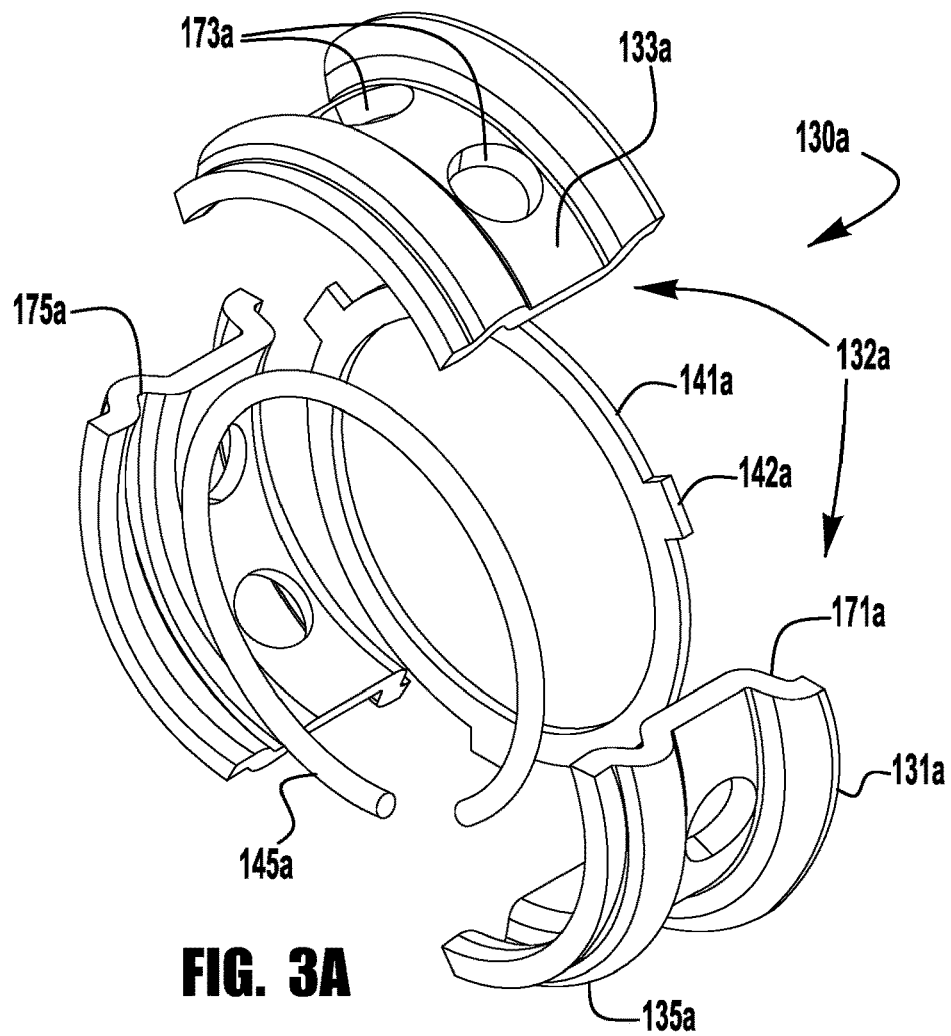
FIG. 3A is an exploded perspective view of the retainer body of FIG. 3.

Other retainer body or carrier arrangement may additionally or alternatively be utilized. According to another aspect of the present disclosure, a multiple section retainer body may include sections that are circumferentially spaced from each other by longitudinal gaps, such that the sections may be more readily flexed radially inward, as compared to tabs cantilevered from an integral circumferential base ring of a carrier or retainer body. FIGS. 3 and 3A illustrate an exemplary retainer body 130a having a plurality of arcuate segments 132a each having a gripping member retaining web portion 133a (including openings 173a for retaining gripping members) extending between an inboard flange portion 131a and an outboard colleting tab portion 135a. A support ring 141a is received in a recessed portion 171a of the inboard flange 131a with tabs 142a extending between the adjacent segments 132a, to maintain a radial expanded position and circumferential spacing of the inboard flange portions 131a. A split ring 145a is received in a recessed portion 175a of the colleting tabs 135a to allow for radial contraction of the colleting tabs against an installed conduit when the retainer body 130a is biased against the tapered surface of a fitting nut (e.g., the fitting nut 188 of FIG. 1). The retainer body 130a may be installed in a male configuration fitting (e.g., any of the exemplary male configuration fittings described herein or in the above-incorporated '582 Patent), in a female configuration fitting (e.g., any of the exemplary female configuration fittings described herein or in the above-incorporated '582 Patent), or in a fitting having non-threaded (e.g., crimped) components.

The retainer body segments 132a may be produced using any of a variety of suitable methods, including, for example, stamping, powdered metallurgy (PM), metal injection molding (MIM), and additive manufacturing. As shown, the retainer body segments 132a may have a substantially constant cross-sectional thickness to facilitate manufacture from strip or sheet metal (e.g., by bending an inboard end to form the inboard flange portion 131a, and by bending an outboard end to form a raised portion of the colleting tab 135a for engagement with the tapered surface of the fitting). While the exemplary retainer body 130a includes three segments 132a each configured to retain two gripping members, any suitable number of retainer body segments may be utilized to retain any suitable number of gripping members.

Figure 4:
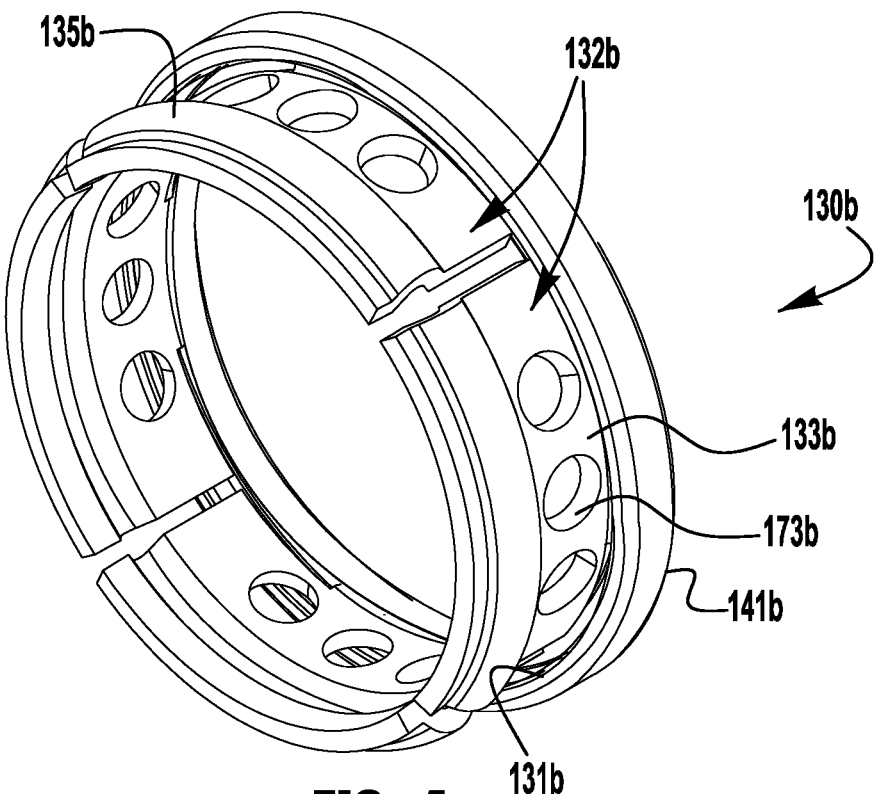
FIG. 4 is a perspective view of a retaining arrangement for a push to connect fitting, according to another exemplary embodiment of the present disclosure.
Figure 4A:
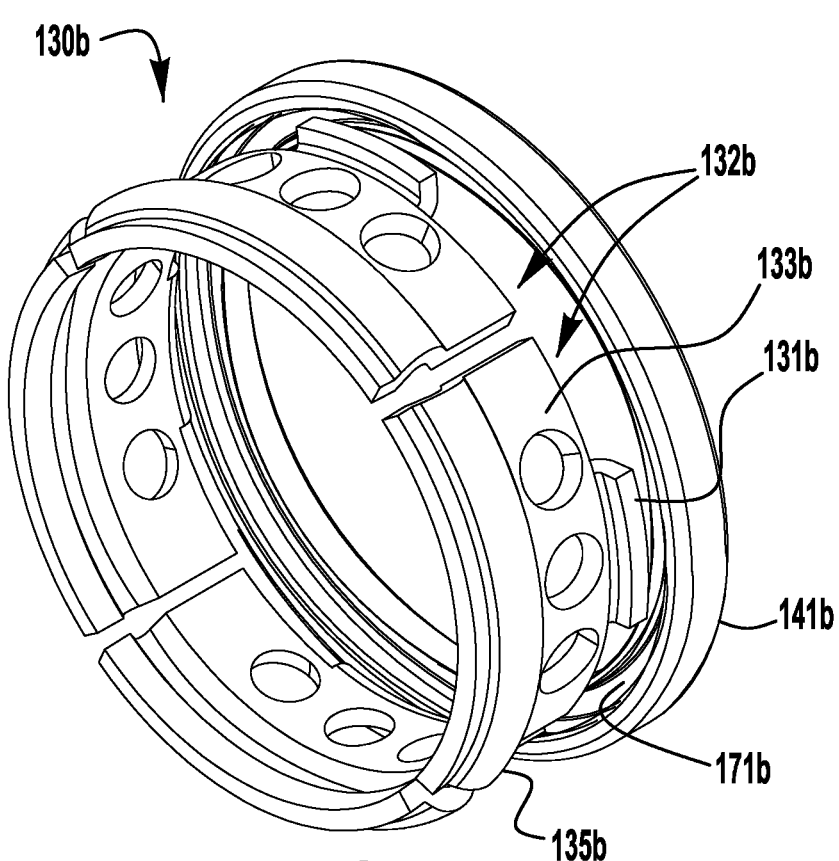
FIG. 4A is an exploded perspective view of the retainer body of FIG. 4.

FIGS. 4 and 4A illustrate another embodiment of a retainer body 130b having a plurality of arcuate segments 132b each having a gripping member retaining web portion 133b (including openings 173b for retaining gripping members) extending between an inboard flanged tab portion 131b and an outboard colleting tab portion 135b. A support collar 141b includes an annular recess 171b that receives and interlocks with the flanged tab portions 131b, to provide radial and axial positioning of the inboard ends of the retainer body segments 132b, while permitting radial contraction of the colleting tabs 135b against an installed conduit when the retainer body 130b is biased against the tapered surface of the fitting. The edges of the arcuate segments may be angled inwardly, to ensure gaps between the adjacent segments at the tab portions. While a tab end reinforcing split ring (e.g., similar to split ring 145a) may be included to outwardly bias the colleting tabs (not shown), in some embodiments, the flanged tab portions 131b may be tightly received in the collar recess 171b, such that the retainer body segments 132b resist radial inward movement. The retainer body segments 132b may be produced using any of a variety of suitable methods, including, for example, stamping, powdered metallurgy (PM), metal injection molding (MIM), and additive manufacturing. The retainer body 130b may be installed in a male configuration fitting (e.g., any of the exemplary male configuration fittings described herein or in the above-incorporated '582 Patent), in a female configuration fitting (e.g., any of the exemplary female configuration fittings described herein or in the above-incorporated '582 Patent), or in a fitting having non-threaded (e.g., crimped) components. As shown, the retainer body segments 132b may have a substantially constant cross-sectional thickness to facilitate manufacture from strip or sheet metal (e.g., by bending an inboard end to form the flanged tabs 131b, and by bending an outboard end to form a raised portion of the colleting tab 135b for engagement with the tapered surface of the fitting). While the exemplary retainer body 130b includes four segments 132b each configured to retain three gripping members, any suitable number of retainer body segments may be utilized to retain any suitable number of gripping members.

Figure 5:
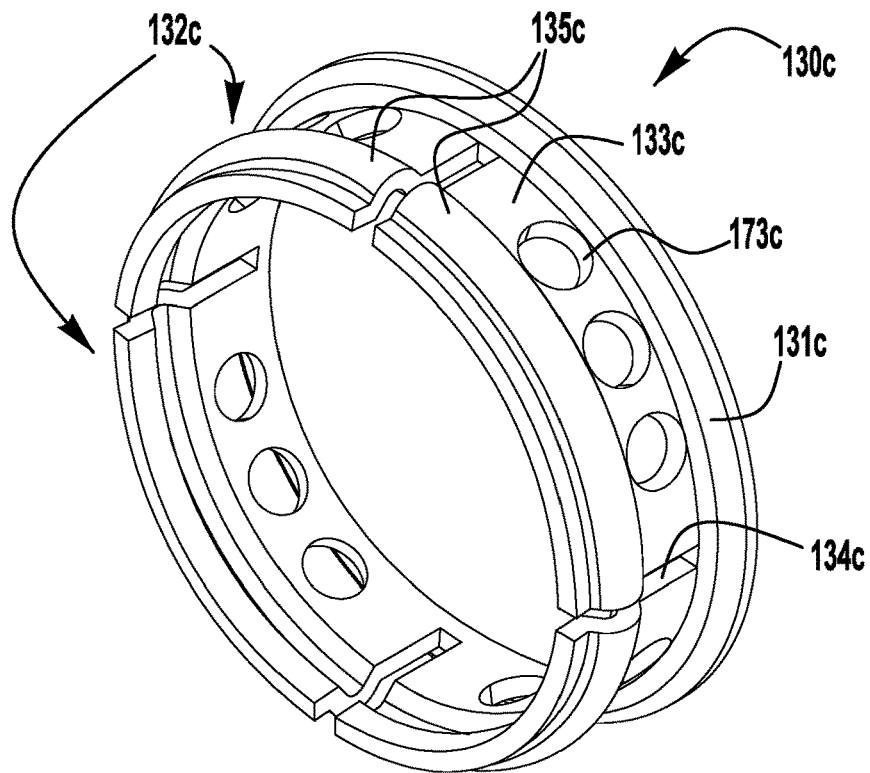
FIG. 5 is a perspective view of a retaining arrangement for a push to connect fitting, according to another exemplary embodiment of the present disclosure.

As shown in the embodiments of FIGS. 3, 3A, 4, and 4A, the retainer body segments 132a, 132b may provide colleting tab portions 135a, 135b that extend along substantially the entire arcuate length of the segment, thereby providing for increased surface contact with the colleted conduit, as compared, for example, to a ring of discrete conduit engaging components, such as balls, generally cylindrical (e.g., barrel-shaped) members, or flexing fingers. In other embodiments, a single piece retainer body may be provided with segmented portions providing similar elongated colleting tab portions. FIG. 5 illustrates an exemplary single piece retainer body 130c having a continuous circumferential inboard flange portion 131c and cantilevered arcuate retainer body segments 132c extending outboard from the flange portion, each including a gripping member retaining web portion 133c (including openings 173c for retaining gripping members) extending to an outboard colleting tab portion 135c. The segments 132c are circumferentially spaced by slots 134c having a width and length selected to permit sufficient flexible contraction of the tab portions 135c against an installed conduit when the retainer body 130c is biased against the tapered surface of the fitting. The retainer body 130c may be installed in a male configuration fitting (e.g., any of the exemplary male configuration fittings described herein or in the above-incorporated '582 Patent), in a female configuration fitting (e.g., any of the exemplary female configuration fittings described herein or in the above-incorporated '582 Patent), or in a fitting having non-threaded (e.g., crimped) components. The retainer body 130c may be produced using any of a variety of suitable methods, including, for example, deep drawing or forming, powdered metallurgy (PM), metal injection molding (MIM), and additive manufacturing. As shown, the retainer body 130c may have a substantially constant cross-sectional thickness to facilitate manufacture by deep drawing or forming (e.g., by bending an inboard end to form the inboard flange portion 131c, and by bending an outboard end to form a raised portion of the colleting tab 135c for engagement with the tapered surface of the fitting). While the exemplary retainer body 130c includes four segments 132c each configured to retain three gripping members, any suitable number of retainer body segments may be utilized to retain any suitable number of gripping members.

Figure 6:
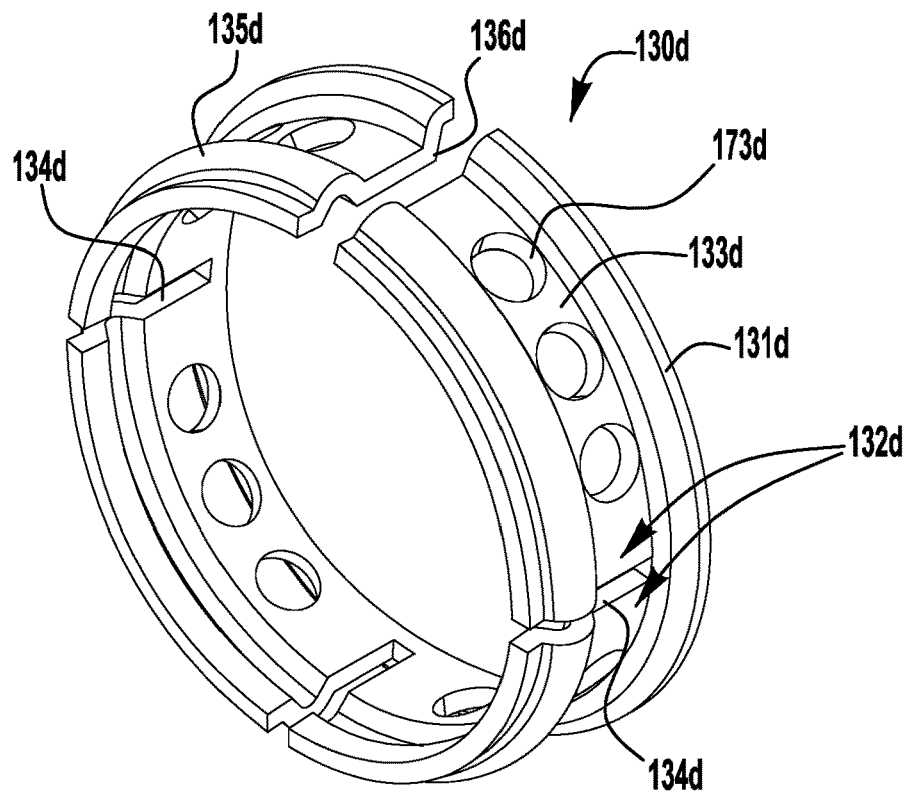
FIG. 6 is a perspective view of a retaining arrangement for a push to connect fitting, according to another exemplary embodiment of the present disclosure.

According to another aspect of the present disclosure, a retainer body with segmented colleting tabs may be formed as a split ring, thereby providing for colleting contraction of the tabs both by radial flexing contraction of each tab, and by reduction of the split ring diameter (i.e., by narrowing the gap in the split ring). FIG. 6 illustrates an exemplary single piece retainer body 130d, split to define a gap 136d and having an inboard flange portion 131d and cantilevered arcuate retainer body segments 132d extending outboard from the flange portion, each including a gripping member retaining web portion 133d (including openings 173d for retaining gripping members) extending to an outboard colleting tab portion 135d. The segments 132d are circumferentially spaced by slots 134d having a width and length selected, in combination with the width of the gap 136d, to permit sufficient flexible contraction of the tab portions 135d against an installed conduit when the retainer body 130d is biased against the tapered surface of the fitting. The retainer body 130d may be installed in a male configuration fitting (e.g., any of the exemplary male configuration fittings described herein or in the above-incorporated '582 Patent), in a female configuration fitting (e.g., any of the exemplary female configuration fittings described herein or in the above-incorporated '582 Patent), or in a fitting having non-threaded (e.g., crimped) components. The retainer body 130d may be produced using any of a variety of suitable methods, including, for example, stamping and roll forming, powdered metallurgy (PM), metal injection molding (MIM), and additive manufacturing. As shown, the retainer body 130d may have a substantially constant cross-sectional thickness to facilitate manufacture from strip or sheet metal (e.g., by bending an inboard end to form the flange portion 131d, by bending an outboard end to form a raised portion of the colleting tabs 135d for engagement with the tapered surface of the fitting, and roll forming the bent strip).

Figure 7:
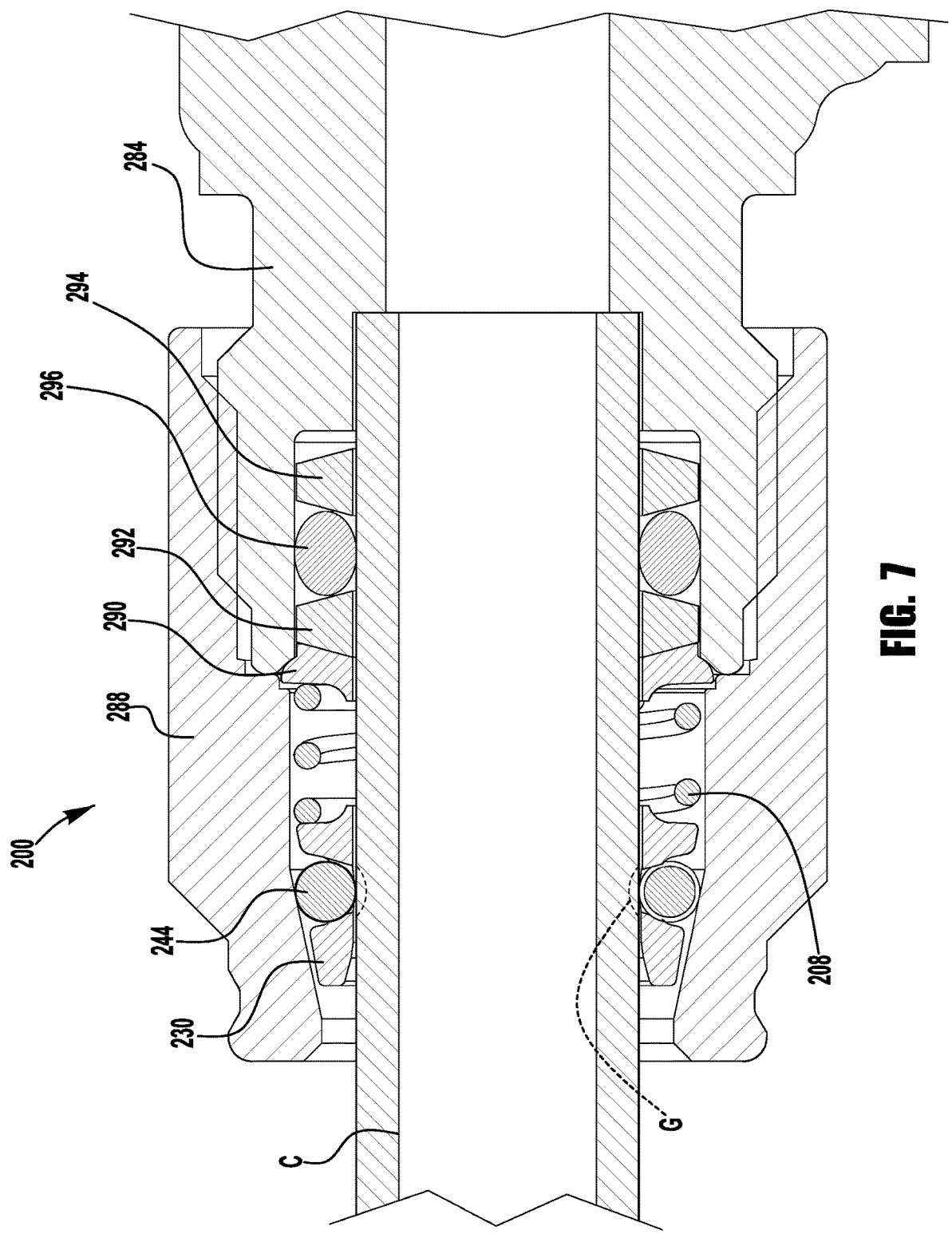
FIG. 7 is a side cross-sectional view of a push to connect fitting, shown assembled with a conduit end, according to another exemplary embodiment of the present disclosure.
Figure 8:
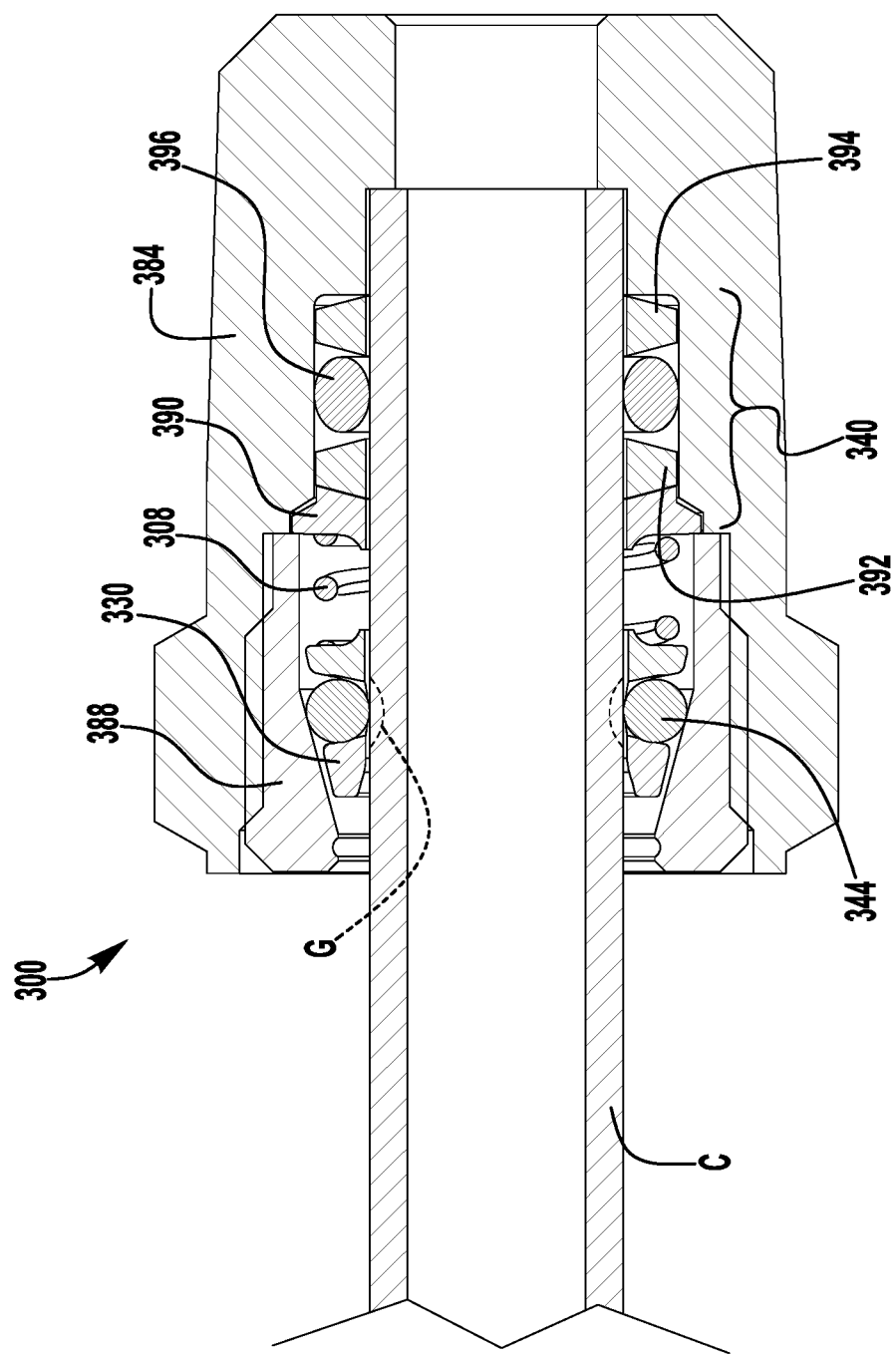
FIG. 8 is a side cross-sectional view of a push to connect fitting, shown assembled with a conduit end, according to another exemplary embodiment of the present disclosure.

According to another aspect of the present disclosure, an O-ring seal or other soft seal in a push to connect fitting may be installed between backup rings at least one of the backup rings having a tapered (e.g., frustoconical) end surface contoured to shield and improve retention of the O-ring during conduit insertion, by creating a dovetail groove in which the O-ring is disposed. FIG. 7 illustrates an exemplary male configuration push to connect fitting 200, similar to the fitting 100 of FIGS. 1-2 (with like components having similar reference numbers) having backup rings 292, 294 with frustoconical end surfaces forming a dovetail groove in which the O-ring seal member 296 is disposed. As shown, the backup rings 292, 294 may be symmetrical to facilitate installation, and the gland 290 may have a conical rear surface to mate with the front backup ring 292. FIG. 8 illustrates a similar exemplary female configuration fitting 300 having backup rings 392, 394 with frustoconical end surfaces (e.g., about 10°-20° degree frustoconical tapered surfaces) forming a dovetail groove in which the O-ring seal member 396 is disposed.

Figure 9:
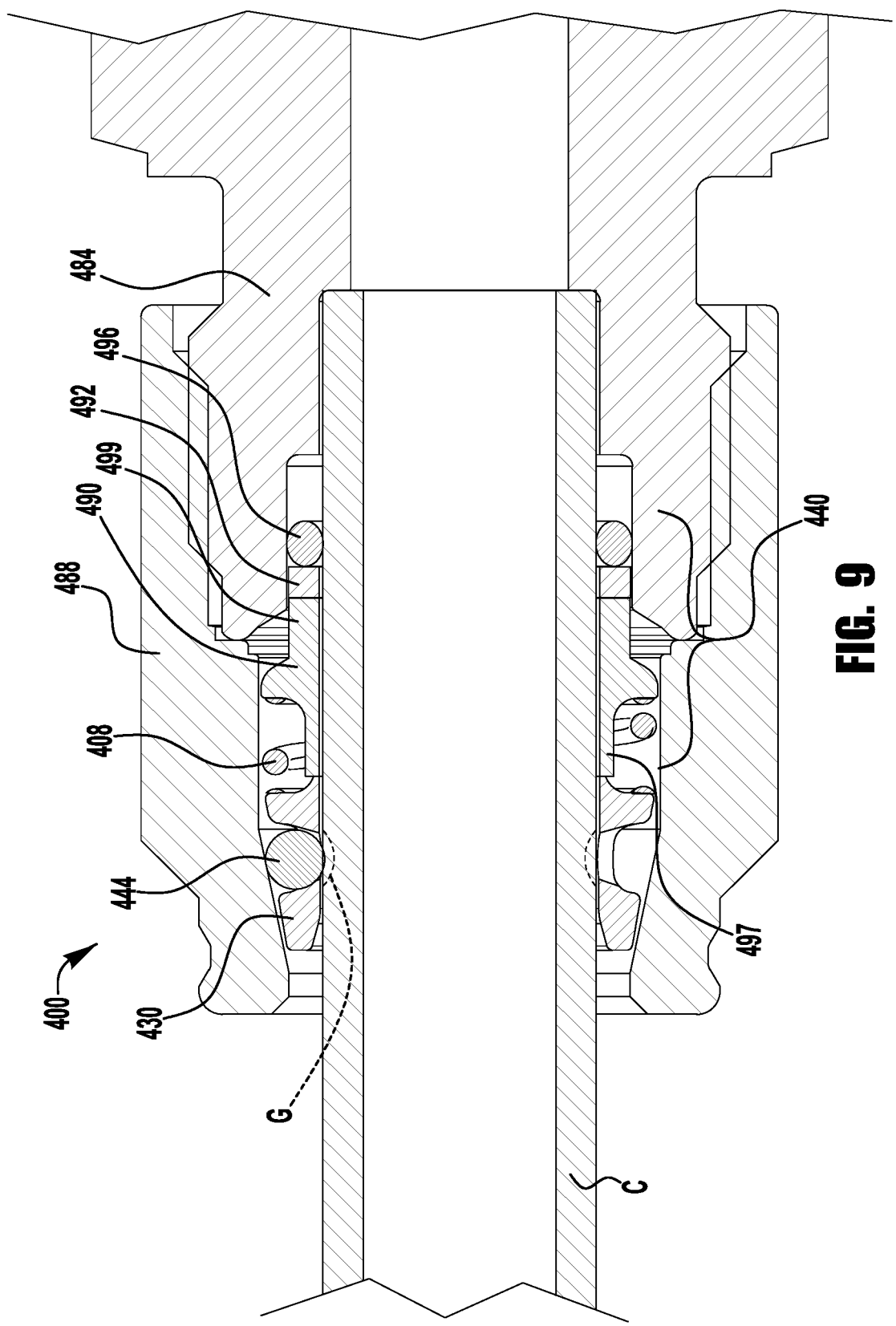
FIG. 9 is a side cross-sectional view of a push to connect fitting, shown assembled with a conduit end, according to another exemplary embodiment of the present disclosure.

In another exemplary embodiment, a push to connect fitting may be provided with a floating gland that is adapted to limit axial compression of the biasing spring, for example, by engaging the retainer body when the biasing spring is in a partially compressed condition, thereby preventing further compression of the spring. FIG. 9 illustrates an exemplary push to connect fitting 400 including a male threaded body 484 and a female threaded nut 488 assembled to define an internal cavity retaining a retainer body 430, biasing spring 408, and sealing arrangement 440, which includes a gland 490, backup ring 492, and seal member 496. The gland 490 includes an outboard tail portion 497 that extends axially through the biasing spring 408. When the installed fitting 400 is pressurized, fluid pressure axially forces the sealing arrangement 440 in an outboard direction, such that the gland tail portion 497 engages an inboard end of the retainer body 430. This limits spring compression to a predetermined length corresponding to the axial gap between the spring engaging surfaces of the retainer body 430 and the gland 490. Upon engagement of the retainer body with the gland, additional fluid pressure may provide additional axial force against the retainer body for increased gripping and colleting. Because the axial movement of the gland 490 is limited by the tail portion 497, an inboard nose portion 499 of the gland may be shortened, and the counterbore receiving the nose portion 499, backup ring 492 and seal member 496 may also be shortened. While the gland 490 is shown as being installed in a male configuration fitting 400, in other embodiments, a similar arrangement may be provided in a fitting having a female threaded body and a male threaded nut (a "female configuration"), such as any of the exemplary female configuration fittings described herein or in the above-incorporated '582 Patent, or in a fitting having non-threaded (e.g., crimped) components.

Figure 10:
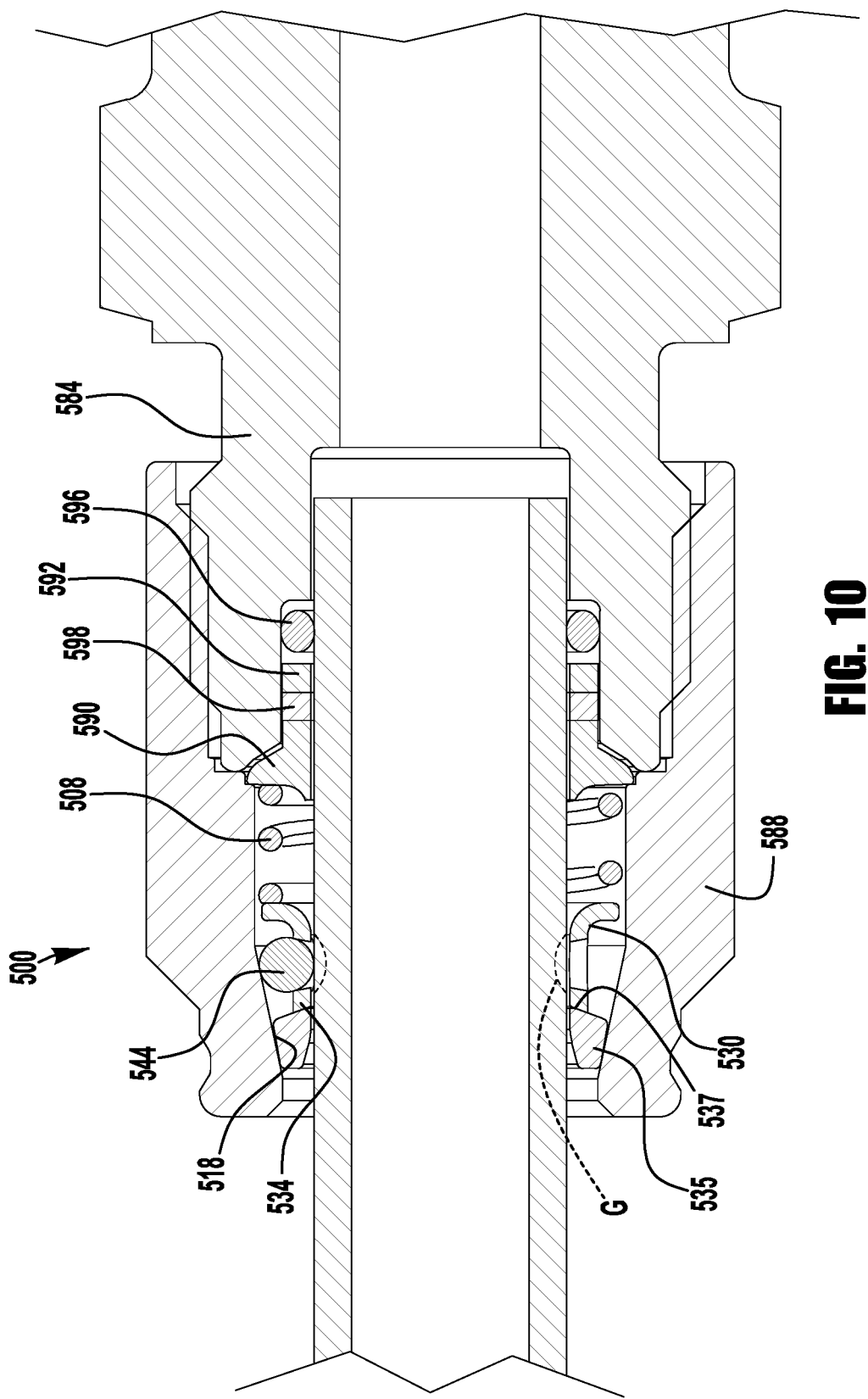
FIG. 10 is a side cross-sectional view of a push to connect fitting, shown assembled with a conduit end, according to another exemplary embodiment of the present disclosure.
Figure 10A:
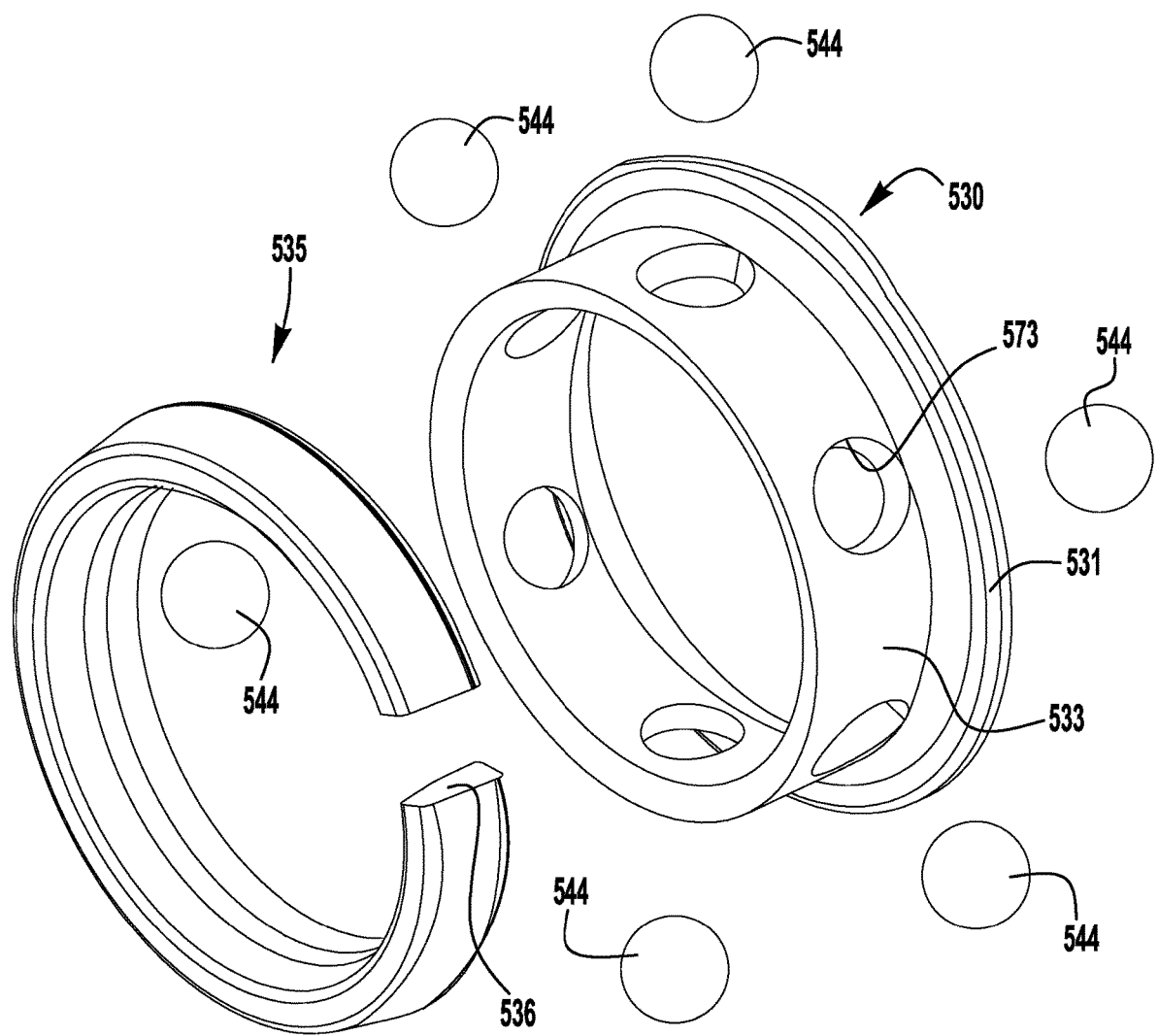
FIG. 10A is a perspective view of the retaining arrangement of the push to connect fitting of FIG. 10.
Figure 12:
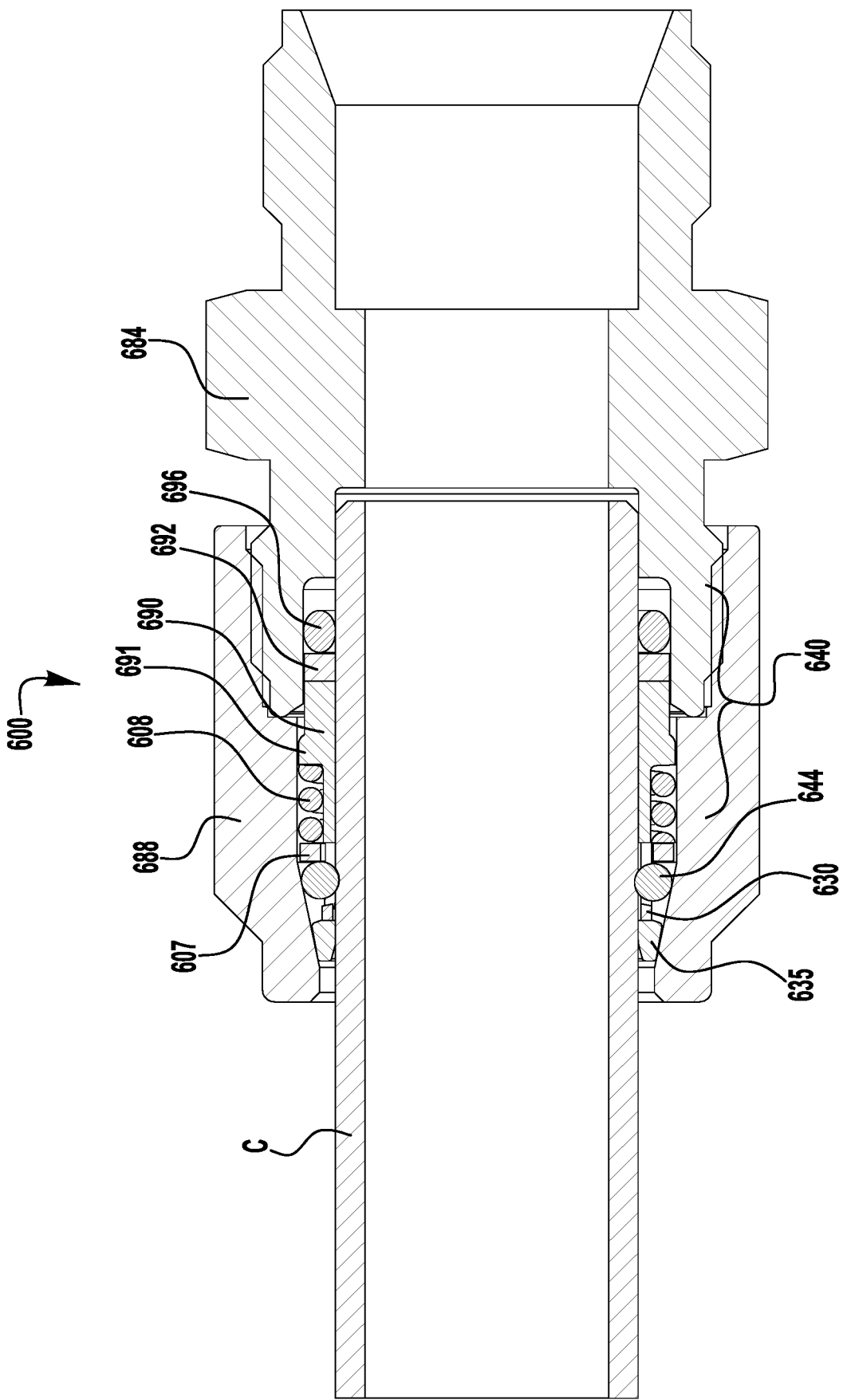
FIG. 12 is a side cross-sectional view of the push to connect fitting of FIG. 11, shown in a pressurized condition.
Figure 13:
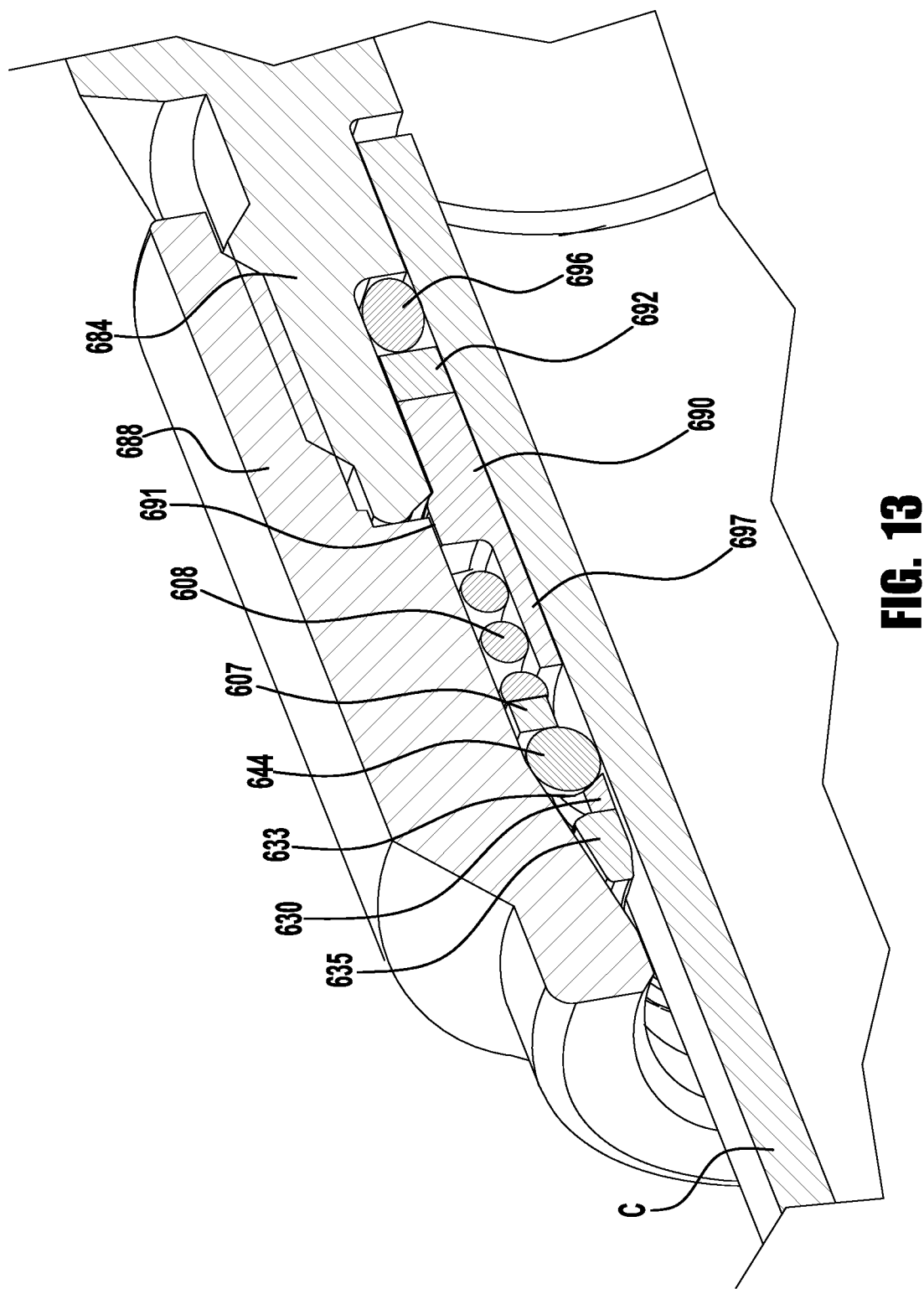
FIG. 13 is a partial perspective cross-sectional view of the push to connect fitting of FIG. 11.
Figure 14:
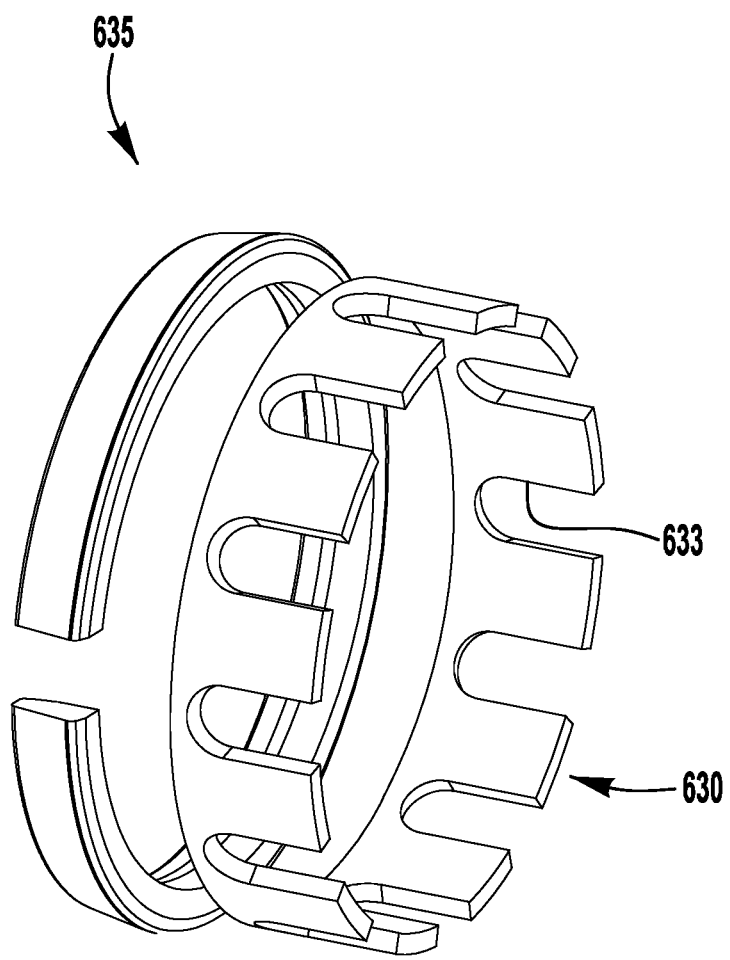
FIG. 14 is a perspective view of the retainer body and colleting ring of the push to connect fitting of FIG. 11.

According to another aspect of the present disclosure, a push to connect fitting (e.g., any of the exemplary push to connect fittings described herein or in the above-incorporated '582 Patent) may include a retainer body or retainer body provided in combination with a separate colleting ring, such as, for example, a colleting split ring. By providing the colleting ring as a separate component from the retainer body, the colleting ring and retainer body may be provided in different materials—for example, a higher tensile strength material for the colleting ring and a lower strength material for the retainer body. In such an embodiment, an outboard end of the retainer body engages an inboard end of the colleting ring to axially force the colleting ring against a tapered surface in the fitting (e.g., about 8°-16° taper with respect to the central axis), to contract the colleting ring into colleting engagement with the inserted conduit. FIG. 10 illustrates an exemplary push to connect fitting 500 including a single piece retainer body 530 in combination with a split colleting ring 535 (as also shown in FIG. 10A). The retainer body 530 includes a continuous circumferential inboard flange portion 531 extending to a circumferentially continuous gripping member retaining web portion 533 (including openings 573 for retaining gripping members 544). The colleting ring 535 is split to define a gap 536, sized to permit radial contraction of the colleting ring against an installed conduit when the colleting ring is axially forced against the tapered surface 518 of the fitting 500. When the colleting ring 535 and retainer body 530 are axially forced away from the tapered surface 518 (e.g., by a release tool), the elastic spring forces in the colleting ring (which may be increased by the use of a high tensile strength material for the colleting ring) cause the colleting ring to radially expand for release of the inserted conduit. As shown, engaging surfaces 534, 537 of the retainer body 530 and colleting ring 535 may have complementary contoured tapers to facilitate concentric alignment of the retainer body and colleting ring as biased by the spring 508. While the retainer body 530 and colleting ring 535 are shown in FIG. 10 as being installed in a fitting 500 having a male threaded body 584 and a female threaded nut 588 (a "male configuration"), in other embodiments, the retainer body may be installed in a female configuration fitting (e.g., any of the exemplary female configuration fittings described herein or in the above-incorporated '582 Patent), or in a fitting having non-threaded (e.g., crimped) components.

According to another aspect of the present disclosure, a push to connect fitting may be provided with a conduit gripping and colleting arrangement that provides for spring loading of the gripping member(s) and independent fluid pressure driven loading of the colleting member(s). In one such embodiment, a retainer body may be configured to provide for retraction of the conduit gripping members during release of the conduit (e.g., by inserting a tool as described herein) without applying a fluid driven load to the gripping members through the retainer body, by retaining the gripping members in elongated holes or slots in the retainer body. The fitting may include a floating gland that applies a fluid driven load, through the retainer body, to the colleting member.

FIGS. 11-14 illustrate an exemplary push to connect fitting 600 including a male threaded body 684 and a female threaded nut 688 assembled to define an internal cavity retaining a split colleting ring 635 (which may function similar to the split colleting ring of FIGS. 10 and 10A), a retainer body 630, spacer ring 607, biasing spring 608, and sealing arrangement 640, which includes a gland 690, backup ring 692, and seal member 696. The retainer body 630 includes elongated slots 633 that receive gripping members 644. The gland 690 includes an outboard tail portion 697 that extends axially through the biasing spring 608. When the conduit C is installed, prior to pressurization, the spring 608 biases spacer ring 607 into engagement with the gripping members 644, to load the gripping members against the fitting nut taper 618 for gripping engagement of the conduit. When the installed fitting 600 is pressurized, fluid pressure axially forces the sealing arrangement 640 in an outboard direction, such that the gland tail portion 697 engages an inboard end of the retainer body 630. Because the gripping member retaining slots 633 extend to the axially inward edge of the retainer body, the retainer body 630 is axially forced against the colleting ring 635 to load the colleting ring, without applying a load directly to the gripping members 644. Outward movement of the gland 690 does however further compress the spring 608 to increase the spring load on the gripping members. This arrangement may provide a greater tolerance range for manufacturing, with reduced sensitivity of the timing of conduit gripping relative to the colleting function so as to not inhibit gripping member movement and loading resulting from the nut taper by contact and wedging of the colleting feature of the retainer body between the conduit and nut. As shown, the gland 690 may, but need not, include an outwardly protruding end 691 that engages an end portion 685 of the body 684, for example, to provide an increased minimum spring load while limiting compression of the seal member.

While the colleting ring 635 is shown as a separate component from the retainer body 630 (and may include contoured engaging surfaces as described in the fitting of FIG. 10), in other embodiments, the colleting portion may be integrated into the retainer body while still providing for independent spring loading of the gripping members and fluid pressure loading of the colleting portion. Additionally, while the conduit retaining arrangement is shown as being installed in a male configuration fitting 600, in other embodiments, a similar arrangement may be provided in a fitting having a female threaded body and a male threaded nut (a "female configuration"), such as any of the exemplary female configuration fittings described herein, or in a fitting having non-threaded (e.g., crimped) components.

When a conduit is installed in a push to connect fitting, such as, for example, any of the exemplary push to connect fittings described herein, an axial force is applied to the conduit to axially move the conduit retaining arrangement (e.g., retainer body) in an inboard direction, such that the gripping and/or colleting members disengage from the tapered internal surface of the fitting to permit radial expansion of the gripping and/or colleting members sufficient to allow the conduit to be inserted therethrough. In some applications, the axial force required to fully insert the conduit may be significant. Additionally, installation of two ends of a conduit into two push to connect fittings (e.g., a conduit having a U-bend) may be difficult, due to the fittings' tendency to grip a partially inserted conduit end, thereby resisting minor adjustments to the insertion depth. According to an exemplary aspect of the present disclosure, a removable conduit releasing tool or insert may be assembled with a push to connect fitting to hold the retaining arrangement in a conduit releasing condition. When a conduit end has been inserted into the fitting past the conduit retaining arrangement to a desired installed position, the conduit releasing insert may be removed from the fitting, allowing the spring biased retaining arrangement to move to a conduit retaining condition.

In one such embodiment, the conduit releasing insert includes a releasing feature (e.g., a tab, rib, or other such extension) and a fitting interlocking feature (e.g., radially flexible fingers or tabs) that removably assembles with the fitting to hold the releasing feature in releasing engagement with a spring biased portion of a conduit retaining arrangement of the fitting. When a conduit end has been inserted into the fitting past the conduit retaining arrangement to a desired installed position, the conduit releasing insert is removed from the fitting to disengage the releasing feature from the spring biased portion of the conduit retaining arrangement, allowing the spring biased retaining arrangement to move to a conduit retaining condition. Further, to remove the installed conduit end from the fitting, the insert may be reassembled with the fitting, thereby re-engaging the releasing feature with the spring biased portion of the conduit retaining arrangement to move the spring biased retaining arrangement to the conduit releasing condition.

Figure 15:
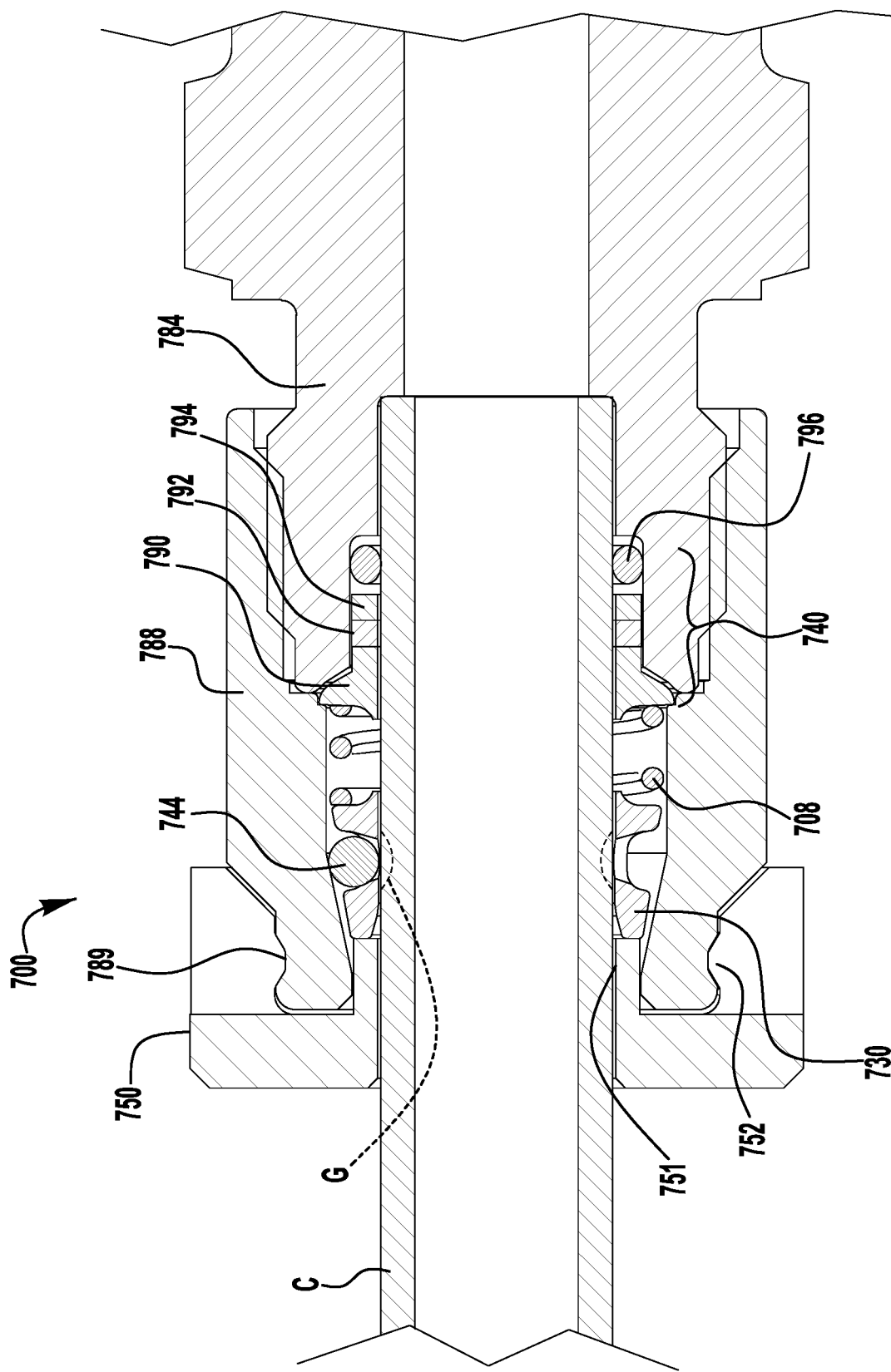
FIG. 15 is a side cross-sectional view of a push to connect fitting, shown assembled with a conduit end and with a conduit releasing insert tool, according to an exemplary embodiment of the present disclosure.
Figure 15A:
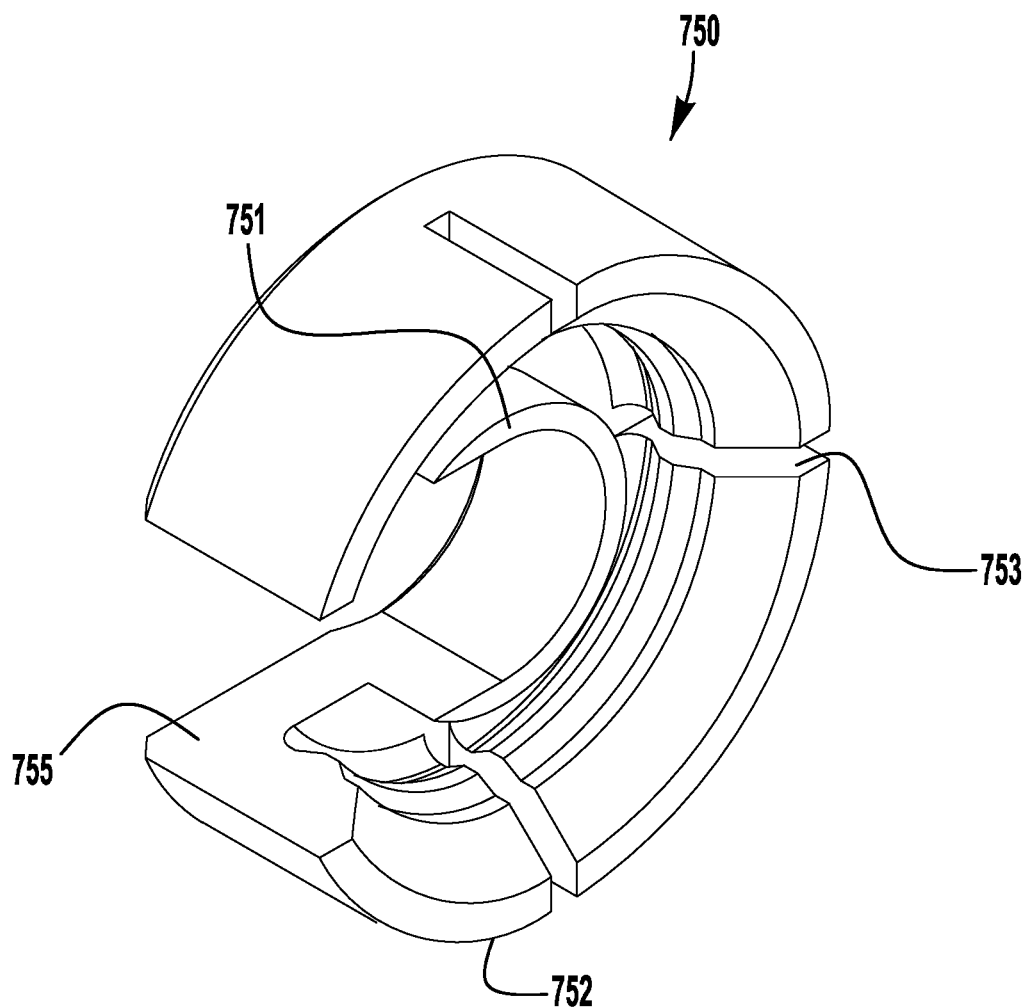
FIG. 15A is a perspective view of the conduit releasing insert tool of FIG. 15.

FIG. 15 illustrates an exemplary push to connect fitting 700 with an installed conduit releasing insert 750, permitting free insertion and removal of a conduit end C. The exemplary fitting 700 is similar to the fitting 100 of FIGS. 1 and 2 and includes a male threaded body 784 and a female threaded nut 788 assembled to define an internal cavity retaining a retainer body 730, biasing spring 708, and sealing arrangement 740, which includes a gland 790, backup rings 792, 794, and seal member 796. The conduit releasing insert 750 includes a releasing extension 751 that is inserted into the nut 788 and into engagement with the retainer body 730, thereby axially forcing the retainer body against the spring 708 to a conduit releasing position. An interlocking flange portion 752 of the insert 750 extends over an end portion of the nut 788 and snaps into gripping engagement with a circumferential groove 789 in the nut end portion, thereby securing the insert 750 to the nut, and securing the releasing extension 751 against the retainer body 730 to hold the retainer body in the conduit releasing condition. As shown in FIG. 15A, the interlocking flange portion 752 may be segmented (e.g., by one or more slots 753) to increase elastic radial flexibility.

When a conduit end C has been inserted into the fitting nut 788 and through the retainer body 730 and sealing arrangement 740 to a desired installed position, the insert 750 may be removed from the nut by flexing the interlocking flange 752 out of engagement with the nut groove 789, thereby withdrawing the releasing extension 751 from the nut and permitting the spring biased retainer body 730 to be moved by the biasing spring 708 to a conduit gripping position. Further, to remove the installed conduit end C from the fitting 700, the insert 750 may be reassembled with the fitting (i.e., by re-engaging the interlocking flanges 752 with the nut groove 789, thereby re-engaging the releasing extension 751 with the spring biased retainer body 730 to move the retainer body to the conduit releasing condition. As shown in FIG. 15A, the insert 750 may include an opening 755 sized to permit installation and remove of the insert past an inserted conduit end.

Figures 17, 17A:
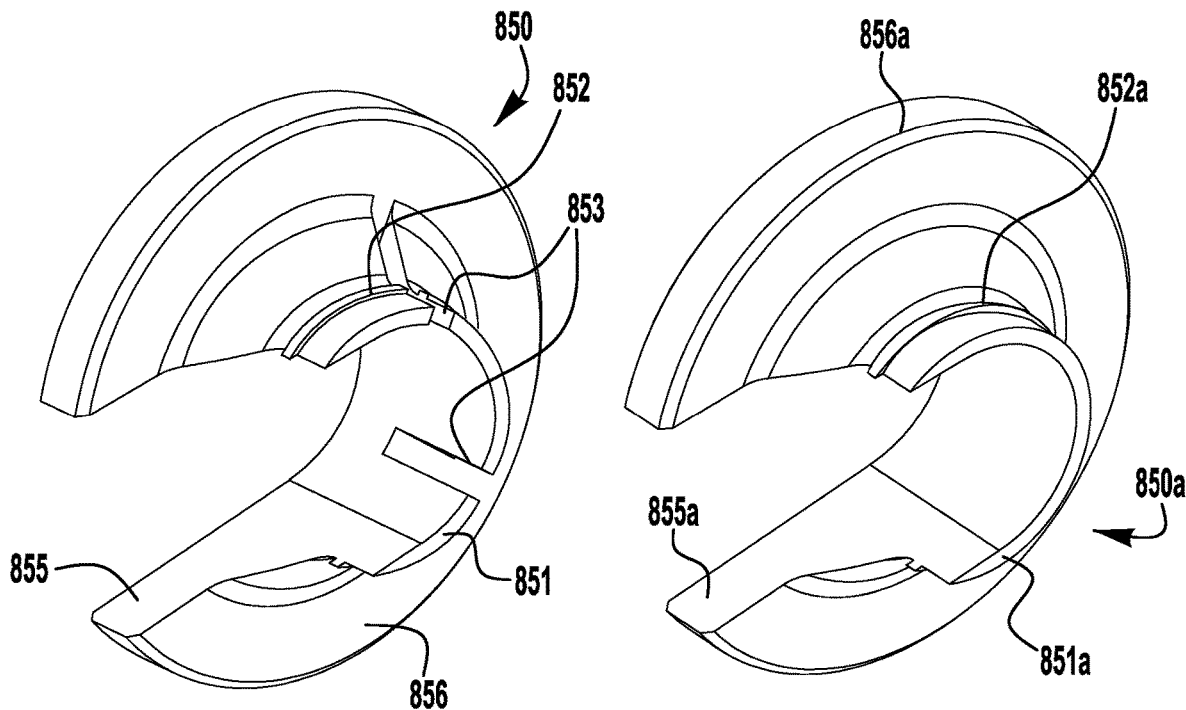
FIG. 17 is a perspective view of the conduit releasing insert tool of FIG. 16.
FIG. 17A is a perspective view of another conduit releasing insert tool, according to another exemplary embodiment of the present disclosure.

A similar conduit releasing insert may likewise be utilized with any push to connect fitting for which a spring biased conduit retaining arrangement grips an inserted conduit end, including, for example, the male configuration and female configuration push to connect fittings described herein. FIG. 16 illustrates an exemplary female configuration push to connect fitting 800 with an installed conduit releasing insert 850, permitting free insertion and removal of a conduit end C. The exemplary fitting 800 is similar to the fitting 300 of FIG. 8 and includes a female threaded body 884 and a male threaded nut 888 assembled to define an internal cavity retaining a retainer body 830, biasing spring 808, and sealing arrangement 840, which includes a gland 890, backup rings 892, 894, and seal member 896. The conduit releasing insert 850 includes a releasing extension 851 that is inserted into the nut 888 and into engagement with the retainer body 830, thereby axially forcing the retainer body against the spring 808 to a conduit releasing position. An interlocking rib 852 of the insert 850 is inserted into engagement with an ID groove 889 in the nut end portion, thereby securing the insert 850 to the nut, and securing the releasing extension 851 against the retainer body 830 to hold the retainer body in the conduit releasing condition. As shown in FIG. 17, the interlocking flange portion 852 may be segmented (e.g., by one or more slots 853) to increase elastic radial flexibility. FIG. 17A shown an alternative conduit releasing insert 850a with an unsegmented flange portion 852a.

When a conduit end C has been inserted into the fitting nut 888 and through the retainer body 830 and sealing arrangement 840 to a desired installed position, the insert 850 may be removed from the nut by flexing the interlocking rib 852 out of engagement with the nut groove 889 (e.g., by pulling on outer disc portion 856 of the insert 850), thereby withdrawing the releasing extension 851 from the nut and permitting the spring biased retainer body 830 to be moved by the biasing spring 808 to a conduit gripping position. Further, to remove the installed conduit end C from the fitting 800, the insert 850 may be reassembled with the fitting (i.e., by re-engaging the interlocking rib 852 with the nut groove 889), thereby re-engaging the releasing extension 851 with the spring biased retainer body 830 to move the retainer body to the conduit releasing condition. As shown in FIG. 17, the insert 850 may include an opening 855 sized to permit installation and removal of the insert past an inserted conduit end. In other embodiments, a male configuration fitting may include a nut having a similar ID groove for interlocking engagement with a conduit releasing tool.

Figure 17B:
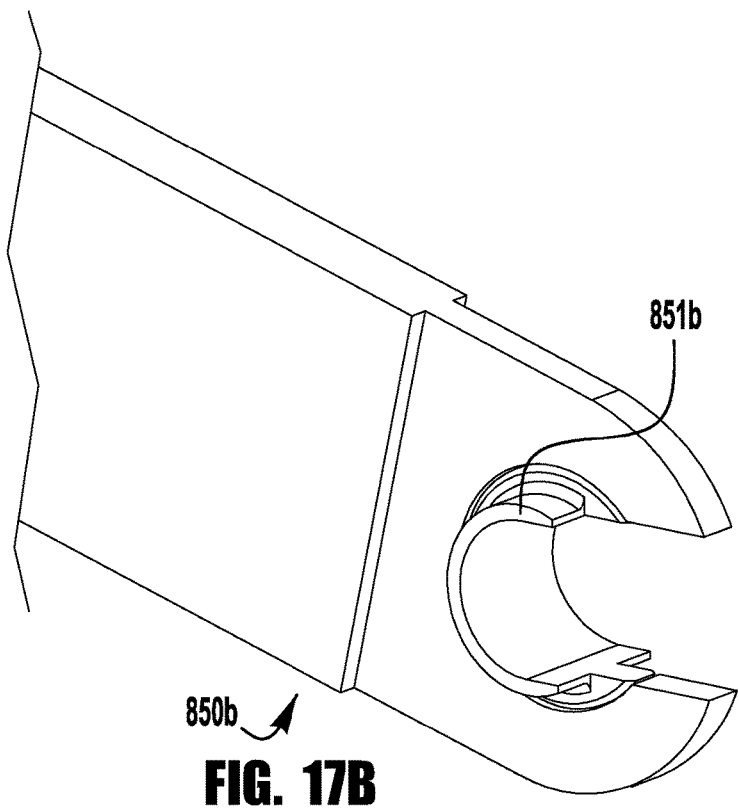
FIG. 17B is a perspective view of a conduit releasing tool, according to another exemplary embodiment of the present disclosure.

In other embodiments, as shown in FIG. 17B, a separate wrench-style tool 850b, having a releasing extension 851b, may additionally or alternatively be used to release an inserted conduit from gripping engagement by the push to connect fitting retaining arrangement.

The push to connect fittings described above, and in the above incorporated '582 Patent, may use a conduit that has a smooth hollow cylindrical geometry. In other arrangements, the conduit may alternatively have a groove or recess formed in the outer surface of the conduit wall at an axial position that aligns with the conduit gripping members such as the spherical balls or oblong (e.g., cylindrical or barrel-shaped) bearings. The groove or recess can in some applications enhance the conduit grip by the conduit gripping members because the gripping members will not have to be forced to indent into the conduit surface. Engagement of the conduit gripping members with the conduit groove may also provide a detectable positive indication of full insertion or installation of the conduit in the fitting assembly. The colleting action of the colleting portion against the outer surface of the conduit, outboard of the groove, reduces stress concentrations at the conduit groove, which may otherwise result from vibration or flexure of the conduit outboard of the groove. Exemplary conduit grooves G are illustrated in phantom in FIGS. 1, 7, 8, 9, 10, 11, 15, and 16.

Figure 18A:
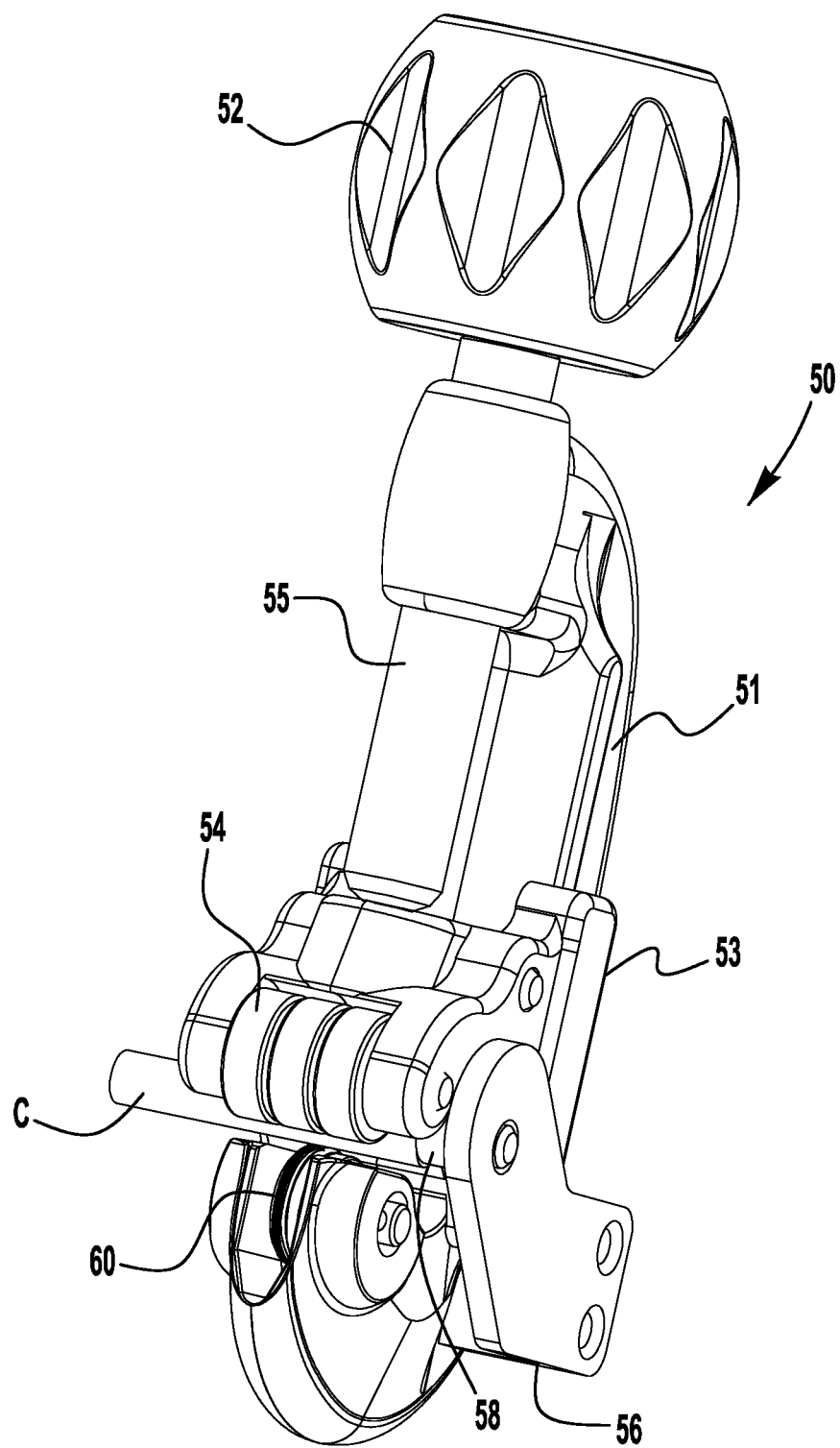
FIG. 18A is a perspective view of a conduit end preparation tool, according to an exemplary embodiment of the present disclosure.
Figure 18B:
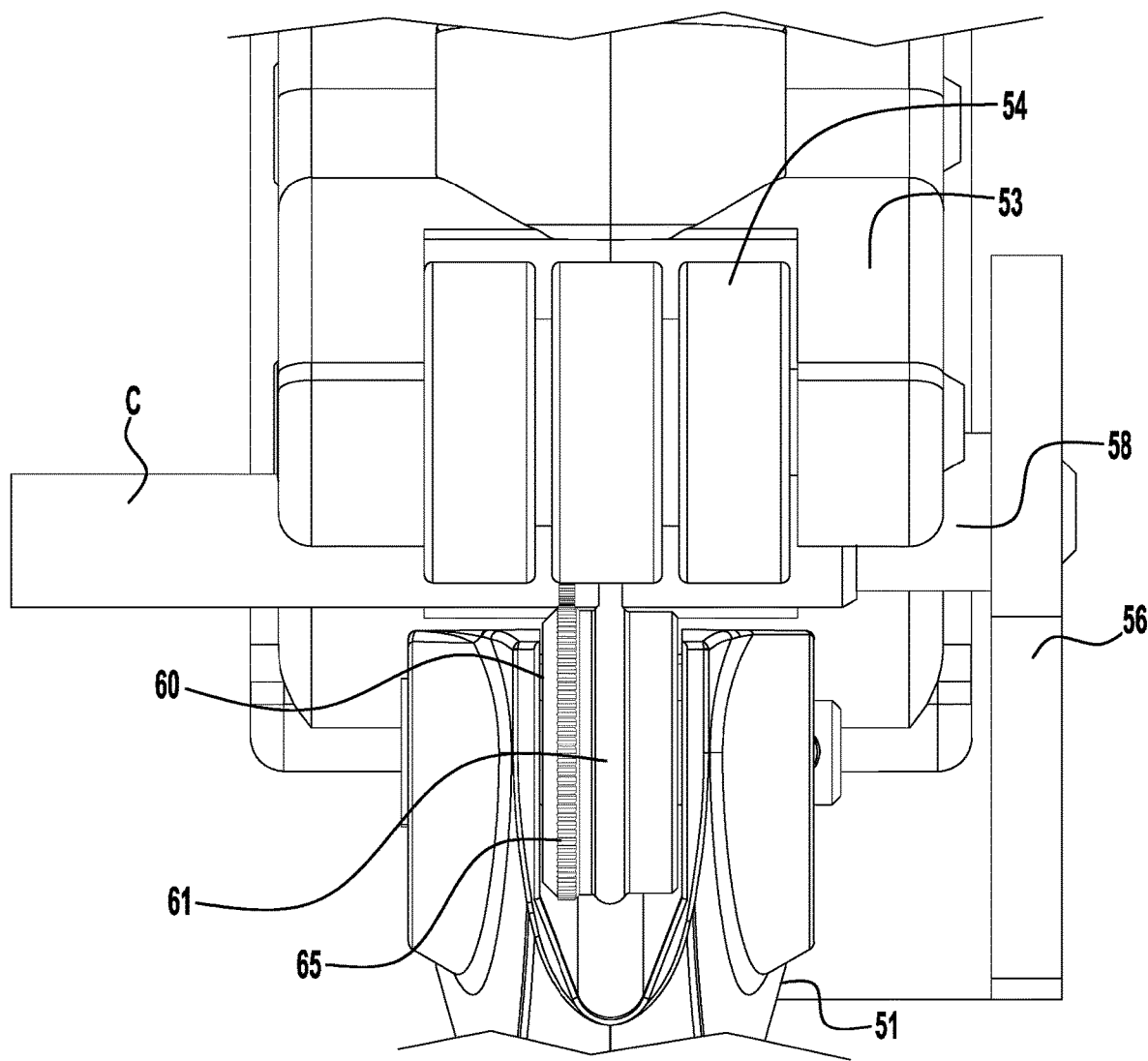
FIG. 18B is a partial front view of the conduit end preparation tool of FIG. 18A.
Figure 19:
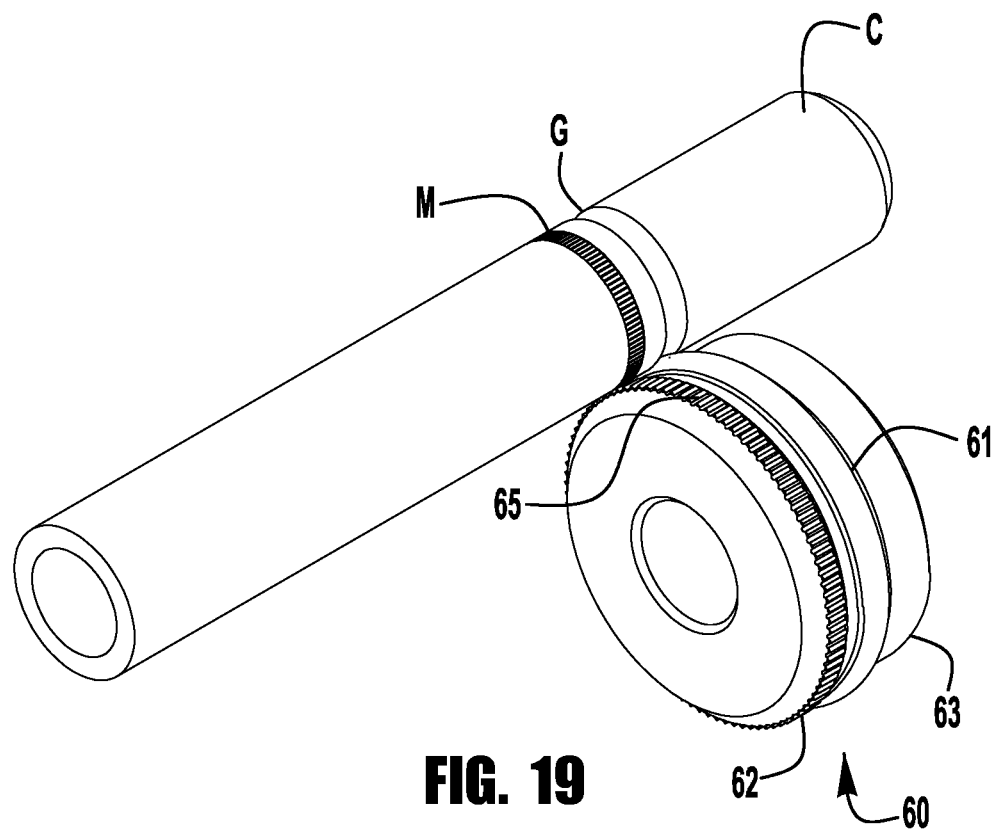
FIG. 19 is a perspective view of an exemplary groove forming and conduit marking roller for a conduit end preparation tool.

A grip-enhancing conduit groove may be formed in a variety of manners. According to an aspect of the present disclosure, a clamp-style rolling hand tool with a groove-forming roller may be utilized to form the groove, similar to known clamp-style tube cutting hand tools. FIGS. 18A and 18B illustrate an exemplary conduit end preparing tool 50 including a body 51 rotationally supporting a groove forming roller 60, a gripping member 53 slideably mounted to the body for engagement of conduit engaging rollers 54 with a conduit C inserted between the groove forming roller 60 and the conduit engaging rollers, and a clamping member 55 (e.g., threaded bolt) threadably retained with the body 51 and adjustable (by rotating handle 52) for clamping engagement with the gripping member 53 to clamp the inserted conduit C between the groove forming roller 60 and the conduit engaging rollers 54. By incrementally tightening the clamping member 55 and rotating the tool 50 about the conduit C, an annular rib 61 on the groove-forming roller 60 forms a circumferential groove G in the conduit C. As best shown in FIG. 19, the groove forming roller 60 may include a depth control surface 62 on the outboard side of the rib 61, dimensioned to engage the surface of the conduit C, and produce increased resistance and/or slight burnishing, when the groove has reached a desired depth, and/or a relief surface 63 on the inboard side of the rib, dimensioned to permit material displacement to the outboard side of the rib. In other embodiments, a groove forming roller may be provided with a depth control surface on the inboard side of the rib, and/or a relief surface on the outboard side of the rib.

As shown in FIGS. 18A and 18B, a positioning bracket 56 may be affixed to the body 51 to align the groove-forming rib 60 with a desired position for the groove (e.g., an axial position that aligns with the conduit gripping members of the fitting when the conduit end is fully installed in the fitting. The exemplary positioning bracket 56 includes a boss 58 that abuts the conduit end to provide the desired alignment.

Figure 20:
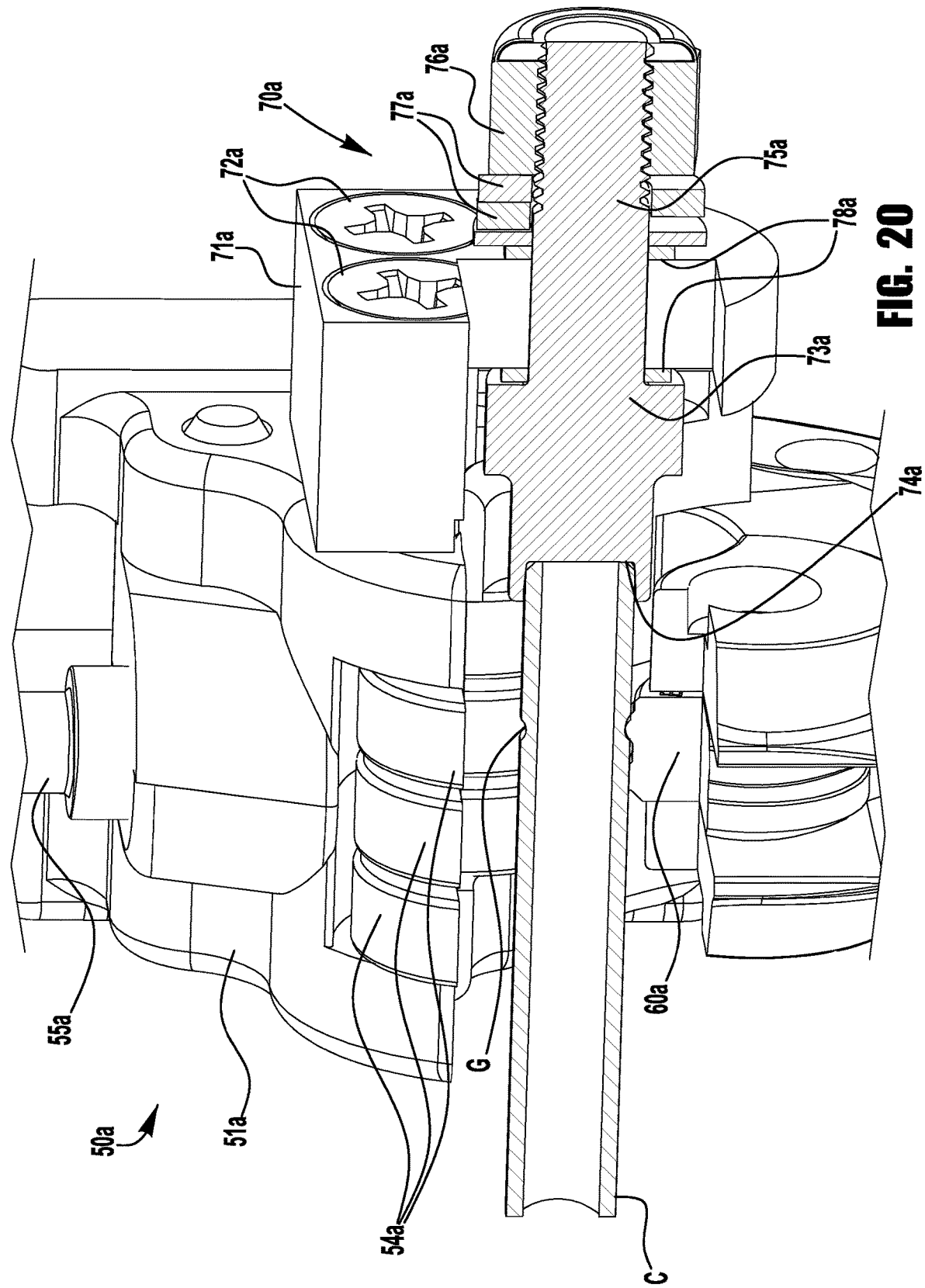
FIG. 20 is a perspective cross-sectional view of a conduit end preparation tool, according to an exemplary embodiment of the present disclosure.

In another embodiment, a conduit end preparing tool may be provided with a mandrel feature configured to facilitate free rotation of the tool about the conduit end during the groove forming operation. FIG. 20 illustrates an exemplary conduit end preparing tool 50a including a body 51a, rollers 54a, 60a, gripping member 53a, clamping member 55a, and adjustable handle 52a similar to those of the tool 50 of FIGS. 18A and 18B, and having a conduit capture mandrel arrangement 70a assembled with the tool body 51a. The mandrel arrangement 70a includes a support member 71a secured to the tool body 51a (e.g., by screws 72a or other fasteners). The support member 71a retains a mandrel 73a having a recessed bore 74a at a first end for receiving the conduit end C, and a threaded pin 75a extending through an aperture in the support member 71a and assembled with a threaded mounting nut 76a and lock washers 77a. Friction reducing thrust bearings 78a (e.g., made from a suitable plastic, such as polyetheretherketone (PEEK)) are installed between the support member 71a and the mandrel 73a and lock washer 77a, to provide for free rotation of the tool body 51a and support member 71a with respect to the conduit end C and mandrel 73a, thereby facilitating roll-forming of the conduit end groove.

Figure 19A:
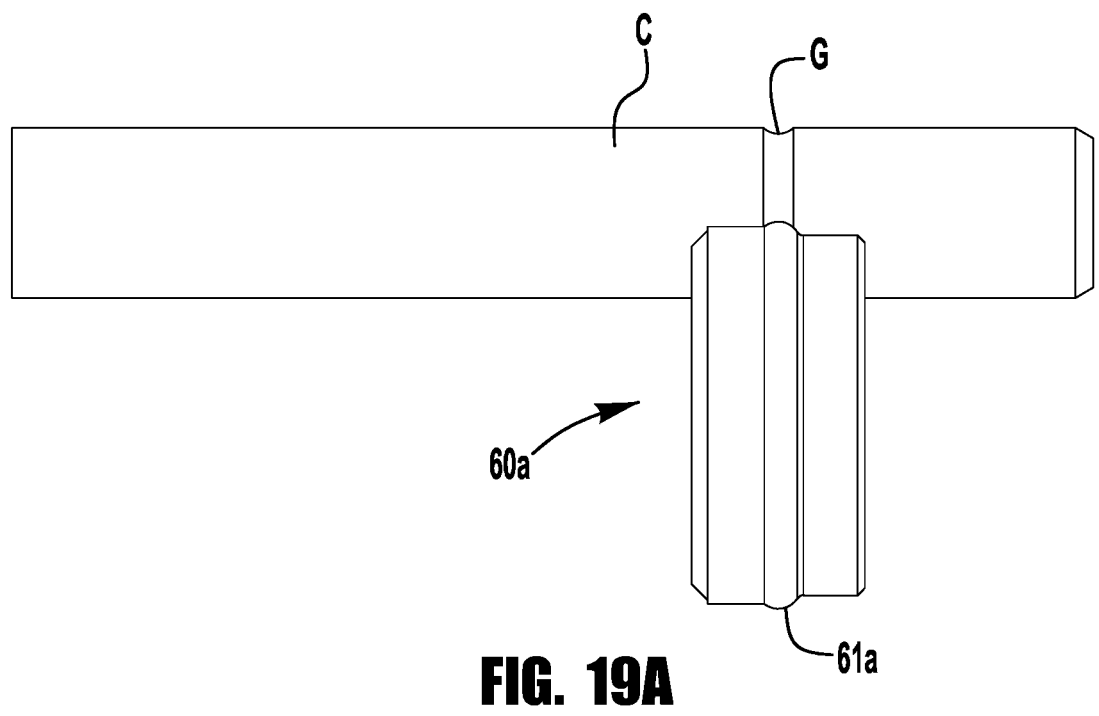
FIG. 19A is a side view of an exemplary groove forming roller for a conduit end preparation tool.
Figure 19B:
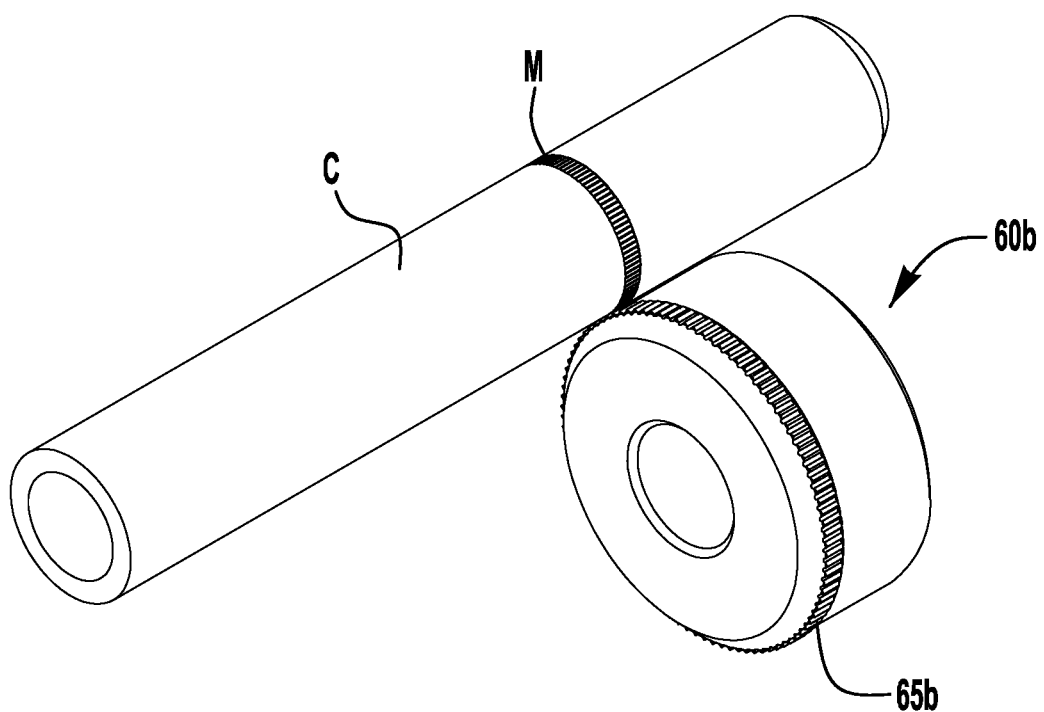
FIG. 19B is a side view of an exemplary conduit marking roller for a conduit end preparation tool.

According to another aspect of the present disclosure, a hand tool may be utilized to produce an insertion depth indication mark on the conduit end, with the depth indication mark positioned to provide a visual indication that the conduit end has been sufficiently inserted in the fitting (e.g., when the depth indication mark is aligned with or obscured by an outboard end portion of the fitting). In the embodiment of FIG. 19, the groove-forming roller 60 additionally includes a ridged ring 65 that produces a knurled ring or marking M on the conduit end C that may function as a depth indication mark. By providing the groove-forming rib 61 and the mark forming ring 65 on the same roller 60, in combination with the positioning bracket 56, proper positioning of the groove G and depth indication mark M (with respect to each other and with respect to the conduit end) may be provided. In other embodiments, the tool may be configured for forming only the groove G (e.g., using the roller 60a of FIG. 19A) or for forming only the depth indication mark M (e.g., using the roller 60b of FIG. 19B).

Figure 21:
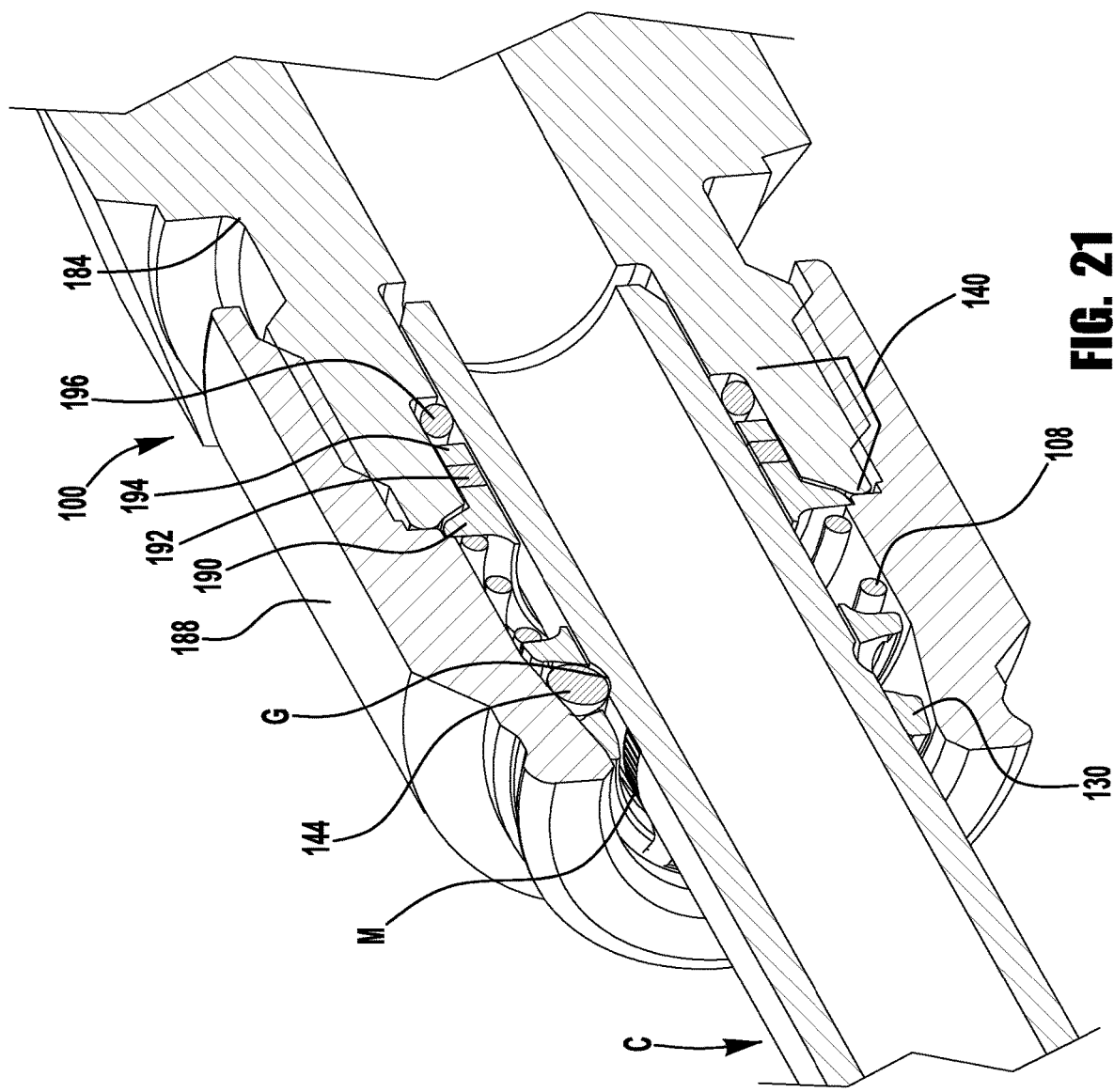
FIG. 21 is a cross-sectional perspective view of a push to connect fitting assembled with a conduit prepared to include a gripping member engaging groove and an insertion depth indicating marking, according to an exemplary embodiment of the present disclosure.

A conduit prepared (for example, using one of the tools 50, 50a of FIGS. 18A, 18B, and 20) to include a gripping member engaging groove and an insertion depth indicating marking may be used with a variety of push to connect fittings, including any of the push to connect fittings described herein or in the above incorporated '582 Patent. FIG. 21 illustrates just one such exemplary push to connect fitting 100 (similar to the fitting of FIG. 1, and numbered accordingly) including a male threaded body 184 and a female threaded nut 188 assembled to define an internal cavity retaining a retainer body 130 retaining a plurality of gripping members 144, a biasing spring 108, and a sealing arrangement 140 (which includes a gland 190, backup rings 192, 194, and seal member 196). A conduit C prepared (for example, using one of the tools 50, 50a of FIGS. 18A, 18B, and 20) to include a gripping member engaging groove G and an insertion depth indicating marking M is inserted into the push to connect fitting 100 such that the marking M is obscured by the end of the nut 188, which corresponds to alignment of the groove G with the gripping members 144.

According to another aspect of the present application, a push to connect fitting configured for connection with a grooved conduit end, as described above, may be provided with a retaining arrangement that utilizes a split ring gripping member (e.g., in place of a plurality of discrete gripping members) that is interlocked or otherwise engaged between the conduit end groove and an interior surface of the fitting to secure the conduit end within the fitting.

In one such embodiment, the split ring gripping member is interlocked or otherwise engaged between the conduit end groove and an internal surface of a separate colleting ring, such that a pulling force applied to an installed conduit end increases the colleting forces of the colleting ring on the conduit end. FIGS. 22-26 illustrate an exemplary push to connect fitting 900 having a male threaded body 984 and a female threaded nut 988 assembled to enclose a split ring retaining arrangement 920 and a sealing arrangement 940, and to receive a conduit end C for retention (e.g., gripping and colleting retention) by the retaining arrangement and sealing engagement with the fitting, via the sealing arrangement. FIG. 27 illustrates an alternative exemplary push to connect fitting 900' having a female threaded body 984' and a male threaded nut 988' assembled to enclose a split ring retaining arrangement 920' and a sealing arrangement 940' similar to those of the male configuration of FIGS. 22-26, for which the below description will also substantially apply.

Referring back to FIGS. 22-26, the exemplary retaining arrangement 920 includes a split gripping ring 930, a split colleting ring 935, and a biasing member, such as, for example, a wave spring 908 (as shown), and/or one or more elastomeric springs (e.g., elastomeric gasket or foam spacer), cupped washers, Belleville springs, or coil springs. The exemplary sealing arrangement 940 includes a gland 990, backup rings 992, 994, 998 and a seal member 996 (e.g., O-ring or other such gasket). The exemplary gland 990 includes an outwardly protruding end 991 that is secured between an inner lip or shoulder 986 of the nut 988 and an end portion 985 of the body 984 to axially fix the gland 990, thereby preventing fluid pressure driven compression of the spring 908. Due to this fixed condition, an inboard nose portion 999 of the gland may be shortened, and the counterbore receiving the nose portion 999, backup rings 992, 994, 998 and seal member 996 may also be shortened.

Figure 22:
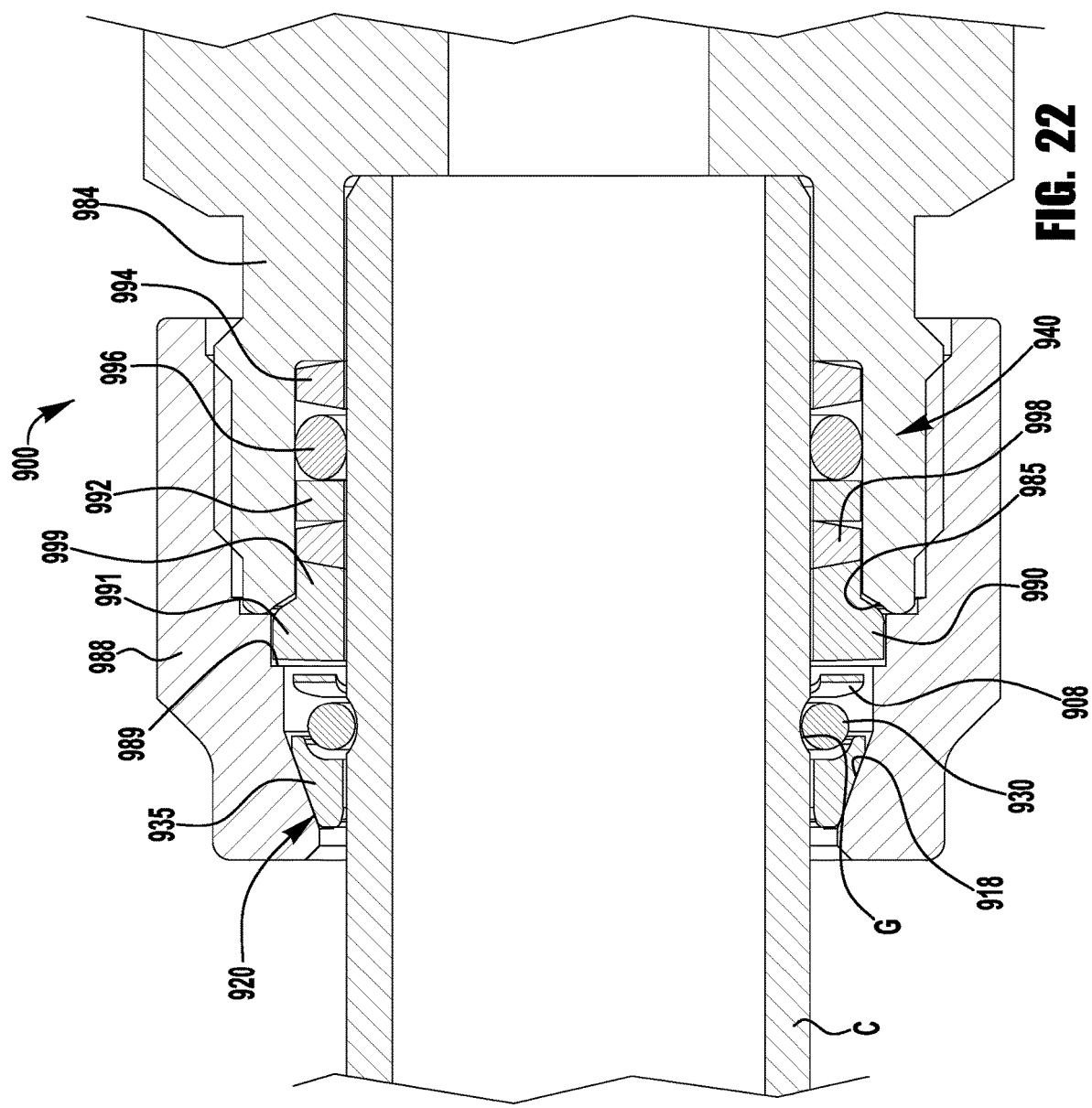
FIG. 22 is a cross-sectional view of a push to connect fitting, shown assembled with a grooved conduit end in an unpressurized condition, according to an exemplary embodiment of the present disclosure.
Figure 23:
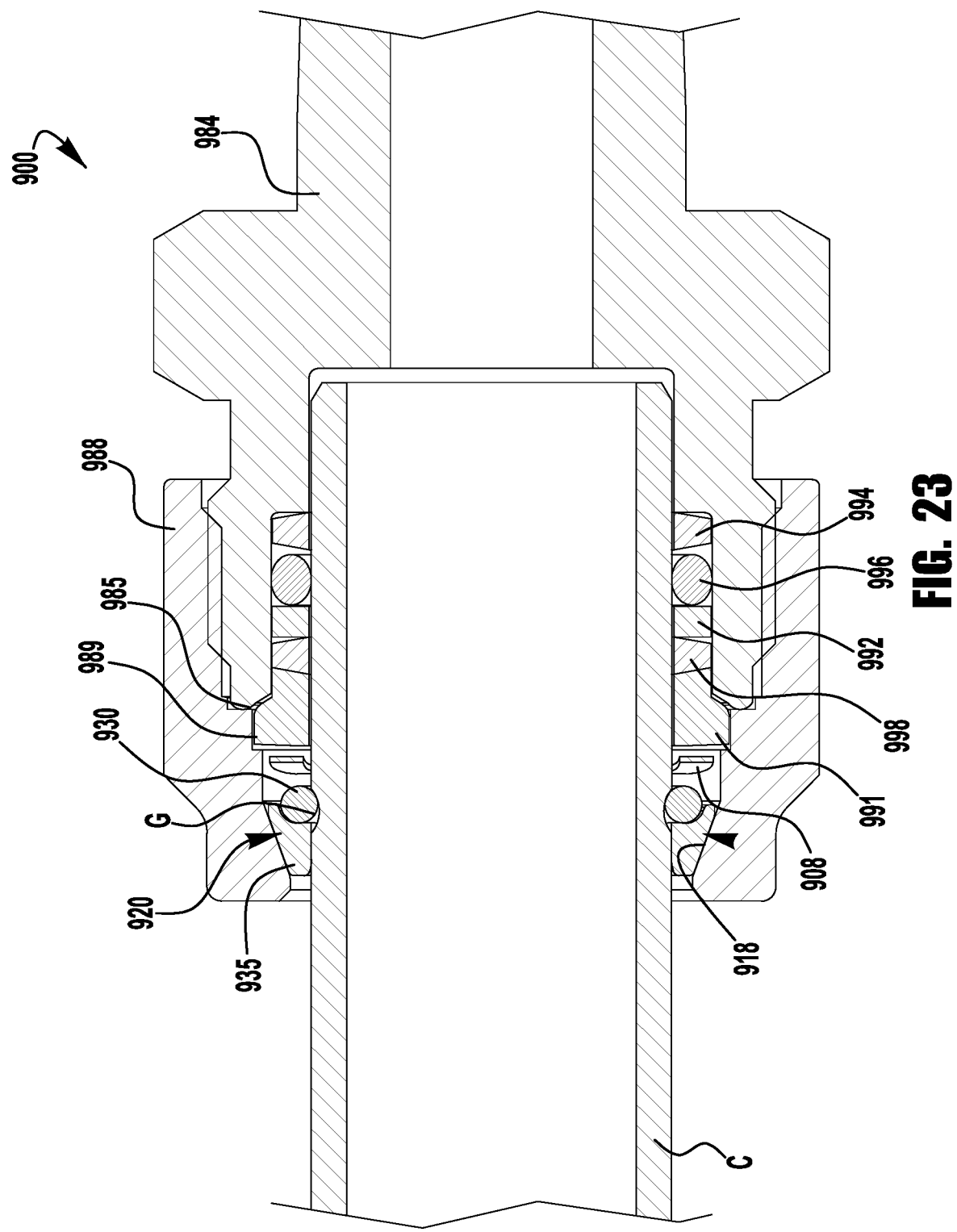
FIG. 23 is a cross-sectional view of the push to connect fitting of FIG. 22, shown assembled with a grooved conduit end in a pressurized condition.
Figure 24:
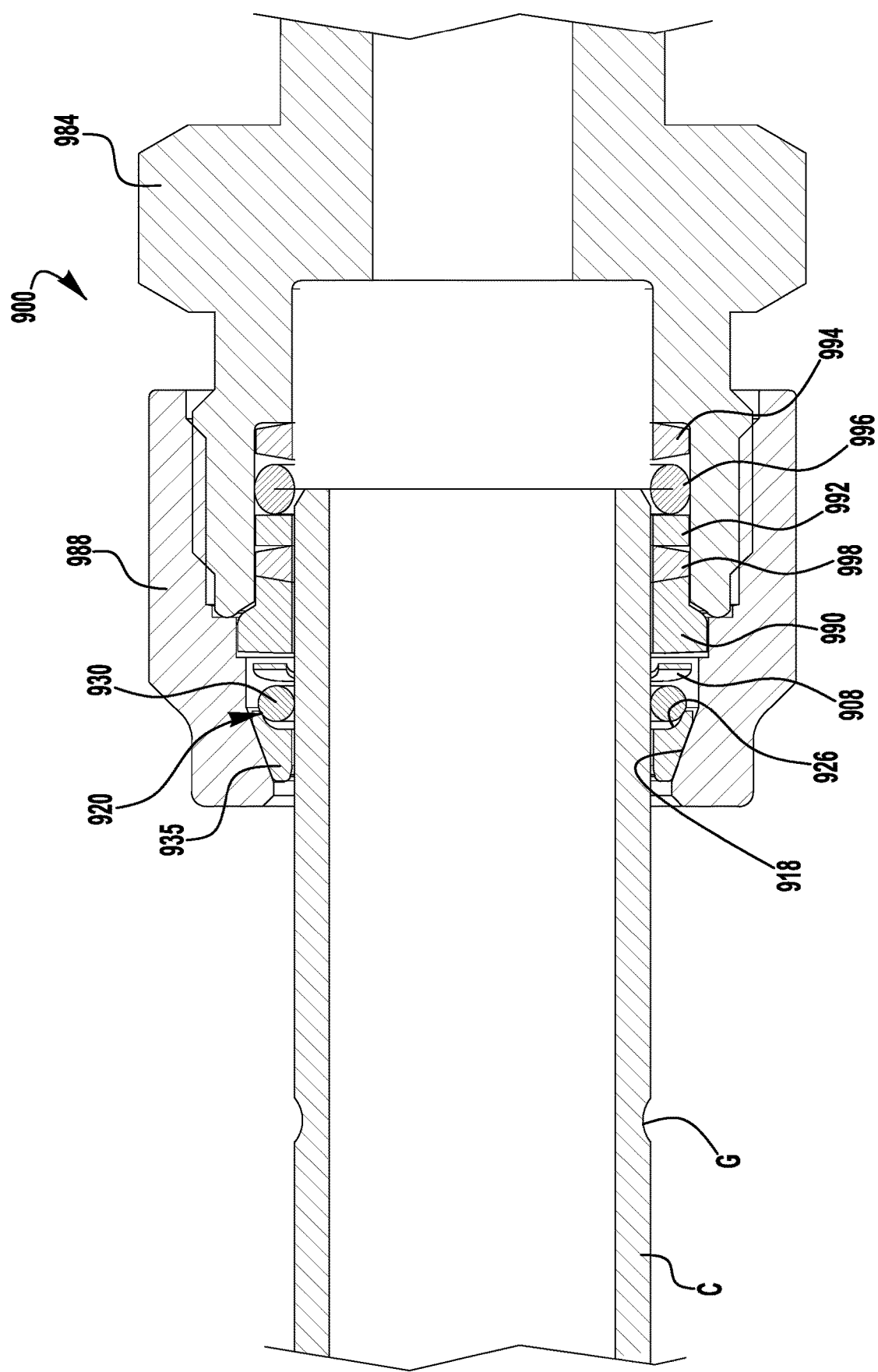
FIG. 24 is a cross-sectional view of the push to connect fitting of FIG. 22, shown with a grooved conduit end partially installed in the fitting.
Figure 25:
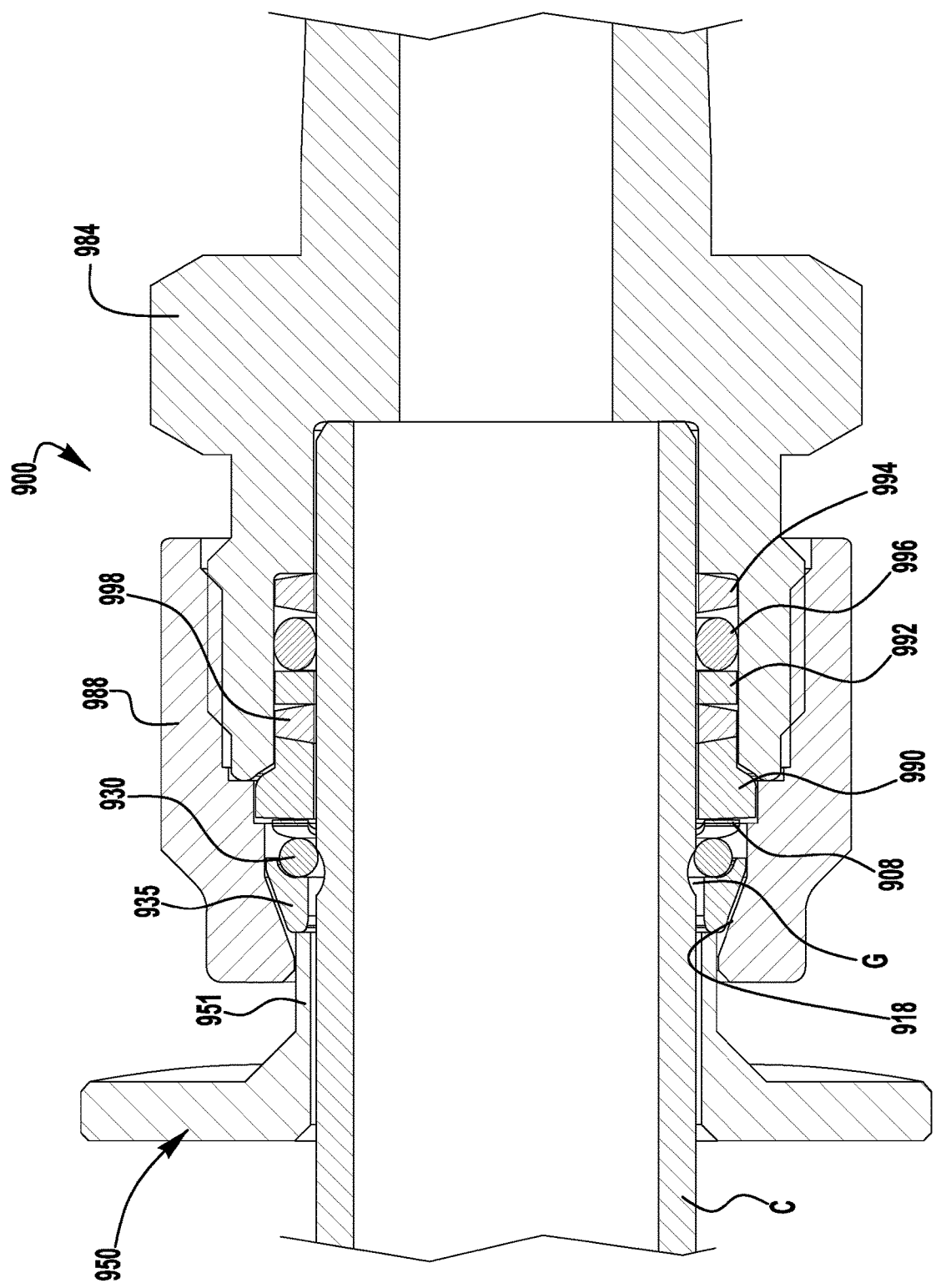
FIG. 25 is a cross-sectional view of the push to connect fitting of FIG. 22, shown assembled with a grooved conduit end and with a conduit removal tool for removal of the conduit end.
Figure 26:
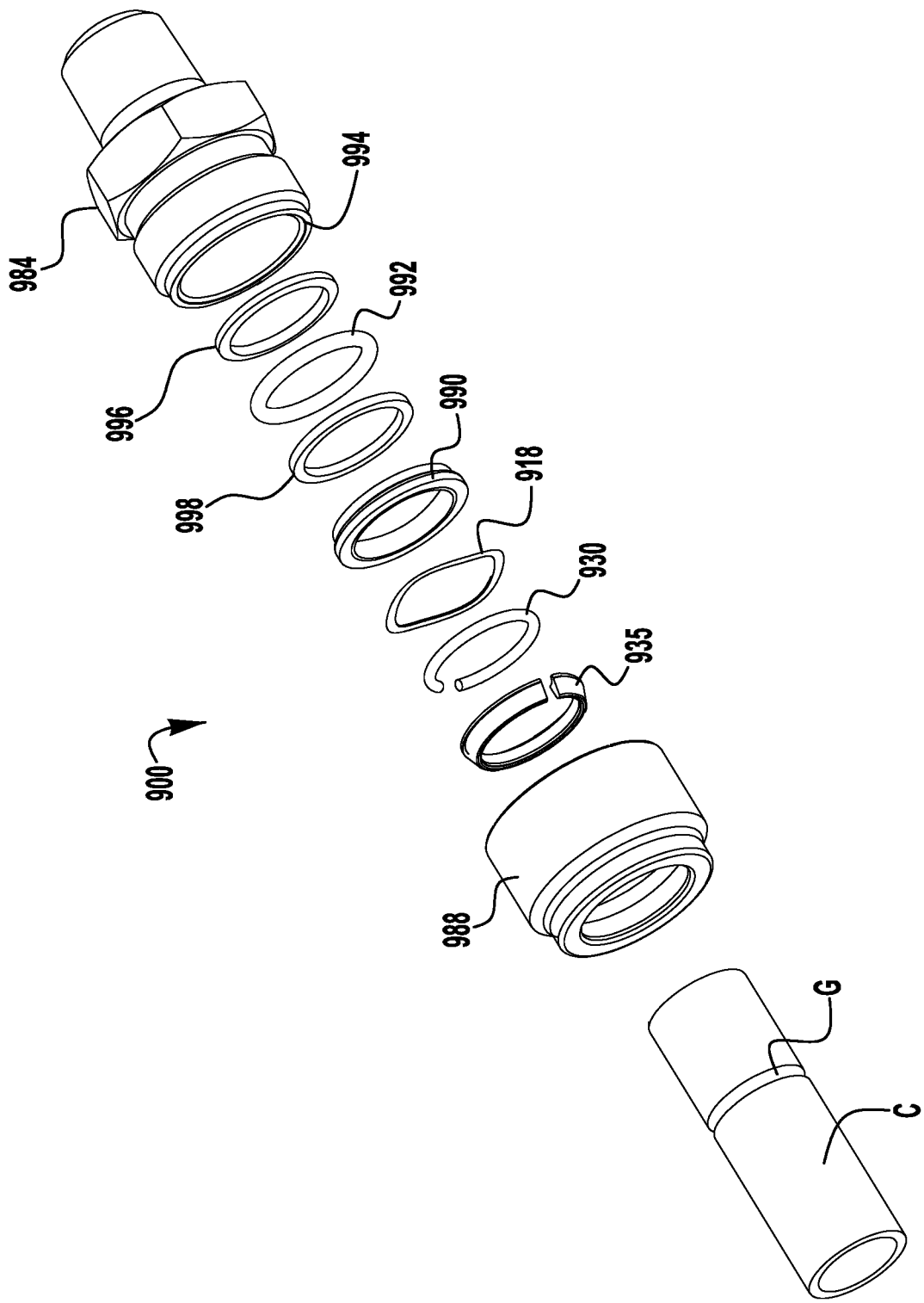
FIG. 26 is an exploded perspective view of the push to connect fitting of FIG. 22.

The exemplary gripping ring 930 is radially inwardly biased to snap into the conduit end groove G when the gripping ring 930 is axially aligned with the conduit end groove (FIG. 22). An outboard portion of the gripping ring 930 is received in an inboard counterbore or recess in the colleting ring 935. Upon pressurization or pulling on the conduit (FIG. 23), the gripping ring 930 loads the colleting ring 935 against an internal tapered surface 918 of the nut 988, tightening the radially outward biased colleting ring against the conduit C, while simultaneously further radially compressing and holding the gripping ring 930 in the conduit groove G.

Figure 28A:
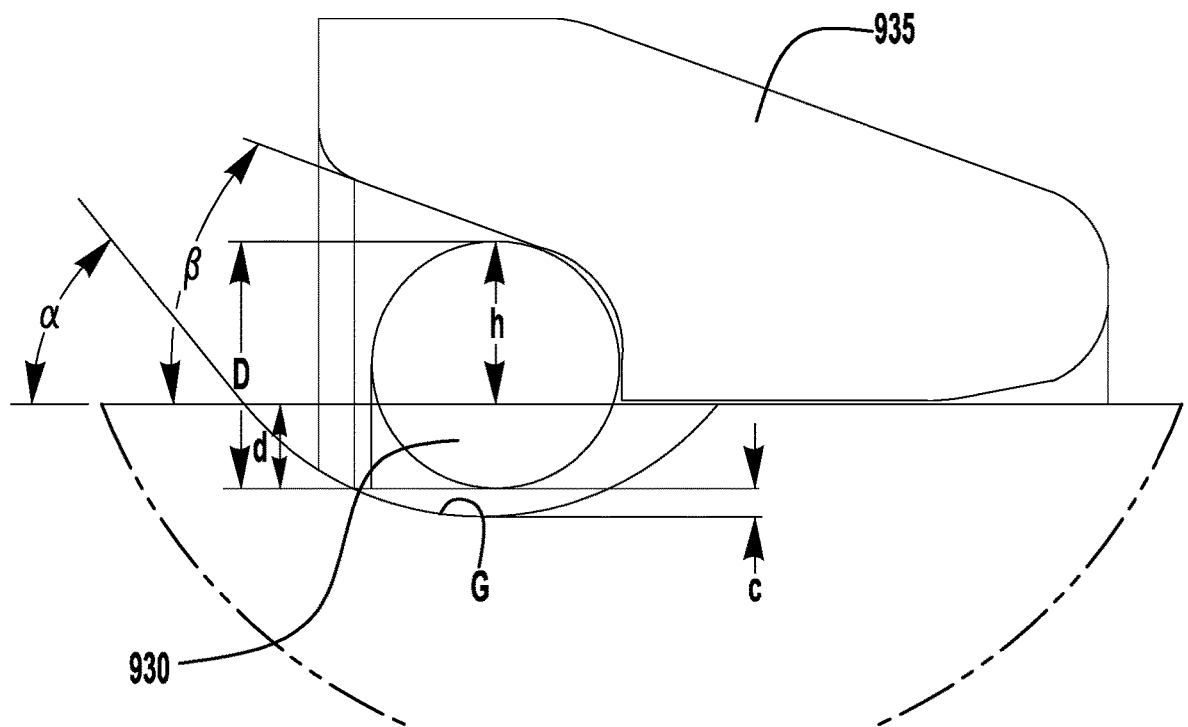
FIG. 28A is a cross-sectional view of a grooved conduit end, gripping ring, and colleting ring arrangement, according to an exemplary embodiment of the present disclosure.

During installation, insertion of the conduit end C through the gripping ring 930 causes the gripping ring 930 to be at least partially disengaged from the collet ring recess 926 (FIG. 24), allowing the gripping ring to radially expand to facilitate further conduit insertion, until the gripping ring aligns with, and snaps into, the conduit end groove G. To remove the conduit end C, an extension end 951 of a removal tool 950 (FIG. 25), which may be similar to the other conduit releasing tools and inserts described herein, may be inserted into the nut 988 and into engagement with the colleting ring 935. Axial force from the tool 950 against the colleting ring 935 may axially move the colleting ring and gripping ring 930 against the spring 908 to dislodge the gripping ring from the conduit end groove G for release of the conduit end. Additionally or alternatively, the tool 950 may hold the colleting ring 935 and gripping ring 930 against outboard axial movement, such that a pulling force applied to the conduit C can radially expand the colleting ring and gripping ring for disengagement of the gripping ring from the groove G. To facilitate this removal, while providing for secure retention of the installed conduit end, the conduit end groove G may be contoured to have a larger radius of curvature than the gripping ring 930, for example, to provide an inward or inboard side slope angle $\alpha$ of between about 25° and about 45° (e.g., about 35°), as shown in FIG. 28A. The inboard side slope angle $\alpha$ may be selected to be greater than collet ring recess slope angle $\beta$ (e.g., between about 15° and about 30°, or about 20°), for example, to provide a reducing gap between the groove G and the colleting ring 935 as the conduit is forced axially outward under pressure, to facilitate retention of the gripping ring.

With further reference to FIG. 28A, to provide for adequate conduit grip by the gripping ring 930 when the conduit end C is subjected to a system pressure or pulling force, the gripping ring may be configured to extend into the groove G by a minimum groove seating depth d corresponding to the difference between the gripping ring diameter D and a colleting ring seating height h, plus a clearance dimension c selected to ensure that the colleting ring engages the outer surface of the conduit end C. This groove seating depth may be selected to be, for example, about 0.005 to about 0.012 inches, or between about 0.007 and about 0.008 inches.

Figure 28B:
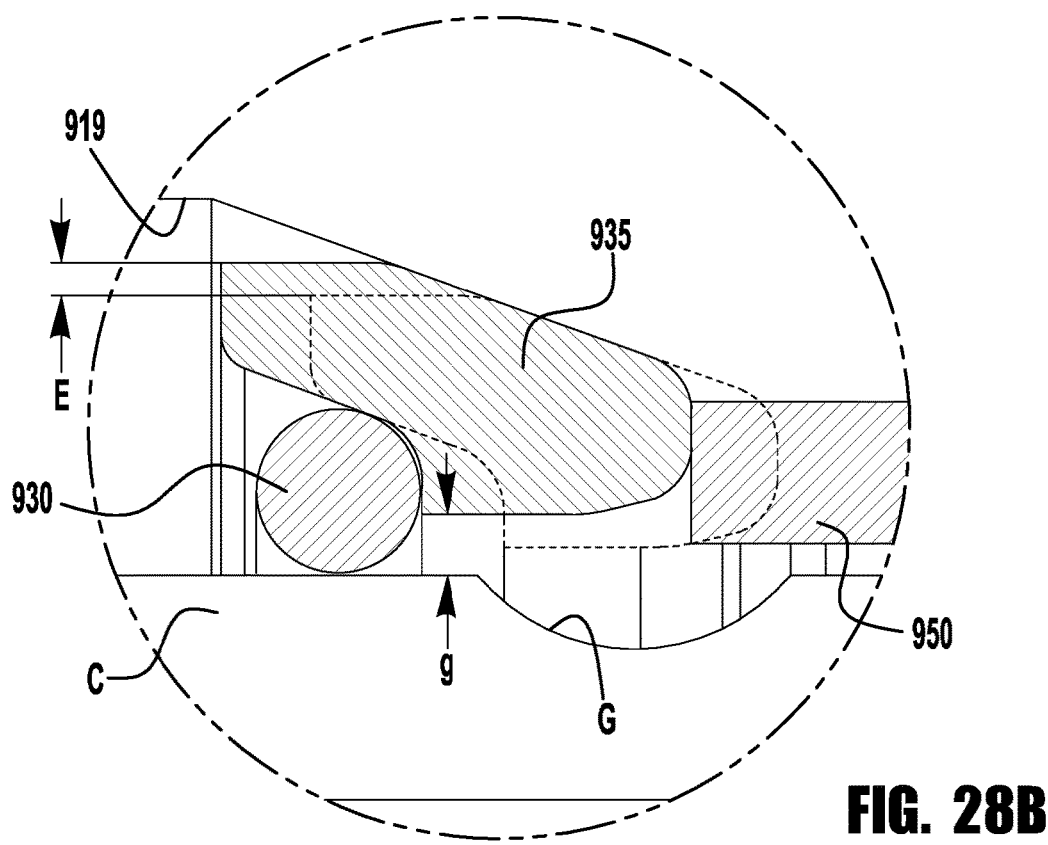
FIG. 28B is a cross-sectional view of a grooved conduit end, gripping ring, and colleting ring arrangement, according to an exemplary embodiment of the present disclosure.

With reference to FIG. 28B, to provide for removal of the conduit end C by insertion of a release tool 950, the axial space between the colleting ring 935 and the gland 990 and the radial space between the colleting ring and the inner nut bore 919 may be selected to allow for colleting ring displacement sufficient to provide a gap g between the conduit outer surface and the colleting ring inner surface sufficient to radially expand the gripping ring 930 out of the groove G.

Figure 28C:
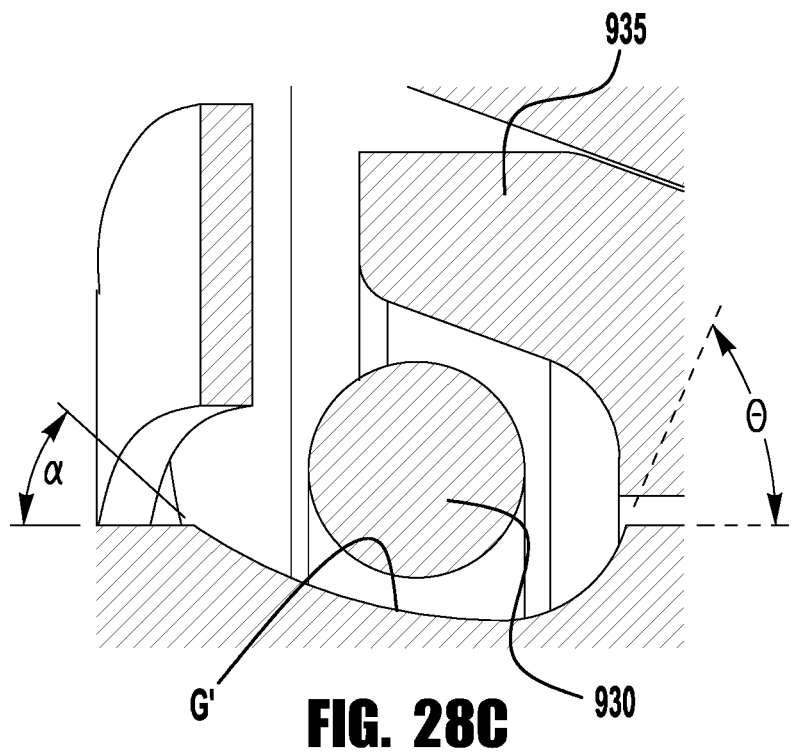
FIG. 28C is a cross-sectional view of a grooved conduit end, gripping ring, and colleting ring arrangement, according to an exemplary embodiment of the present disclosure.
Figure 28D:
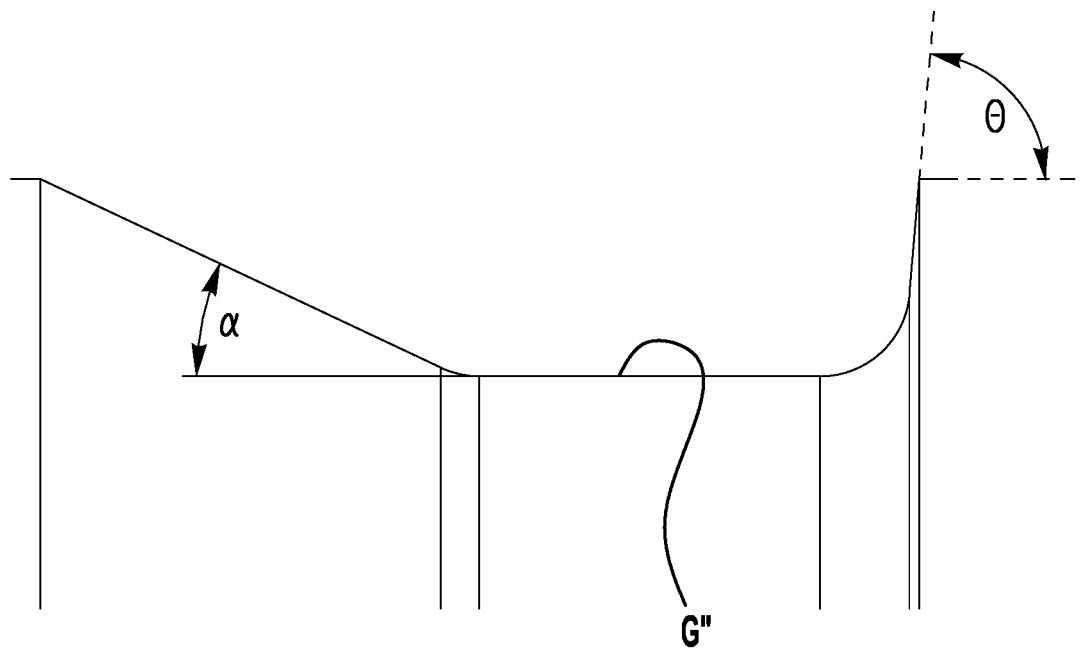
FIG. 28D is a cross-sectional view of a grooved conduit end, gripping ring, and colleting ring arrangement, according to an exemplary embodiment of the present disclosure.

While the conduit end groove G may be laterally symmetrical, as shown in the embodiment of FIGS. 22-26, in other embodiments, the conduit end groove may include a steeper outboard side, for example, an angle $\theta$ between about 45° and about 90°, or about 85°, with respect to the outer surface of the conduit, with an inboard side extending at an angle $\alpha$ of between about 25° and about 45° (e.g., about 35°) with respect to the outer surface of the conduit. The steeper outboard side of the groove may be provided to minimize outward exposure of the groove with the colleting ring. This non-symmetric groove may be formed as an arcuate profile groove G', as shown in FIG. 28C, or a squared off dual tapered groove G", as shown in FIG. 28D.

Figure 29A:
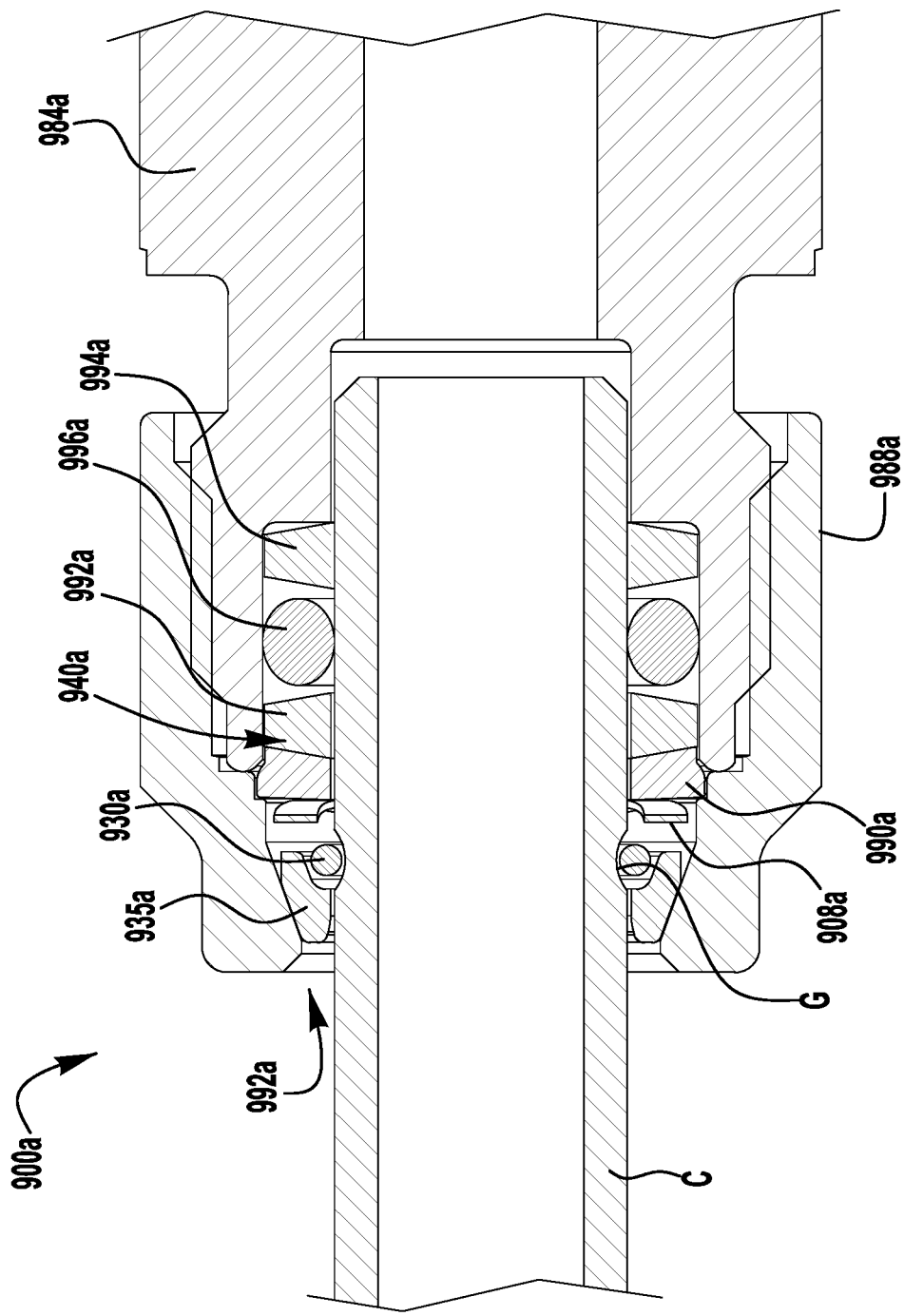
FIG. 29A is a cross-sectional view of a push to connect fitting, shown assembled with a grooved conduit end in an unpressurized condition, according to another exemplary embodiment of the present disclosure.
Figure 29C:
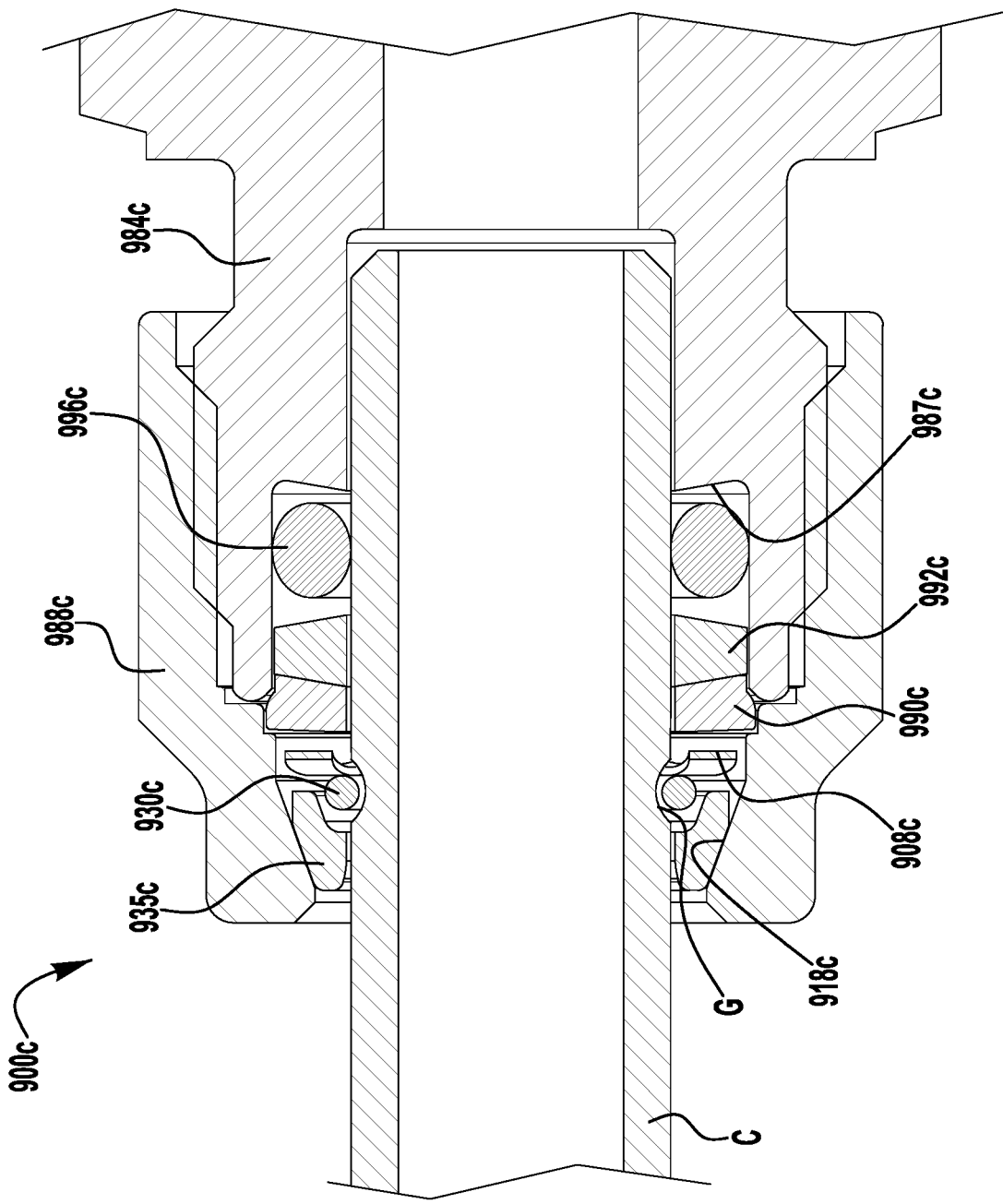
FIG. 29C is a cross-sectional view of a push to connect fitting, shown assembled with a grooved conduit end in an unpressurized condition, according to another exemplary embodiment of the present disclosure.

The push to connect fitting may be provided with a variety of sealing arrangements. In the exemplary embodiment of FIGS. 22-26, the rear backup ring 994 has a tapered (e.g., frustoconical) end surface contoured to shield and improve retention of the O-ring 996 during conduit insertion, by creating a tapered inboard side groove in which the O-ring is disposed. In another exemplary embodiment, as shown in FIG. 29A (similar to the embodiment of FIGS. 22-26 and using like reference numbers for corresponding components), front and rear backup rings 992*a*, 994*a* each have a tapered (e.g., frustoconical) end surface contoured to shield and improve retention of the O-ring 996*a* during conduit insertion, by creating a dovetail groove in which the O-ring is disposed. In another embodiment, as shown in FIG. 29B (similar to the embodiment of FIGS. 22-26 and using like reference numbers for corresponding components), the fitting body 984*b* is provided with a trepan tapered counterbore 987*b* replacing the rear backup ring and, with the front backup rings 992*b*, 998*b*, providing a tapered inboard side groove in which the O-ring 996*b* is disposed, to shield and improve retention of the O-ring during conduit insertion. In yet another embodiment, as shown in FIG. 29C (similar to the embodiment of FIGS. 22-26 and using like reference numbers for corresponding components), the fitting body 984*c* is provided with a trepan tapered counterbore 987*b* replacing the rear backup ring and, with the tapered (e.g., frustoconical) ended front backup ring 992*c*, creating a dovetail groove in which the O-ring 996*c* is disposed, to shield and improve retention of the O-ring 996*c* during conduit insertion.

According to another exemplary aspect of the present disclosure, a push to connect fitting with split gripping ring may be provided without a biasing member biasing the gripping ring toward the seated position. In such an arrangement, the nut cavity in which the gripping ring and colleting ring are disposed may be sized such that axial alignment of the gripping ring with the groove of the inserted conduit is ensured and the axial space in the nut cavity is minimized, while maintaining sufficient space for axial displacement (e.g., by tool insertion) of the colleting ring to a conduit releasing position (e.g., as shown in FIG. 28B and described above).

FIG. 30 illustrates an exemplary push to connect fitting 900*d*, similar to the embodiment of FIGS. 22-26 and using like reference numbers for corresponding components, provided without a biasing member/spring, with a nut cavity 915*d* sized such that axial alignment of the gripping ring 930*d* with the groove G of the inserted conduit C is ensured and the axial space in the nut cavity 915*d* is minimized, while maintaining sufficient space for axial displacement (e.g., by tool insertion) of the colleting ring 935*d* to a conduit releasing position. The axial space of the nut cavity 915*d* may be limited by the axially captured gland 990*d* (with outer rib 991*d* captured between nut shoulder 986*d* and body end portion 985*d*) sized to extend proximate to or in axial alignment with the groove G of the inserted conduit, thereby facilitating axial positioning of the gripping ring 930*d* without the assistance of a biasing member. As shown, the gland 990*d* may, but need not, be symmetrical, for example, to facilitate installation. Tapered backup rings and or body trepan surfaces may also be used, as described above.

Similar to the embodiments of FIGS. 15 and 16, a push to connect fitting with a split gripping ring may be provided with a removable conduit releasing tool or insert, assembled with the fitting nut to hold the retaining arrangement in a conduit releasing condition. When a conduit end has been inserted into the fitting past the conduit retaining arrangement to a desired installed position, the conduit releasing insert may be removed from the fitting, allowing the spring biased retaining arrangement to move to a conduit retaining condition. a removable conduit releasing tool or insert may be assembled with FIG. 30A illustrates the exemplary push to connect fitting 900*d* of FIG. 30, including an installed conduit releasing insert tool 950*d* (which may be similar to the conduit releasing inserts described above), permitting free insertion and removal of a conduit end C. The conduit releasing insert 950*d* includes a releasing extension 951*d* that is inserted into the nut 988*d* and into engagement with the colleting ring 935*d*, thereby axially holding the colleting ring and gripping ring 930*d* in a conduit releasing position. An interlocking flange portion 952*d* of the insert 950*d* extends over an end portion of the nut 988*d* and snaps into gripping engagement with a circumferential groove 989*d* in the nut end portion, thereby securing the insert 950*d* to the nut, and securing the releasing extension 951*d* against the colleting ring 935*d* to hold the colleting ring and gripping ring 930*d* in the conduit releasing position.

According to another aspect of the present application, a push to connect fitting configured for connection with a grooved conduit end, as described above, may be provided with a retaining arrangement that utilizes a unitary split ring conduit retaining member having a gripping portion that is received in the groove of the installed conduit end, and a colleting portion that engages a tapered interior surface of the fitting (e.g., a tapered interior surface of the fitting nut).

FIGS. 31-34 illustrate an exemplary push to connect fitting 900*e* having a male threaded body 984*e* and a female threaded nut 988*e* assembled to enclose a unitary split conduit retaining ring 920*e* and a sealing arrangement 940*e*, and to receive a conduit end C for retention (e.g., gripping and colleting retention) by the retaining arrangement and sealing engagement with the fitting, via the sealing arrangement.

The exemplary conduit retaining ring 920*e* (also shown in FIG. 31A) includes an inner radial gripping portion 930*e* and an outer radial colleting portion 935*e*. The exemplary gripping portion 930*e* defines an inner rib contoured to be closely received in the conduit end groove G. The exemplary colleting portion 935*e* includes a tapered surface contoured to closely match the tapered interior surface 918*e* of the fitting nut 988*e*.

The exemplary sealing arrangement 940*e* includes a gland 990*e*, backup rings 992*e*, 998*e*, and a seal member 996*e* (e.g., O-ring or other such gasket). The exemplary gland 990*e* is symmetrical and includes an outer rib 991*e* that is secured between an inner ridge or shoulder 986*e* of the nut 988*e* and an end portion 985*e* of the body 984*e* to axially fix the gland 990*e*.

Figure 31:
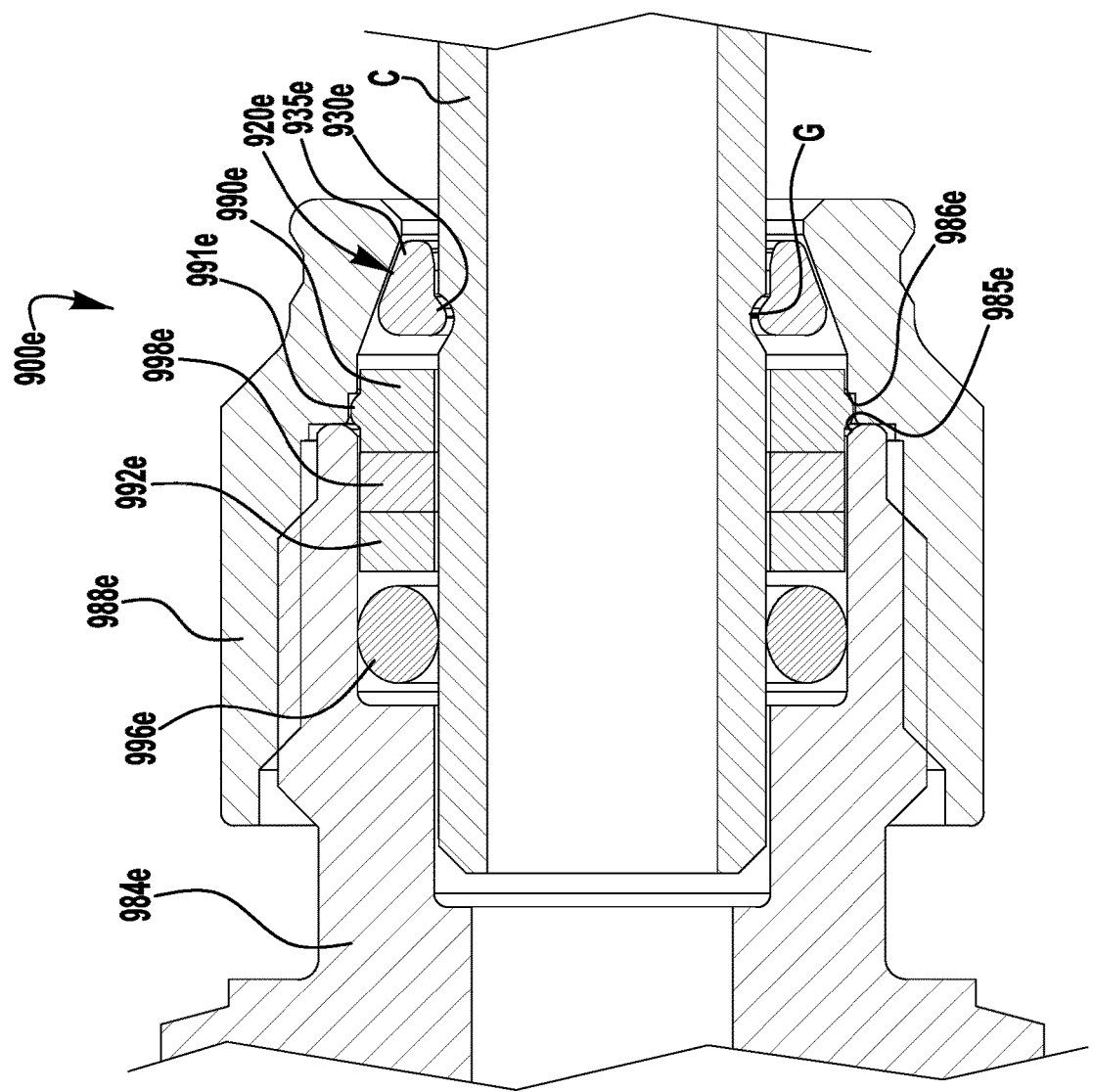
FIG. 31 is a cross-sectional view of a push to connect fitting, shown assembled with a grooved conduit end in an unpressurized condition, according to an exemplary embodiment of the present disclosure.
Figure 31A:
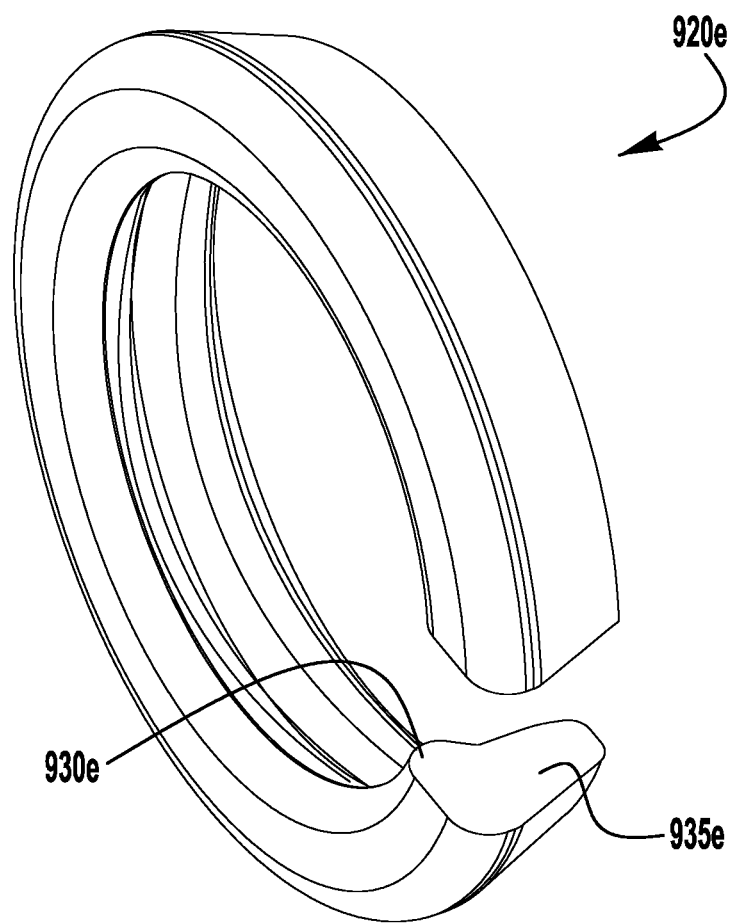
FIG. 31A is a perspective view of the conduit retaining ring of the push to connect fitting of FIG. 31.
Figure 33:
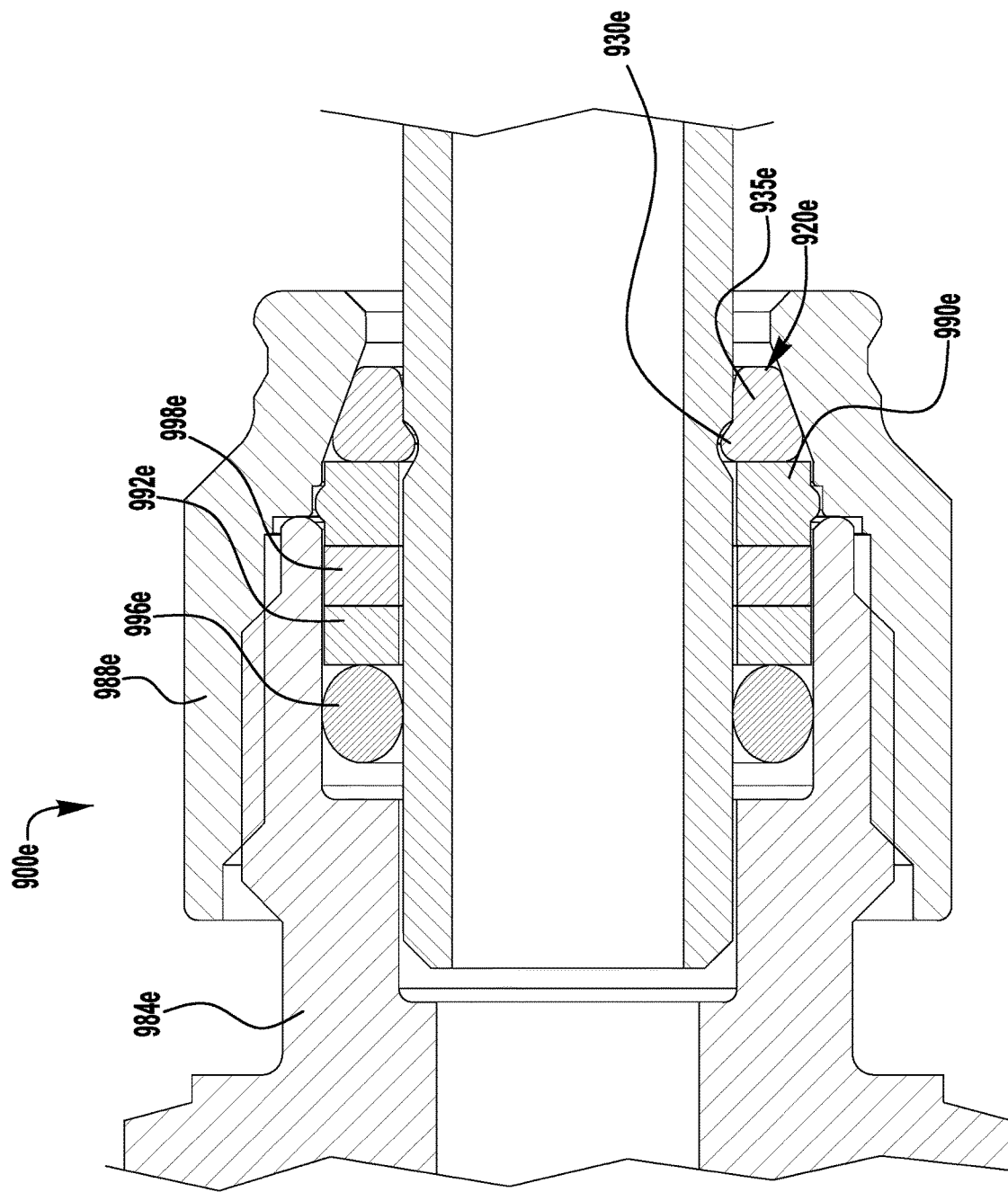
FIG. 33 is a cross-sectional view of the push to connect fitting of FIG. 31, shown assembled with a grooved conduit end in a pressurized condition.
Figure 34:
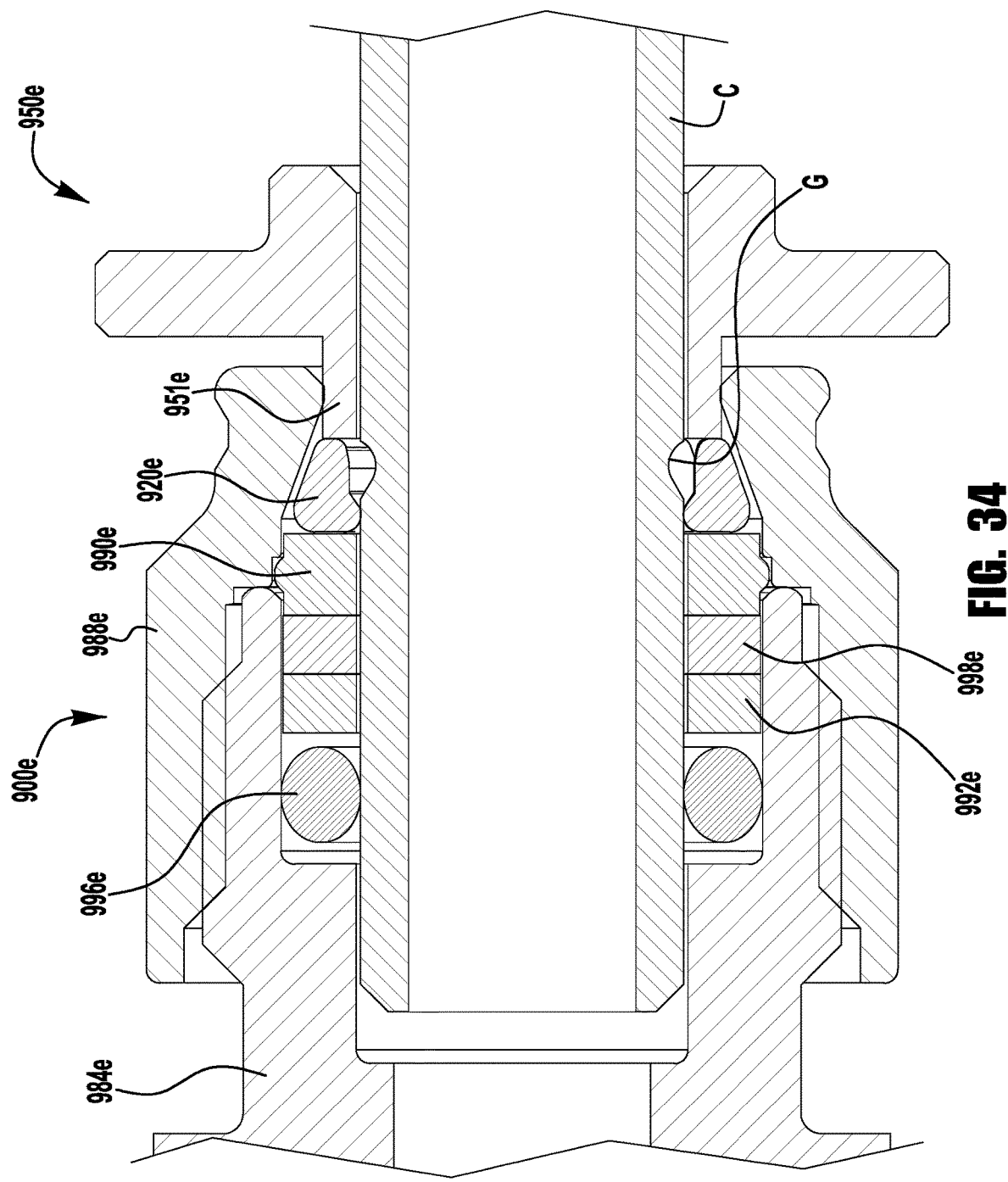
FIG. 34 is a cross-sectional view of the push to connect fitting of FIG. 31, shown assembled with a conduit removal tool for removal of the conduit end.

The exemplary conduit retaining ring 920*e* is radially inwardly biased to snap the gripping portion 930*e* into the conduit end groove G when the gripping portion is axially aligned with the conduit end groove (FIG. 31). During installation of the conduit end C (FIG. 32), the conduit retaining ring 920*e* is forced in a radially inboard direction, providing the conduit retaining ring with radial space to permit radial expansion, to facilitate conduit insertion. Upon pressurization or pulling on the conduit (FIG. 33), the conduit end C and conduit retaining ring 920*e* are forced in an axially outboard direction, causing the colleting portion 935*e* to engage the tapered interior surface 918*e* and be compressed radially inward into colleting engagement with the conduit end C, while simultaneously further radially compressing and holding the gripping portion 930e in the conduit groove G.

Similar to embodiments described above, to remove the conduit end C, an extension end 951e of a removal tool 950e (FIG. 34), which may be similar to the other conduit releasing tools and inserts described herein, with an extension 951e that may be inserted into the nut 988e and into engagement with the conduit retaining ring 920e. Axial force from the tool 950e against the conduit retaining ring 920e may axially move the conduit retaining ring to dislodge the gripping portion 930e from the conduit end groove G for release of the conduit end. Additionally or alternatively, the tool 950e may hold the conduit retaining ring 920e against outboard axial movement, such that a pulling force applied to the conduit C can radially expand the conduit retaining ring for disengagement of the gripping portion 930e from the groove G.

Figure 35:
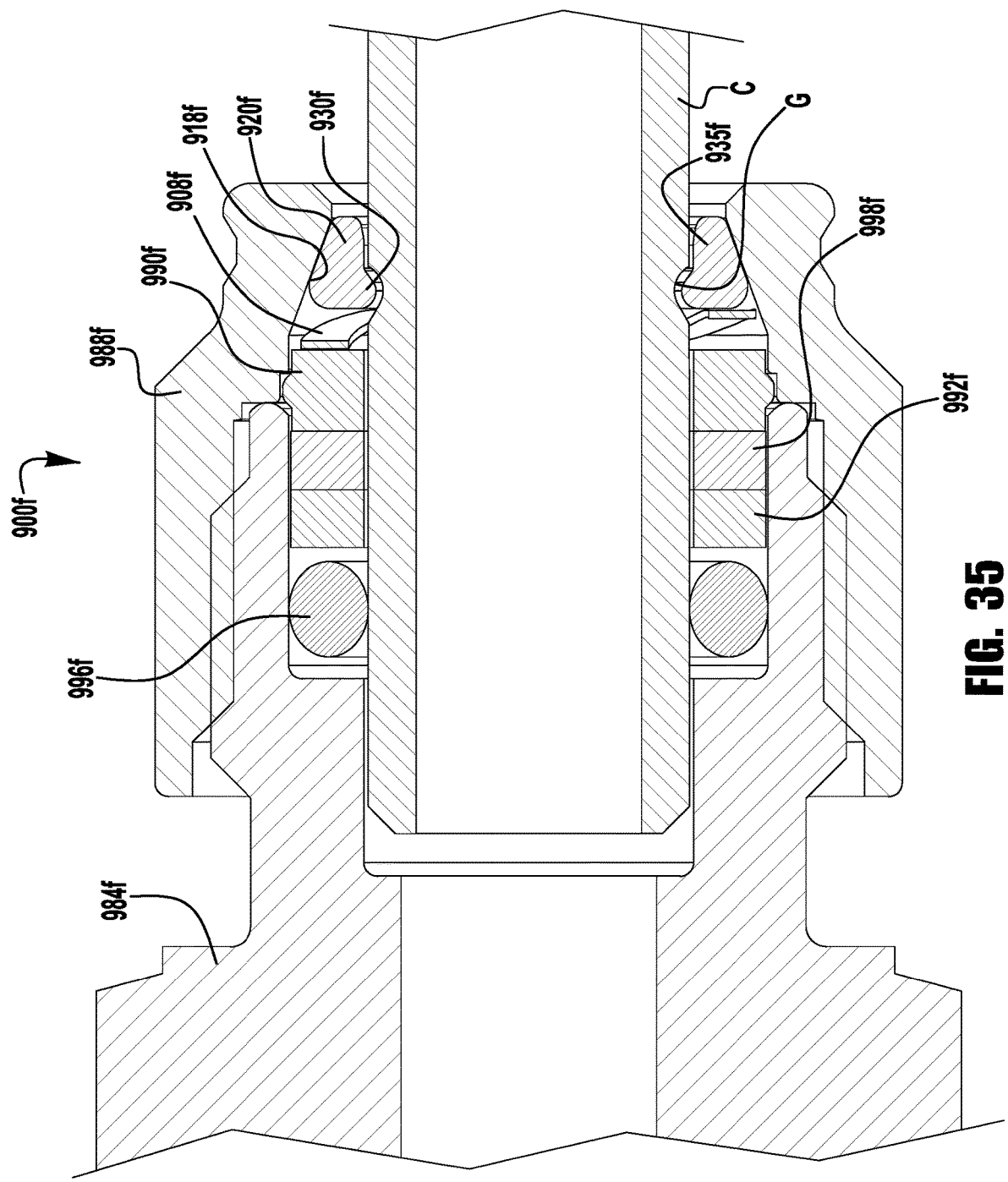
FIG. 35 is a cross-sectional view of a push to connect fitting, shown assembled with a grooved conduit end in an unpressurized condition, according to another exemplary embodiment of the present disclosure.

In other embodiments, as shown in FIG. 35, a push to connect fitting 900f, 900f′ with a conduit retaining ring 920f (similar to the embodiment of FIGS. 31-34 and using like reference numbers for corresponding components) may include a biasing member, such as, for example, a wave spring 908f (as shown), and/or one or more elastomeric springs (e.g., e.g., elastomeric gasket or foam spacer), cupped washers, Belleville springs, or coil springs, that axially biases the conduit retaining ring against the interior tapered surface 918f of the fitting nut 988f, for example, to center the conduit retaining ring in preparation for tube insertion.

Figure 36:
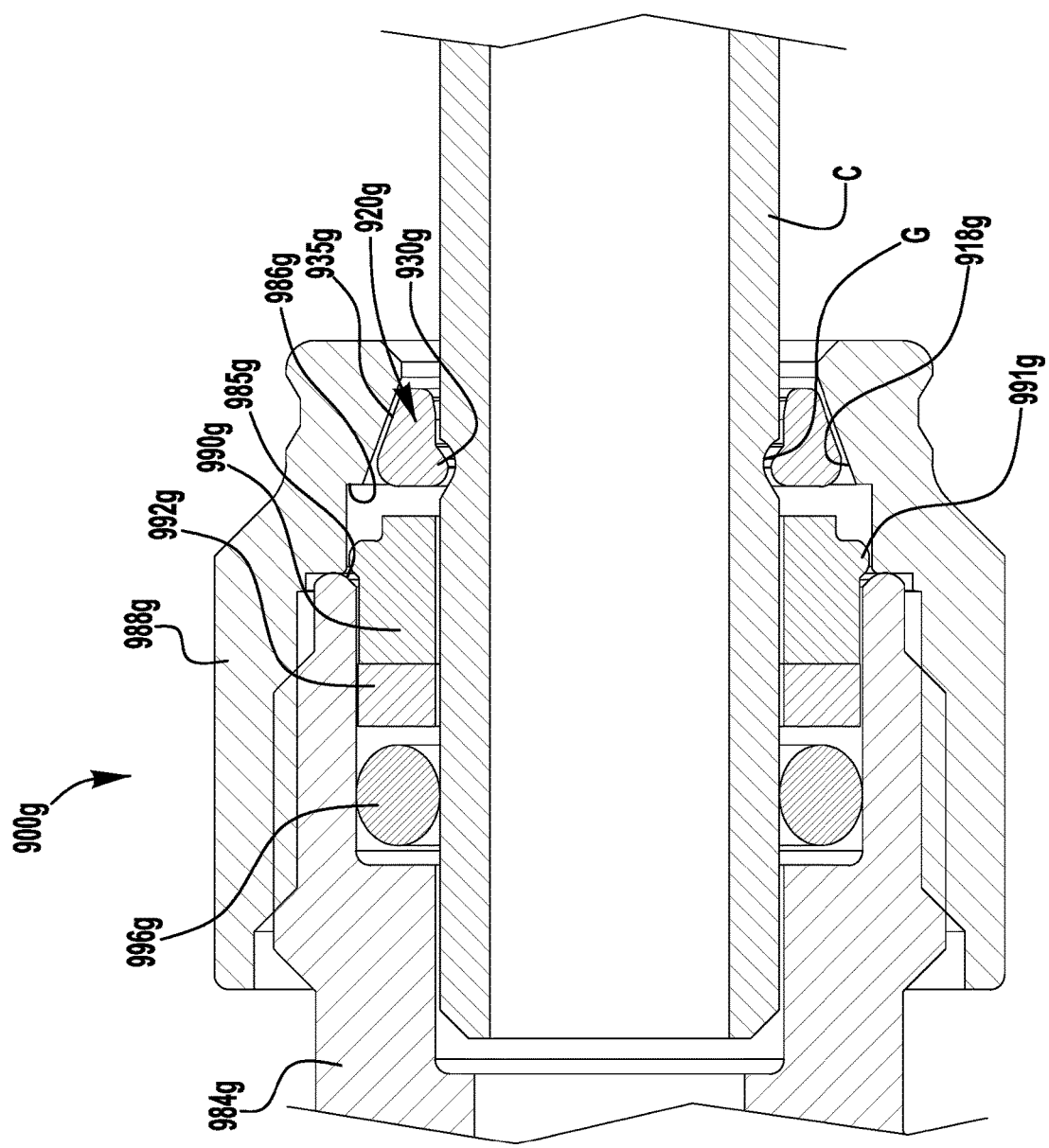
FIG. 36 is a cross-sectional view of a push to connect fitting, shown assembled with a grooved conduit end in an unpressurized condition, according to another exemplary embodiment of the present disclosure.
Figure 37:
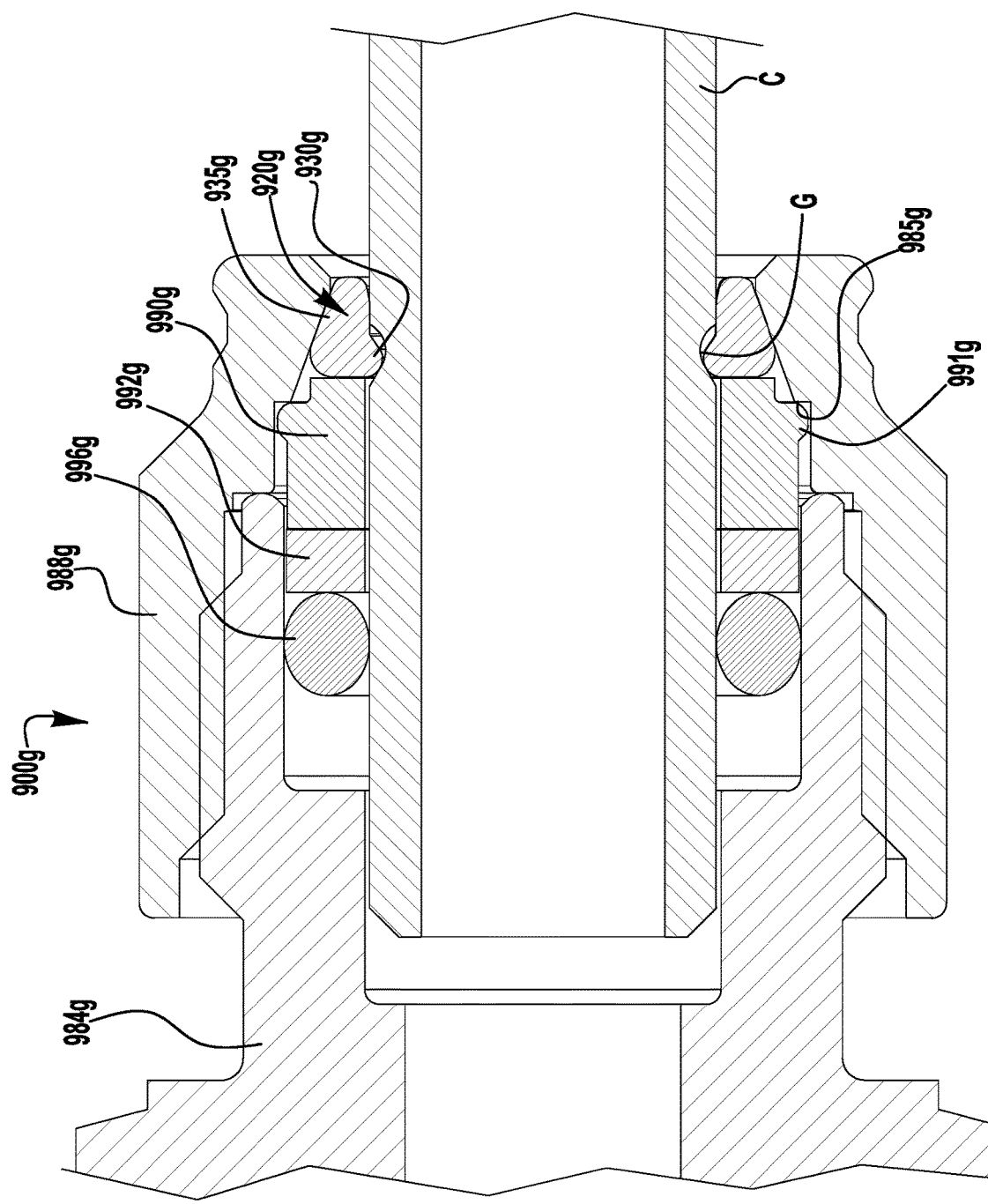
FIG. 37 is a cross-sectional view of the push to connect fitting of FIG. 36, shown assembled with a grooved conduit end in a pressurized condition.

In another exemplary embodiment, as shown in FIGS. 36 and 37, a push to connect fitting 900g with a conduit retaining ring 920g (similar to the embodiment of FIGS. 31-34 and using like reference numbers for corresponding components) may include a gland 990g that is permitted a degree of axial movement or "float," for example, to provide for axial forces applied by the gland against the conduit retaining ring 920g in response to fluid pressurization of the O-ring seal 996g. The axial space for movement of the gland 990g may be accomplished, for example, by providing the fitting nut 988g with a deeper counterbore, which provides additional axial space between the nut shoulder 986g and the body end portion 985g. When the conduit end is installed, the gland 990g and conduit retaining ring 920g are permitted to move axially inboard (with the gland rib 991g engaging the body end portion 985g), allowing for radial expansion of the conduit retaining ring (FIG. 36). The axial travel of the gland 990g may be limited or constrained, for example, to limit outward load of the gland on the conduit retaining ring 990g when pressurized (with the gland rib 991g engaging the nut shoulder 986g, as shown in FIG. 37), and to limit or prevent axial compression of the O-ring seal 996g during conduit insertion.

According to another exemplary aspect of the present disclosure, a push to connect conduit fitting (e.g., any of the push to connect conduit fittings described herein or in the above incorporated '582 Patent) may be configured to permit threaded adjustment of the fitting components (e.g. threaded adjustment of a fitting nut on a fitting body) to provide for easier conduit insertion when the fitting components are adjusted to a conduit insertion position, and secure conduit gripping and colleting when the fitting components are adjusted to an installed position.

Figure 38:
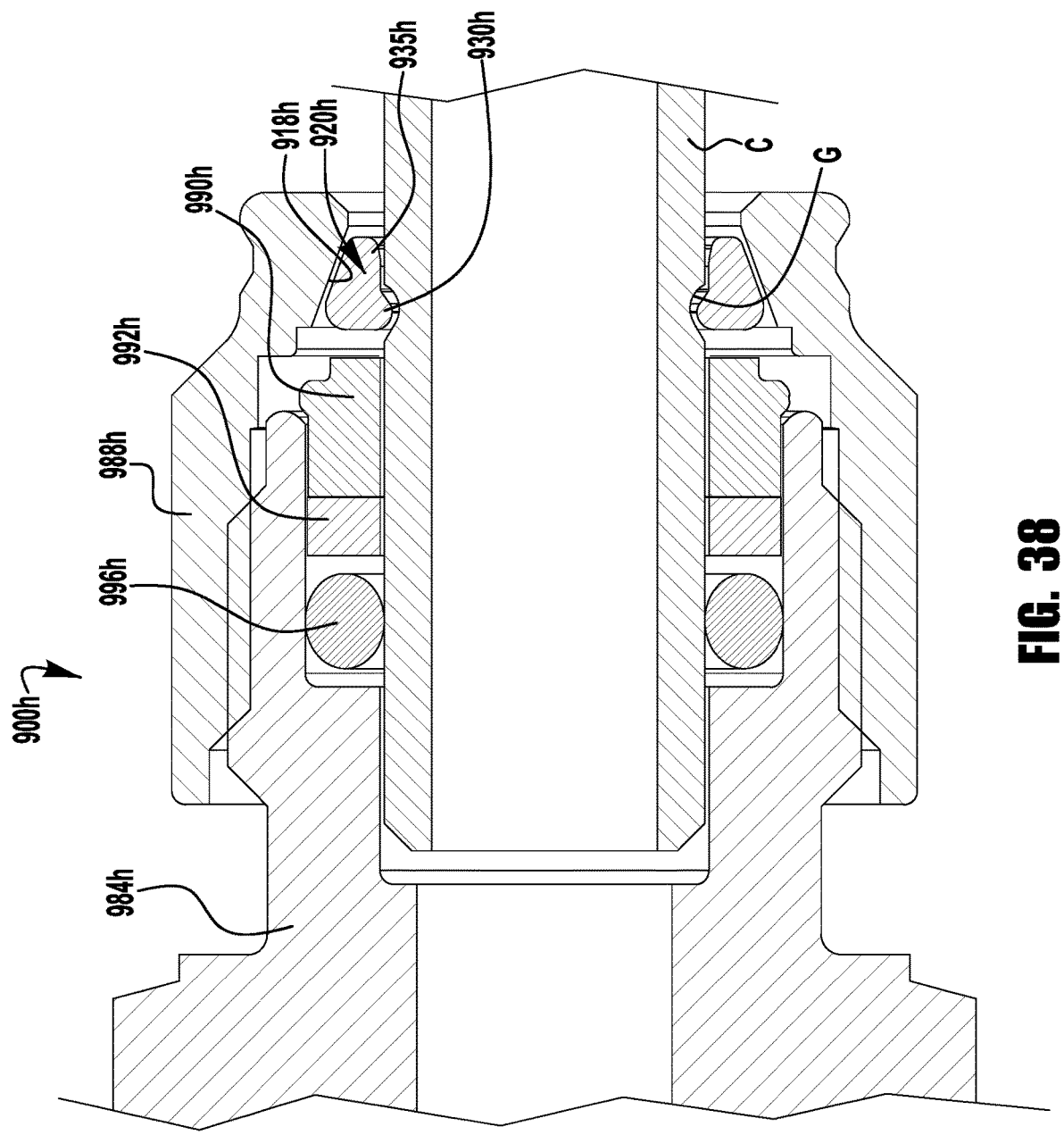
FIG. 38 is a cross-sectional view of a push to connect fitting, shown assembled with a grooved conduit end, with the fitting nut adjusted to a conduit insertion position, according to another exemplary embodiment of the present disclosure.

FIGS. 38 and 39 illustrate an exemplary push to connect conduit fitting 900h (similar to the embodiment of FIGS. 31-34 and using like reference numbers for corresponding components) having a fitting nut 988h that is adjustable on a fitting body 984h between a conduit insertion position (FIG. 38) and an installed position (FIG. 39). When the fitting nut 988h is in the conduit insertion position, the gland 990h and conduit retaining ring 920h are axially movable in an inboard direction to allow for disengagement of the colleting portion 935h of the conduit retaining ring from the interior tapered surface 918h of the nut 988h, to permit radial expansion of the conduit retaining ring during conduit insertion. When the conduit C has been fully inserted (e.g., with the gripping portion 930h of the conduit retaining ring 920h snapping into engagement with the conduit groove G), the fitting nut 988h may be tightened to the installed position to move the interior tapered surface 918h of the nut 988h against the colleting portion 935h of the conduit retaining ring, thereby compressing the colleting portion against the conduit C. Such an arrangement may provide for a reduction in outward axial movement of the conduit when pressurized, increased gripping and colleting at low system pressures, and resistance to rotation of the installed conduit.

The inventive aspects and concepts have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A push to connect fitting comprising:
   first and second fitting components joined to define an interior cavity having an outboard end;
   a sealing arrangement disposed in the interior cavity and configured to seal against an outer surface of a conduit end portion when the conduit end portion is inserted into the outboard end; and
   a conduit retaining arrangement disposed in the interior cavity, the conduit retaining arrangement including a gripping portion that grips the outer surface of the inserted conduit end portion and a colleting portion outboard of the gripping portion that collets the outer surface of the inserted conduit end portion in response to insertion of the conduit end portion into the outboard end in a single action, wherein at least the colleting portion is engageable with an interior tapered surface in the interior cavity;
   wherein the colleting portion is defined by a single piece split ring, split to define a circumferential gap between first and second circumferential ends of the single piece split ring.

2. The push to connect fitting of claim 1, wherein the gripping portion is defined by the single piece split ring.

3. The push to connect fitting of claim 1, wherein the single piece split ring is a first single piece split ring, the fitting assembly further comprising a second single piece split ring separate from the first single piece split ring and defining the gripping portion.

4. The push to connect fitting of claim 3, wherein the first single piece split ring includes an inboard recess receiving an outboard portion of the second single piece split ring.

5. The push to connect fitting of claim 1, wherein the single piece split ring is radially inwardly biased.

6. The push to connect fitting of claim 1, wherein the gripping portion comprises a retainer body and a plurality of conduit gripping members retained in a plurality of cavities in the retainer body.

7. The push to connect fitting of claim 6, wherein the single piece split ring is radially outwardly biased.

8. The push to connect fitting of claim 1, further comprising a spring member disposed between the gripping portion and the sealing arrangement to bias the gripping portion and the colleting portion in an outboard direction.

9. The push to connect fitting of claim 1, wherein the first and second fitting components comprise a male threaded fitting body and a female threaded fitting nut.

10. The push to connect fitting of claim 1, wherein the sealing arrangement includes an outboard gland axially fixed between portions of the first and second fitting components.

11. A fitting assembly comprising:
a conduit having an end portion with a circumferential groove; and
a push to connect fitting comprising:
first and second fitting components joined to define an interior cavity having an outboard end;
a sealing arrangement disposed in the interior cavity and configured to seal against an outer surface of a conduit end portion when the conduit end portion is inserted into the outboard end; and
a conduit retaining arrangement disposed in the interior cavity, the conduit retaining arrangement including a gripping portion that grips the outer surface of the inserted conduit end portion and a colleting portion outboard of the gripping portion that collets the outer surface of the inserted conduit end portion in response to insertion of the conduit end portion into the outboard end in a single action, wherein at least the colleting portion is engageable with an interior tapered surface in the interior cavity;
wherein the colleting portion is defined by a single piece split ring, split to define a circumferential gap between first and second circumferential ends of the single piece split ring.

12. The fitting assembly of claim 11, wherein the circumferential groove includes a concave surface.

13. The fitting assembly of claim 11, wherein the circumferential groove includes an inboard side and an outboard side, wherein the inboard side extends at a first angle with respect to the outer surface of the conduit, and the outboard side extends at a second angle with respect to the outer surface of the conduit, the second angle being greater than the first angle.

14. The fitting assembly of claim 11, wherein the first and second fitting components comprise a male threaded fitting body and a female threaded fitting nut.

15. A push to connect fitting comprising:
first and second fitting components joined to define an interior cavity having an outboard end;
a sealing arrangement disposed in the interior cavity, wherein the sealing arrangement seals against an outer surface of a conduit end portion when the conduit end portion is inserted into the outboard end;
a gripping arrangement disposed in the interior cavity, wherein the gripping arrangement grips the outer surface of the inserted conduit end portion; and
a colleting ring separate from the gripping arrangement and disposed in the interior cavity and having an inboard end surface engaging an outboard end surface defined by a ring portion of the gripping arrangement, wherein the colleting ring collets the outer surface of the inserted conduit end portion in response to insertion of the conduit end portion into the outboard end in a single action.

16. The push to connect fitting of claim 15, wherein the gripping arrangement comprises a retainer body and a plurality of conduit gripping members retained in a plurality of cavities in the retainer body, with the retainer body defining the ring portion of the gripping arrangement.

17. The push to connect fitting of claim 15, further comprising a spring member disposed between the gripping arrangement and the sealing arrangement to bias the gripping arrangement in an outboard direction toward a conduit gripping position and to bias the colleting ring in an outboard direction toward a conduit colleting position.

18. The push to connect fitting of claim 15, wherein the first and second fitting components comprise a male threaded fitting body and a female threaded fitting nut.

19. The push to connect fitting of claim 15, wherein the sealing arrangement includes an outboard gland axially fixed between portions of the first and second fitting components.

20. The push to connect fitting of claim 15, wherein the colleting ring is axially aligned with an interior tapered surface of the second fitting component, such that outward axial movement of the colleting ring against the interior tapered surface radially compresses the colleting ring.

* * * * *